US010643239B2

(12) United States Patent
Login et al.

(10) Patent No.: US 10,643,239 B2
(45) Date of Patent: May 5, 2020

(54) MONITORING AN APPLICATION ON A PROCESSING DEVICE AND GENERATING REWARDS

(71) Applicant: OUTFIT7 LIMITED, London (GB)

(72) Inventors: Samo Login, Pissouri (CY); John Stephen Rankin, London (GB); Primoz Strajnar, Ljubljana (SI); Igor Lautar, Vrhnika (SI); Boris Erzen, Lesce (SI)

(73) Assignee: OUTFIT7 LIMITED, London (GB)

( * ) Notice: Subject to any disclaimer, the term of this patent is extended or adjusted under 35 U.S.C. 154(b) by 815 days.

(21) Appl. No.: 14/745,094

(22) Filed: Jun. 19, 2015

(65) Prior Publication Data
US 2016/0098753 A1    Apr. 7, 2016

Related U.S. Application Data

(63) Continuation-in-part of application No. 14/560,523, filed on Dec. 4, 2014, now Pat. No. 10,413,818.
(Continued)

(51) Int. Cl.
*G06Q 30/00* (2012.01)
*G06Q 30/02* (2012.01)

(52) U.S. Cl.
CPC ..... *G06Q 30/0257* (2013.01); *G06Q 30/0207* (2013.01); *G06Q 30/0242* (2013.01); *G06Q 30/0251* (2013.01); *G06Q 30/0269* (2013.01)

(58) Field of Classification Search
None
See application file for complete search history.

(56) References Cited

U.S. PATENT DOCUMENTS

| 6,099,408 A | 8/2000 | Schneier et al. |
| 6,264,557 B1 | 7/2001 | Schneier et al. |

(Continued)

FOREIGN PATENT DOCUMENTS

| WO | WO 2009/126316 A1 | 10/2009 |
| WO | WO 2011/035442 A1 | 3/2011 |

(Continued)

OTHER PUBLICATIONS

International Search Report and Written Opinion dated Nov. 13, 2015 in PCT/EP2015/072111.
(Continued)

*Primary Examiner* — Meredith A Long
(74) *Attorney, Agent, or Firm* — Oblon, McClelland, Maier & Neustadt, L.L.P.

(57) ABSTRACT

A system is described for generating one or more rewards for use in a first application on a user processing device in response to user engagement of a second application on the user processing device. The system comprises a user processing device and a reward server arrangement. The user processing device stores instructions defining a first application and a second application. The user processing device further stores instructions defining a content delivery and reward implementation module. The content delivery and reward implementation module is operable to display on a user processing device content obtained from a content and reward delivery server arrangement comprising at least one server, to obtain one or more content viewing rewards from the content and reward delivery server arrangement, and to make the one or more content viewing rewards available for use in the first application. The user processing device further stores instructions defining a monitoring module and a reward module. The instructions defining the monitoring module and the reward module are separate from the instruc- (Continued)

tions defining the first application and separate from the instructions defining the second application. The monitoring module is operable to determine a measure of an engagement of the second application by the user. The reward module is operable to calculate one or more engagement rewards in dependence upon the determined measure of engagement and to send reward data indicative of the one or more calculated engagement rewards to a reward server arrangement comprising at least the content and reward delivery server arrangement. The reward server arrangement is operable to receive reward data indicative of one or more calculated engagement rewards from the user processing device and to make the one or more engagement rewards available via the content and reward delivery server arrangement. The content delivery and reward implementation module is further operable to obtain the one or more engagement rewards from the content and reward delivery server arrangement, and to make the one or more engagement rewards available for use in the first application.

89 Claims, 39 Drawing Sheets

Related U.S. Application Data

(60) Provisional application No. 62/058,417, filed on Oct. 1, 2014.

(56) References Cited

U.S. PATENT DOCUMENTS

| | | | |
|---|---|---|---|
| 6,571,216 | B1 | 5/2003 | Garg et al. |
| 7,761,327 | B1 | 7/2010 | Hannah et al. |
| 8,090,618 | B1 | 1/2012 | Chu |
| 8,700,455 | B2 | 4/2014 | Michael |
| 8,814,703 | B2 | 8/2014 | McCaffrey et al. |
| 8,821,294 | B2 | 9/2014 | McCaffrey et al. |
| 8,825,525 | B2 | 9/2014 | Carpenter et al. |
| 8,834,276 | B2 | 9/2014 | McCaffrey et al. |
| 8,839,266 | B1 | 9/2014 | Partridge et al. |
| 2002/0002076 | A1 | 1/2002 | Schneier et al. |
| 2004/0092310 | A1 | 5/2004 | Brosnan et al. |
| 2004/0166931 | A1 | 8/2004 | Criss-Puszkiewicz et al. |
| 2006/0281541 | A1 | 12/2006 | Nguyen et al. |
| 2006/0287106 | A1 | 12/2006 | Jensen |
| 2008/0090628 | A1 | 4/2008 | Mueller et al. |
| 2008/0167106 | A1 | 7/2008 | Lutnick et al. |
| 2009/0239661 | A1* | 9/2009 | Acres .................. G07F 17/32 463/25 |
| 2009/0299817 | A1 | 12/2009 | Fok et al. |
| 2010/0146502 | A1 | 6/2010 | Zalewski |
| 2011/0250949 | A1 | 10/2011 | van Os et al. |
| 2012/0036003 | A1 | 2/2012 | Tong et al. |
| 2012/0315993 | A1 | 12/2012 | Dumont et al. |
| 2013/0006773 | A1 | 1/2013 | Lutnick et al. |
| 2013/0117084 | A1 | 5/2013 | Rooke et al. |
| 2013/0143669 | A1 | 6/2013 | Muller |
| 2013/0151342 | A1 | 6/2013 | Citron et al. |
| 2013/0185133 | A1 | 7/2013 | Tong et al. |
| 2013/0219426 | A1 | 8/2013 | Zweig et al. |
| 2013/0304580 | A1 | 11/2013 | Feadler et al. |
| 2013/0324259 | A1* | 12/2013 | McCaffrey ............. A63F 13/79 463/42 |
| 2013/0324260 | A1 | 12/2013 | McCaffrey et al. |
| 2013/0324261 | A1 | 12/2013 | McCaffrey et al. |
| 2013/0325573 | A1 | 12/2013 | Park et al. |
| 2013/0339228 | A1 | 12/2013 | Shuster et al. |
| 2014/0058811 | A1 | 2/2014 | Gorowitz et al. |
| 2014/0058812 | A1 | 2/2014 | Bender et al. |
| 2014/0089068 | A1 | 3/2014 | Yehezkel et al. |
| 2014/0164142 | A1 | 6/2014 | Yang |
| 2014/0278853 | A1 | 9/2014 | Brown et al. |
| 2014/0280896 | A1* | 9/2014 | Papakostas ............ H04W 4/50 709/224 |
| 2014/0337831 | A1 | 11/2014 | Katagai et al. |
| 2014/0342837 | A1 | 11/2014 | McCaffrey et al. |
| 2014/0342838 | A1 | 11/2014 | McCaffrey et al. |
| 2014/0344071 | A1 | 11/2014 | McCaffrey et al. |
| 2015/0046247 | A1 | 2/2015 | Rajappa |
| 2015/0065252 | A1 | 3/2015 | Ikeda |
| 2015/0120458 | A1* | 4/2015 | Lee .................... G06Q 30/0262 705/14.59 |
| 2015/0189377 | A1* | 7/2015 | Wheatley ......... H04N 21/44218 725/12 |
| 2016/0335316 | A1 | 11/2016 | Riva et al. |
| 2017/0178179 | A1* | 6/2017 | Bauman ............ G06Q 30/0244 |

FOREIGN PATENT DOCUMENTS

| | | | |
|---|---|---|---|
| WO | WO 2012/019072 A1 | 2/2012 | |
| WO | WO 2013/118629 A1 | 8/2013 | |
| WO | WO 2013/158033 A1 | 10/2013 | |
| WO | WO 2014/074945 A1 | 5/2014 | |

OTHER PUBLICATIONS

Partial European Search Report dated Feb. 9, 2015 in Patent Application No. 14172199.3.
Office Action dated Aug. 10, 2018 in co-pending U.S. Appl. No. 14/560,523, citing documents AA-AD therein, 13 pages.
Office Action dated Feb. 12, 2018 in co-pending U.S. Appl. No. 14/560,523, citing documents AA and AB therein, 48 pages.
Office Action dated Feb. 21, 2019 in European Patent Application No. 14 172 199.3, citing document AX therein.
"Inter-process communication", Wikipedia, version dated Apr. 18, 2014, < https://en. wikipedia.org/w/index. php?title=Inter-process_communication&oldid=604713283>.

\* cited by examiner

MONITORING AN APPLICATION ON A PROCESSING DEVICE AND GENERATING REWARDS

CLAIM OF PRIORITY

This patent application claims priority from U.S. Provisional Patent Application Ser. No. 62/058,417, filed on Oct. 1, 2014 and U.S. patent application Ser. No. 14/560,523, filed on Dec. 4, 2014. The full contents of both of these priority applications are incorporated herein by reference.

TECHNICAL FIELD

The present invention generally relates to monitoring an application on a processing device and generating rewards for use in a different application on the user processing device.

BACKGROUND

There has been growing interest in systems for promoting applications (commonly referred to as "apps"), which provide rewards in one application in connection with use of one or more other applications. Known systems of this kind are described, for example, in US 2013/0324259 A1 and US 2013/0324260 A1.

In known systems for promoting applications, multiple game servers are connected to a network. Each game server implements a different electronic game and provides the electronic game over the network to client devices used by players. Each game server is also connected to an aggregator server operating an aggregator database and a cross-promotional engine. The aggregator database stores information transmitted from the game servers. The information in the aggregator database is utilised by the cross-promotion engine, in conjunction with rules, to establish promotions between the various electronic games. The cross-promotion engine tracks a user's progress in an electronic game and registers rewards to the user in a different electronic game, such as virtual goods and virtual items, based on the user's progress.

These known systems suffer from a number of disadvantages, however. For example, one disadvantage is that, in order for a user to earn a reward, the game servers must be connected to the aggregator server so that the cross-promotion engine in the game server can track the user's progress in an electronic game and register a reward to the user in a different electronic game.

It would be desirable to monitor a user's engagement of an application and calculate a reward for use in a different application such that the monitoring and calculation are performed on the same user processing device on which the applications are run. It would further be desirable to monitor a user's engagement of an application and calculate a reward for use in a different application such that the applications do not need to be modified, or require only minimal modification.

SUMMARY

According to the present invention, there is provided a system operable to generate one or more rewards for use in a first application on a user processing device in response to user engagement of a second application on the user processing device. The system comprises a user processing device and a reward server arrangement. The user processing device stores instructions defining a first application and a second application. The user processing device further stores instructions defining a content delivery and reward implementation module. The content delivery and reward implementation module is operable to display on the user processing device content obtained from a content and reward delivery server arrangement comprising at least one server, to obtain one or more content viewing rewards from the content and reward delivery server arrangement, and to make the one or more content viewing rewards available for use in the first application. The user processing device further stores instructions defining a monitoring module and a reward module. The instructions defining the monitoring module and the reward module are separate from the instructions defining the first application and separate from the instructions defining the second application. The monitoring module is operable to determine a measure of an engagement of the second application by the user. The reward module is operable to calculate one or more engagement rewards in dependence upon the determined measure of engagement and to send reward data indicative of the one or more calculated engagement rewards to a reward server arrangement comprising at least the content and reward delivery server arrangement. The reward server arrangement is operable to receive reward data indicative of one or more calculated engagement rewards from the user processing device and to make the one or more engagement rewards available via the content and reward delivery server arrangement. The content delivery and reward implementation module is further operable to obtain the one or more engagement rewards from the content and reward delivery server arrangement and to make the one or more engagement rewards available for use in the first application.

The present invention also provides a user processing device operable to generate one or more rewards for use in a first application on the user processing device in response to user engagement of a second application on the user processing device. The user processing device stores instructions defining a content delivery and reward implementation module operable to display on the user processing device content obtained from a content and reward delivery server arrangement comprising at least one server, to obtain one or more content viewing rewards from the content and reward delivery server arrangement, and to make the one or more content viewing rewards available for use in the first application. The user processing device further stores instructions separate from the first application and separate from the second application defining a monitoring module operable to determine a measure of an engagement of the second application by the user, and a reward module operable to calculate one or more engagement rewards in dependence upon the determined measure of engagement and to send reward data indicative of the one or more calculated engagement rewards to a reward server arrangement comprising at least the content and reward delivery server arrangement. The content delivery and reward implementation module is further operable to obtain the one or more engagement rewards from the content and reward delivery server arrangement and to make the one or more engagement rewards available for use in the first application.

The present invention also provides a method of generating one or more rewards for use in a first application on a user processing device in response to user engagement of a second application on the user processing device. In the method, a content delivery and reward implementation module on the user processing device obtains content from a content and reward delivery server arrangement comprising at least one server, and displays the content on the user processing device. The content delivery and reward implementation module obtains one or more content viewing rewards from the content and reward delivery server arrangement, and makes the one or more content viewing rewards available for use in the first application on the user processing device. A monitoring module, separate from the first application and the second application, determines a measure of an engagement of the second application by the user. A reward module, separate from the first application and the second application, calculates one or more engagement rewards in dependence upon the determined measure of engagement and sends reward data indicative of the one or more calculated engagement rewards to a reward server arrangement comprising at least the content and reward delivery server arrangement. The content delivery and reward implementation module obtains the one or more engagement rewards from the content and reward delivery server arrangement and makes the one or more engagement rewards available for use in the first application.

The present invention also provides a user processing device operable to generate one or more rewards for use in a first application on the user processing device in response to user engagement of a second application on the user processing device. The user processing device stores instructions separate from the first application and separate from the second application defining a monitoring module operable to determine a measure of an engagement of the second application by the user, and a reward module operable to calculate one or more engagement rewards in dependence upon the determined measure of engagement and to send reward data indicative of the one or more calculated engagement rewards to a reward server arrangement.

The present invention also provides a method of generating one or more rewards for use in a first application on a user processing device in response to user engagement of a second application on the user processing device. In the method, a monitoring module, separate from the first application and the second application, determines a measure of an engagement of the second application by the user. A reward module, separate from the first application and the second application, calculates one or more engagement rewards in dependence upon the determined measure of engagement and sends reward data indicative of the one or more calculated engagement rewards to a reward server arrangement.

The present invention further provides a non-transitory storage medium storing computer program instructions which, when executed by a processing device that has first application instructions, separate from the computer program instructions, defining a first application and second application instructions, separate from the computer program instructions, defining a second application, cause the processing device to determine a measure of an engagement of the second application by the user, calculate one or more engagement rewards in dependence upon the determined measure of engagement, and send reward data indicative of the one or more calculated engagement rewards to a reward server arrangement.

BRIEF DESCRIPTION OF THE DRAWINGS

Embodiments of the invention will now be described in detail, by way of example only, with reference to the accompanying drawings, in which.

DETAILED DESCRIPTION

Although embodiments of the invention will be described below, it will be evident that various modifications may be made to these embodiments without departing from the broader spirit and scope of the invention. Accordingly, the following description and the accompanying drawings are to be regarded as illustrative rather than restrictive.

In the following description and in the accompanying drawings, numerous details are set forth in order to provide an understanding of various embodiments of the invention. However, it will be evident to those skilled in the art that embodiments may be practiced without these details.

As used herein, the term "user" may be construed to include a person, a machine, or the combination of a person and a machine.

Reference is made in the following to applications or "apps". These applications may take many forms and may have many different purposes. An example is provided of the applications being electronic games, but this is merely one example and should not be regarded as restrictive.

Figure 1:
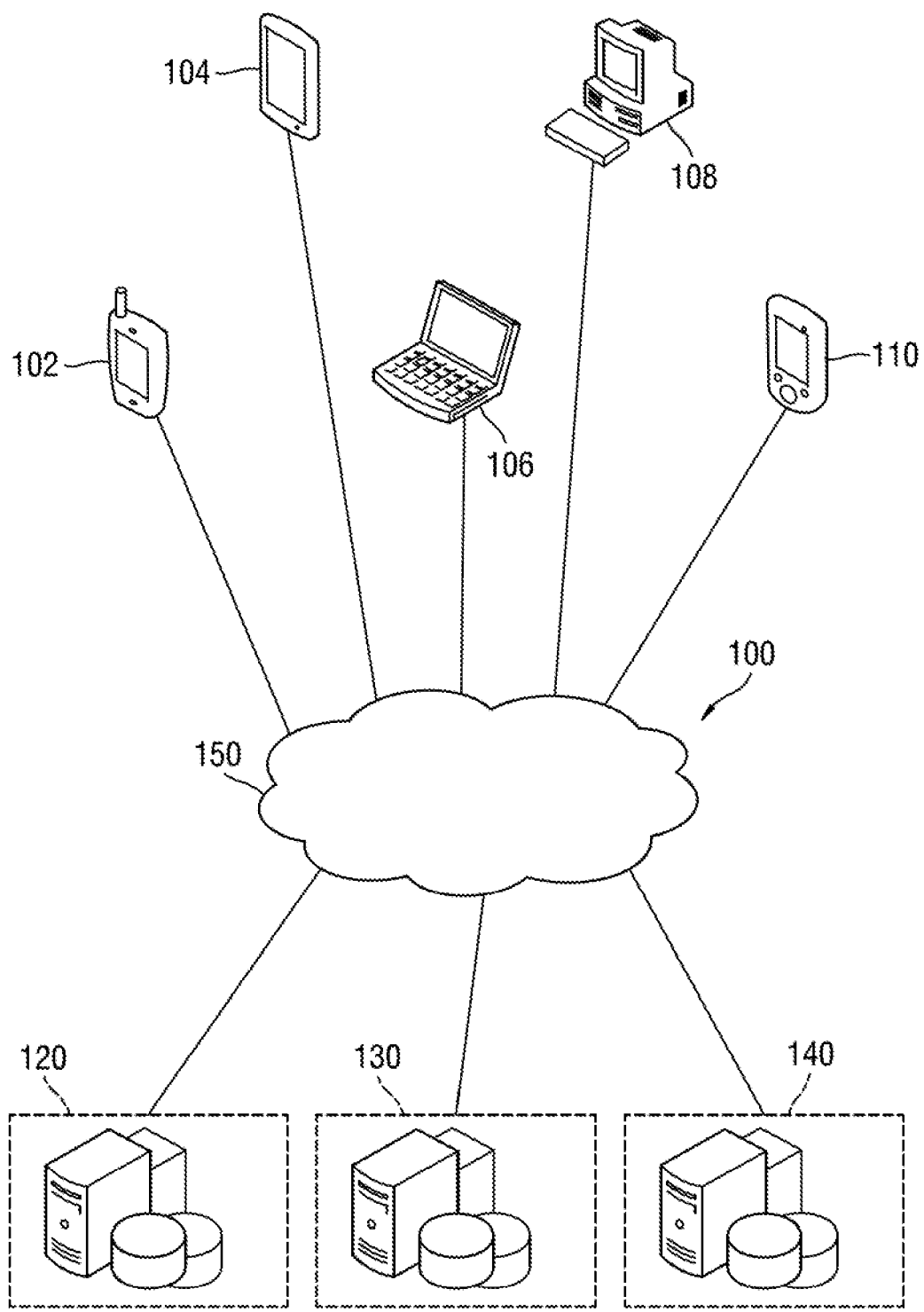
FIG. 1 is a schematic diagram showing an example of a system in which various embodiments of the invention may be practised.

FIG. 1 is a schematic diagram showing an example of a system 100 in which various embodiments of the invention may be practised. In the example, a plurality of user processing devices 102, 104, 106, 108, 110 communicate with an application download server arrangement 120 comprising at least one server, a content and reward delivery server arrangement 130 comprising at least one server, and an engagement reward server arrangement 140 comprising at least one server, via a network 150. Five user processing devices are shown in FIG. 1 by way of example, although there may be more than this or fewer. The skilled person will understand that details of each server arrangement described herein, such as the number of servers used, the geographic or network location (or locations) of the server(s), and individual servers' processing capacities and capabilities may be freely chosen so long as the server arrangement meets its functional requirements as described below. Additionally, application download server arrangement 120, content and reward delivery server arrangement 130 and engagement reward server arrangement 140 may comprise entirely separate arrangements of servers, or one or more individual servers may be part of more than one server arrangement.

Aspects of the configuration and processing operations of each user processing device 102, 104, 106, 108, 110, application download server arrangement 120, content and reward delivery server arrangement 130 and engagement reward server arrangement 140 that are helpful for understanding embodiments of the present invention are described in detail below, while description of other aspects, which will be familiar to those skilled in the art, is omitted for the sake of clarity.

The network 150 may comprise one or more networks, such as the Internet, a telephone network, a cellular data network, etc. The network 150 may also comprise a virtual private network (VPN), a local area network (LAN), a wide area network (WAN), or any other form of network.

Each user processing device may comprise any processing device that can run applications, such as a smartphone 102, a tablet computer 104, a laptop computer 106, a desktop computer 108, a games console 110, or some other form of processing device such as a personal digital assistant, a smart watch, etc. Each of the user processing devices communicates with the network 150 through any suitable communication link, such as wireless communication link (for example a Wi-Fi or cellular telephone data link) or a wire, fibre-optic cable, etc. Each communication link may not be permanent.

As will be explained in more detail below, a user processing device 102, 104, 106, 108, 110 runs a first application that can be used by a user of the processing device. The computer program instructions defining the first application may be pre-installed on the user processing device (for example by the manufacturer of the user processing device or by a distributor of the user processing device) or the instructions may be downloaded by the user from an application download server arrangement 120 such as the iTunes Store, the Google Play Store or the like.

In addition to instructions defining the first application, content delivery and reward implementation instructions are also provided on the user processing device. The content delivery and reward implementation instructions may be part of the instructions defining the first application, they may be separate therefrom or they may comprise some instructions that are part of the first application and some instructions that are separate. The content delivery and reward implementation instructions may be third party instructions provided as part of a third party Software Development Kit (SDK) or they may be instructions provided by the developer of the first application. Execution of the content delivery and reward implementation instructions causes content to be offered to the user that may be viewed in exchange for content-viewing rewards which are made available to the user for use in the first application. By way of non-limiting example, the first application may be an electronic game and the content offered to the user may be an advertisement video. If the user accepts the offer, the content delivery and reward implementation instructions download the video data from the content and reward delivery server arrangement 130, play back the video data on the user processing device so that it can be viewed by the user, and notify the content and reward delivery server arrangement 130 that play back has occurred. The content and reward delivery server arrangement 130 then allocates one or more rewards to the user for use in the first application. The reward(s) may take any form appropriate for the first application. Thus, by way of example, if the first application is an electronic game, a reward may take the form of points, additional lives, coins, jewels, moves, bonus content, or any other asset with value to the user in the electronic game. Different applications may have different rewards. When the first application is next started (or at some other time during use of the first application) the content delivery and reward implementation instructions communicate with the content and reward delivery server arrangement to obtain any rewards that are available, and make the rewards available to the user in the first application.

The content delivery and reward implementation instructions may monitor the display of the content on the user processing device. For example, if the content is in the form of a video, the content delivery and reward implementation instructions may track how much of the video has played and inform the content and reward delivery server arrangement that play back has occurred when the video has finished or when a certain amount (e.g. 30 seconds) of video content has played. The size of the reward may depend upon the extent of the content played back or the size of the reward may be fixed.

Separately from the first application, second applications are promoted to the user, for example by informing the user that the use of a second application will generate engagement rewards that the user may utilise in the first application. These promotions may be used to promote second applications from third parties and/or second applications from the same developer as the first application. The promotions may be used to promote second applications that are not installed on the user processing device and/or second applications that are already installed on the user processing device so as to engage and/or re-engage the user with the already-installed second applications (in this regard, the already-installed second applications may or may not have been previously promoted). The promotions may be cross-promotions. Accordingly, the terms "promotion", "promotions", "promoted" and the like as used herein should be understood to encompass all of the above types of promotions as well as any other form of promotions.

By way of example, the user can download computer program instructions defining a promoted second application onto the user processing device for example by downloading it from an application download server arrangement 120 such as the iTunes Store, the Google Play Store or the like. Once available on the user processing device, the user can engage the second application to earn one or more engagement rewards that the user can utilise in the first application. Each such second application is therefore referred to herein as a second application, a promoted application or a reward-generating application.

As noted above, it would be desirable to monitor a user's engagement of a second application and calculate a reward for use in a different application such that the monitoring and calculation are performed on the same user processing device on which the first and second applications are run. It would also be desirable to perform the monitoring and calculation such that the first and second applications do not need to be modified, or require only minimal modification.

Therefore, as will be explained in more detail below, in certain embodiments of the present invention, the user processing device stores instructions to perform the monitoring and reward calculation that are separate from the first application and separate from the second application. These separate instructions determine a measure of an engagement of the user with the second application (for example, a measure of the length of time that the user may be engaged with the second application), calculate one or more engagement rewards for use in the first application in dependence upon the determined measure of engagement, and send reward data indicative of the calculated engagement reward(s) to a reward server arrangement comprising at least the content and reward delivery server arrangement 130. The content and reward delivery server arrangement 130 then makes the engagement reward(s) (earned by the user engaging with a promoted second application) available along with any content rewards (earned by the user viewing content, as described above). The content delivery and reward implementation instructions can then obtain the engagement reward(s) (and also any content reward(s)) from the content and reward delivery server arrangement 130, and make the rewards available in the first application. In this way, the engagement reward(s) can be made available in the first application without the need to modify, or at least without the need to modify in an extensive way, the first application. The reader will appreciate that this is an unconventional use of the content and reward delivery server arrangement 130, which conventionally only makes content viewing rewards available in a first application in response to the user viewing content.

The user can engage with the second application and earn one or more engagement rewards for use in the first application without the need for the user processing device to have a connection to the network 150 (or any other network), and without the need for the user processing device to have a connection to an application download server arrangement 120, to a content and reward delivery server arrangement 130, or to an engagement reward server arrangement 140. The user can then utilise the earned engagement reward(s) in the first application as soon as the user processing device has connected to the network 150 and the engagement reward(s) have been sent to the first application via content and reward delivery server arrangement 130.

The size of an engagement reward, or the number of engagement rewards, may be based on the determined measure of engagement of the user with the second application. Alternatively, the size of the engagement reward, or the number of engagement rewards, may be fixed and it may be determined whether the determined measure of engagement achieves a necessary threshold for the user to earn the engagement reward(s).

By way of non-limiting example, if the first application is an electronic game, then engagement rewards may take the form of points, additional lives, coins, jewels, moves, bonus content or any other asset with value to the user in the first electronic game. It should be noted that the type of a content-viewing reward and the type of an engagement reward may be the same or may differ. Furthermore, although an example has been given of engagement rewards that can be used in a first application comprising an electronic game, it will be appreciated that the teachings herein are more generally applicable to any other kind of first application. For example, the first application may be an application for booking holidays and the second application may be a review application for leaving reviews of hotels advertised in the holiday booking application, where engagement of the review application by the user is effective to generate an engagement reward in the form of a discount for use in the holiday booking application.

Figure 2:
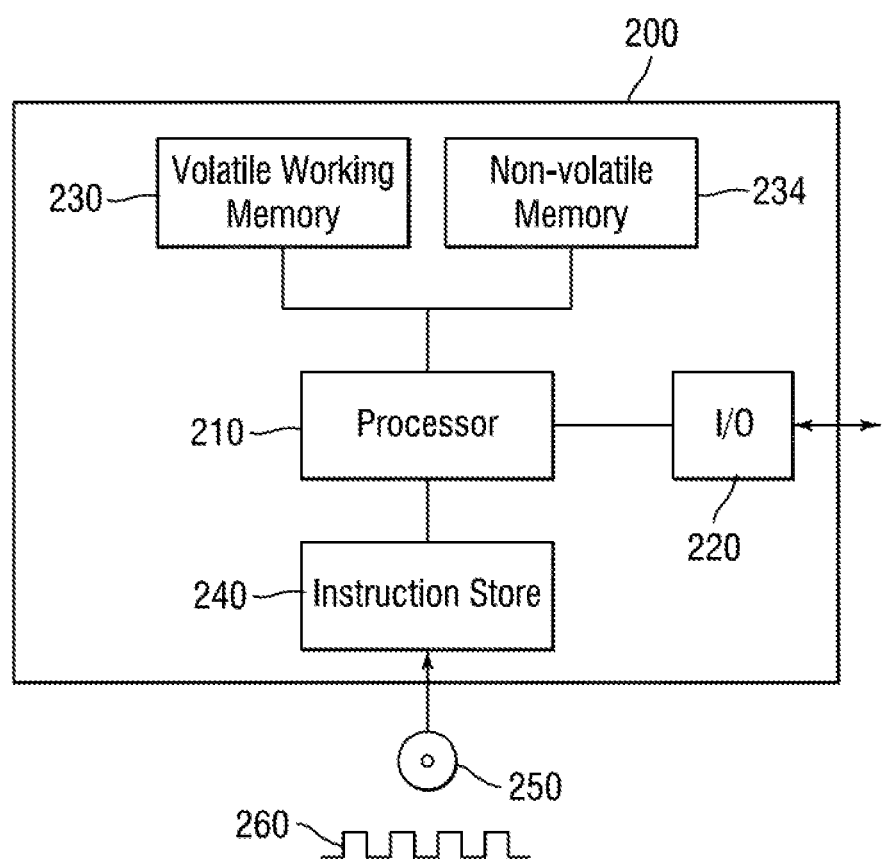
FIG. 2 schematically shows an example of a general kind of programmable processing apparatus that may be used to implement a user processing device or a server in embodiments of the invention.

Referring now to FIG. 2, an example of a general kind of programmable processing apparatus 200 that may be used to implement a user processing device or a server in embodiments of the invention is shown.

The programmable processing apparatus 200 comprises one or more processors 210, one or more input/output communication modules 220, one or more volatile working memories 230, one or more non-volatile memories 234 and one or more instruction stores 240 storing computer-readable instructions which can be executed by a processor 210 to effect the functional processing modules and to perform the processing operations as described hereinafter.

At least one input/output communication module 220 comprises apparatus for communicating with network 150 which, as stated previously, may comprise one or more networks, such as the Internet, a telephone network, a cellular data network, a virtual private network (VPN), a local area network (LAN), a wide area network (WAN), or any other form of network. At least one input/output communication module 220 comprises apparatus for communicating with an input device such as a keyboard or game controller, and an output device such as a display screen, projector, etc.

An instruction store 240 is a non-transitory storage medium, which may comprise a non-volatile memory, for example in the form of a read-only-memory (ROM), a magnetic computer storage device (for example a hard disk) or an optical disk, which is pre-loaded with the computer-readable instructions. Alternatively, an instruction store 240 may comprise writeable memory, such as random access memory (RAM) and the computer-readable instructions can be input thereto from a computer program product, such as a non-transitory computer-readable storage medium 250 (for example an optical disk such as a CD-ROM, DVD-ROM, etc.) or a computer-readable signal 260 carrying the computer-readable instructions.

The computer-readable instructions comprise monitoring instructions which, when executed, cause the user processing device to implement a monitoring module, and reward instructions which, when executed, cause the user processing device to implement a reward module. The computer-readable instructions may also comprise first application instructions defining a first application which, when executed, cause the user processing device to implement the first application, content delivery and reward implementation instructions which, when executed, cause the user processing device to implement a content delivery and reward implementation module and second application instructions defining a second application and which, when executed, cause the user processing device to implement the second application.

Figure 3:
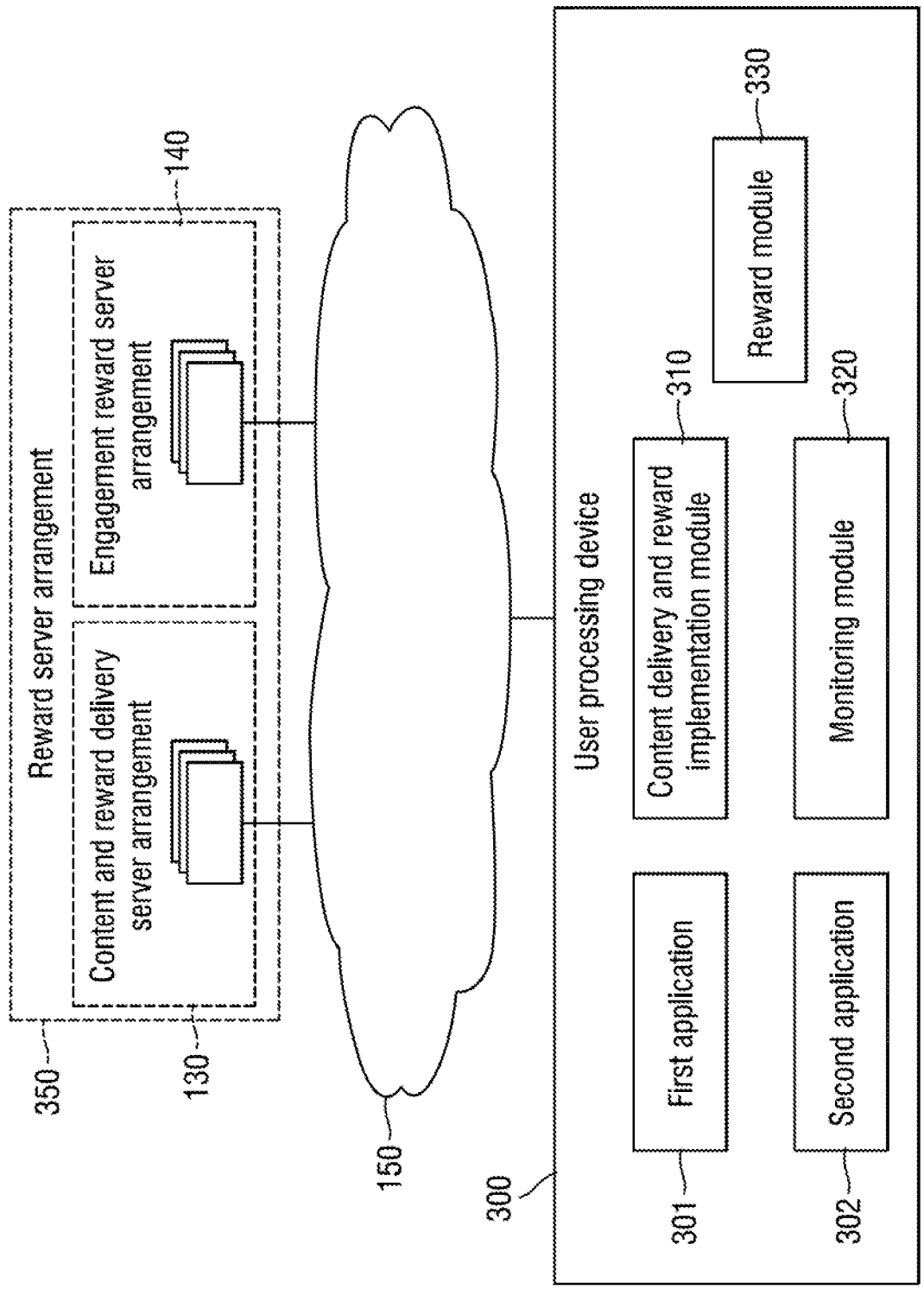
FIG. 3 provides a more detailed functional view of part of the system of FIG. 1, illustrating the functional modules of a user processing device and a reward server arrangement.

FIG. 3 provides a more detailed functional view of the system of FIG. 1 according to certain embodiments of the present invention, showing the functional processing modules of a single user processing device 300 (which represents any user processing device 102, 104, 106, 108, 110), as well as the network 150, and a server arrangement 350 comprising the content and reward delivery server arrangement 130 and the engagement reward server arrangement 140.

Referring to FIG. 3, the user processing device stores instructions defining a first application 301 and a second application 302, as well as functional processing modules comprising a content delivery and reward implementation module 310, a monitoring module 320, and a reward module 330.

The functionality of the first application 301 depends upon the nature of the first application 301. For example, if the first application 301 is an electronic game, then the first application 301 implements the game rules defining, inter alia, the structural setup of the game that allows user choice making to occur and determines how the game play evolves from the beginning to the end in response to play actions and decisions. The functionality of the second application 302 depends on the second application's nature, and may be the same as, similar to, or entirely unrelated to the functionality of the first application 301.

The instructions defining the content delivery and reward implementation module 310 may be part of the instructions defining the first application, may be separate therefrom, or they may comprise some instructions that are part of the first application and some instructions that are separate therefrom. For example, the instructions defining the content delivery and reward implementation module may be part of the first application or may be a separate application, they may be an SDK, they may be a part of the operating system of the user processing device 300, or they may be part of a device vendor services API if the user processing device provides this. If the instructions defining the content delivery and reward implementation module are separate from the first application instructions, the content delivery and reward implementation module may be controlled by the first application.

The content delivery and reward implementation module is operable to communicate with the content and reward delivery server arrangement 130, to display content obtained from the content and reward delivery server arrangement on the user processing device, and to make one or more content viewing rewards available for use in the first application by obtaining one or more content viewing rewards from the content and reward delivery server arrangement. The content delivery and reward implementation module is further operable to communicate with the content and reward delivery server arrangement to obtain one or more engagement rewards and to make the one or more engagement rewards available for use in the first application (each engagement reward having been earned by the user by engaging with a second application, for example as described above).

Monitoring module 320 is operable to determine a measure of an engagement of a second application by the user. Optionally, monitoring module 320 may be further operable to determine that a session in the first application 301 has ended. The instructions defining monitoring module 320 are separate from the instructions defining the first application and the second application. This provides a number of advantages. For example, it is not necessary to modify or supplement the instructions of the first application or the second application in order for the monitoring to be performed. The instructions defining the monitoring module 320 may additionally be separate from the instructions defining the content delivery and reward implementation module 310. The instructions defining the monitoring module may be part of the instructions defining the operating system of the user processing device, they may define a separate application on the user processing device, or they may be part of a further application on the user processing device. In the latter two cases, the monitoring module may interface with the operating system of the user processing device to determine therefrom a measure of the engagement of the second application by the user.

Reward module 330 is operable to calculate one or more engagement rewards in dependence upon the measure of engagement of a user with a second application determined by the monitoring module 320. Reward module 330 is further operable to send data indicative of the one or more calculated engagement rewards to the reward server arrangement 350, for example to the engagement reward server arrangement 140 therein or directly to the content and reward delivery server arrangement 130. The instructions defining the reward module 330 may be separate from the instructions defining the content delivery and reward implementation module 310. The instructions defining the reward module 330 may be part of the instructions defining the operating system of the user processing device, they may define a separate application on the user processing device, or they may be part of a further application on the user processing device. The instructions defining the reward module 330 may be separate from the instructions defining the monitoring module 320. Alternatively, the instructions defining the monitoring module 320 and the reward module 330 may be one set of instructions.

Optionally, reward module 330 may be further operable to present offers to the user. The offers presented to the user may comprise offers of content, such as video advertisements, which may be viewed by the user in exchange for rewards.

The reward module and the monitoring module each comprise a number of functional processing modules. The functional processing modules of the reward module and the monitoring module differ in different embodiments, as will now be described. As noted above, the second application need not be modified to incorporate any additional modules beyond the module or modules to implement the second application. Accordingly, as the structure and processing operations of the second application may be conventional, they will not be described in the following.

First Embodiment

Figure 4:
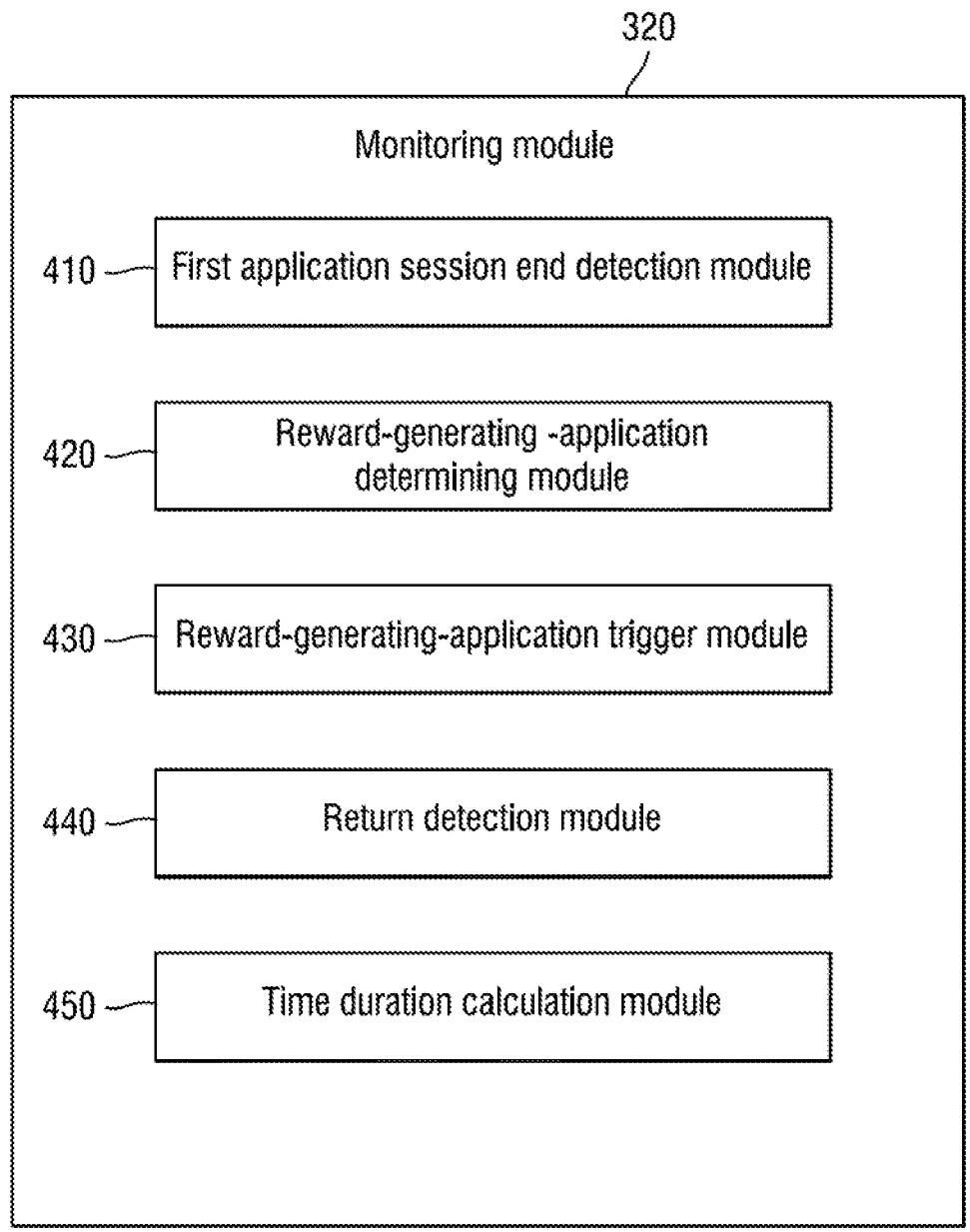
FIG. 4 schematically illustrates functional processing modules of a monitoring module in the first embodiment.

FIG. 4 schematically illustrates the functional processing modules of monitoring module 320 in a first embodiment.

Referring to FIG. 4, the monitoring module 320 of the first embodiment comprises a first application session end detection module 410, a reward-generating-application determining module 420, a reward-generating-application trigger module 430, a return detection module 440, and a time duration calculation module 450.

First application session end detection module 410 is operable to detect an end of a session in a first application 301.

Reward-generating-application determining module 420 is operable to determine a reward-generating application (second application) to be monitored.

Reward-generating-application trigger module 430 is operable to trigger activation of a reward-generating application, and to store a value indicative of the time at which activation of the reward generating application is triggered.

Return detection module 440 is operable to detect when the user returns to the first application 301, and to store a value indicative of the time at which the user returns to the first application.

Time duration calculation module 450 is operable to calculate a measure of an engagement of a second application by the user, the measure comprising a measure of time between the time at which activation of the reward-generating application was triggered and the time at which the user returned to the first application.

Figure 5:
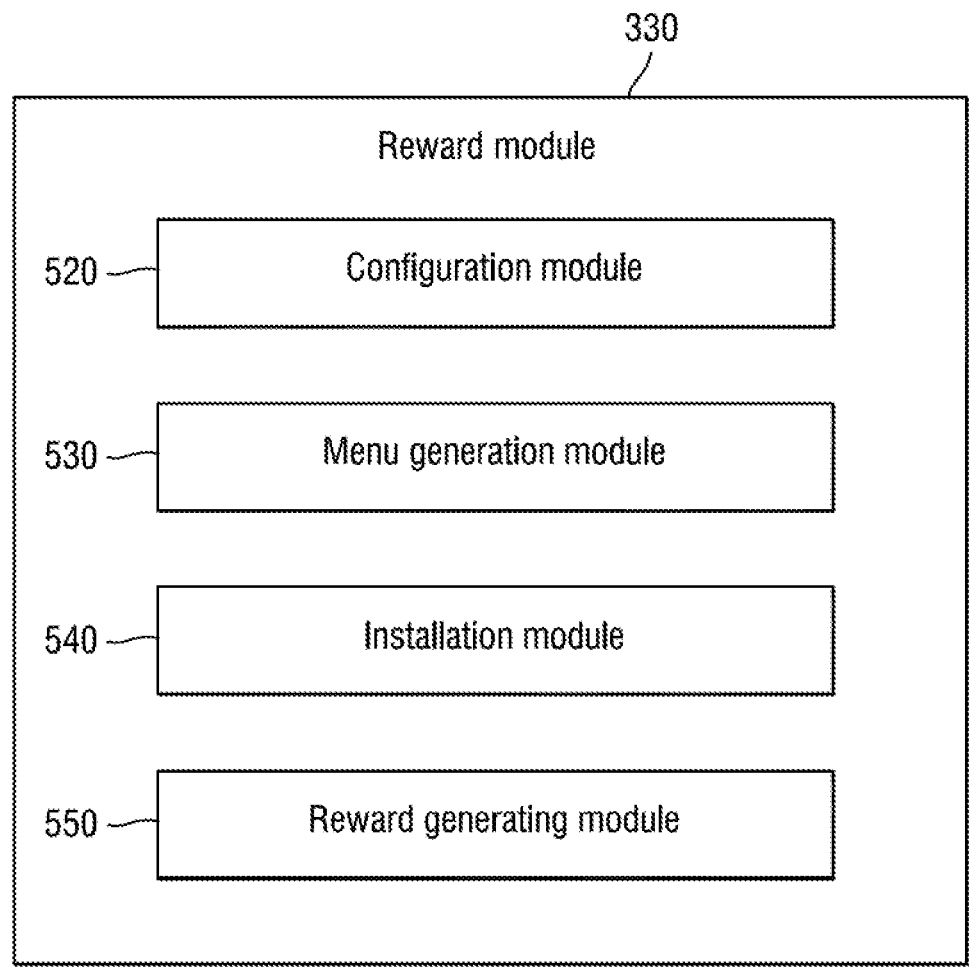
FIG. 5 schematically illustrates functional processing modules of a reward module in the first embodiment.

FIG. 5 schematically illustrates the functional processing modules of reward module 330 in the first embodiment.

Referring to FIG. 5, the reward module 330 of the first embodiment comprises a configuration module 520, a menu generation module 530, an installation module 540, and a reward generating module 550.

Configuration module 520 is operable to communicate with engagement reward server arrangement 140 in order to obtain configuration data, and to store the configuration data in a volatile working memory 230 and/or a non-volatile memory 234 of the user processing device. If the user processing device 300 does not have a connection to network 150, previously obtained and stored configuration data may be utilised until configuration module 520 can update the configuration data the next time the user processing device 300 establishes a connection with the network 150.

The configuration data in this embodiment comprises data defining one or more second applications that are currently being promoted as reward-generating applications for the first application 301 on the user processing device, and also conversion data defining a conversion from a measure of engagement of the user with a second application to one or more rewards in the first application. The conversion data may impose a maximum for the reward(s) that can be earned and may also impose a minimum for the reward(s) that can be earned. Optionally, the configuration data may also comprise data defining content offers, as explained later.

Menu generation module 530 is operable to generate and display a menu of second applications (reward generating applications) that the user may select from. This menu includes each second application identified in the configuration data that was obtained from engagement reward server arrangement 140. The second applications identified in the configuration data, and therefore in the menu generated and displayed by menu generation module 530, may include second applications that are not installed on the user processing device but are available for download, and/or second applications that are already installed on the user processing device. The menu generated by menu generation module 530 may take any form, such as a list, table, game wall, or any other display format which identifies reward-generating applications to the user. Each second application in the menu may be represented in any form, for example by a name or by an icon.

Installation module 540 is operable to facilitate the installation of a second application that is downloaded from application download server arrangement 120 onto the user processing device.

Reward generating module 550 is operable to calculate one or more engagement rewards for use by the user in the first application, in dependence upon a measure of engagement determined by the monitoring module 320. Reward generating module 550 is further operable to communicate with the reward server arrangement 350. In particular, reward generating module 550 is configured to send reward data indicative of one or more engagement rewards to the content and reward delivery server arrangement 130 and/or to the engagement reward server arrangement 140. If the reward generating module 550 sends reward data to the engagement reward server arrangement 140, the engagement reward server arrangement is configured to forward the reward data to the content and reward delivery server arrangement 130. If the user processing device 300 does not have a connection to network 150, reward data may be stored on the user processing device 300 and sent to the reward server arrangement 350 the next time the user processing device 300 establishes a connection with the network 150.

The processing operations performed by the content delivery and reward implementation module 310 on user processing device 300 and by the content and reward delivery server arrangement 130 will now be described with reference to FIGS. 6 and 7. Within these figures, and subsequent figures illustrating processing operations, the identity of the apparatus performing each processing operation can be determined from the heading at the top of the column in which the processing operation is shown.

Figure 6A:
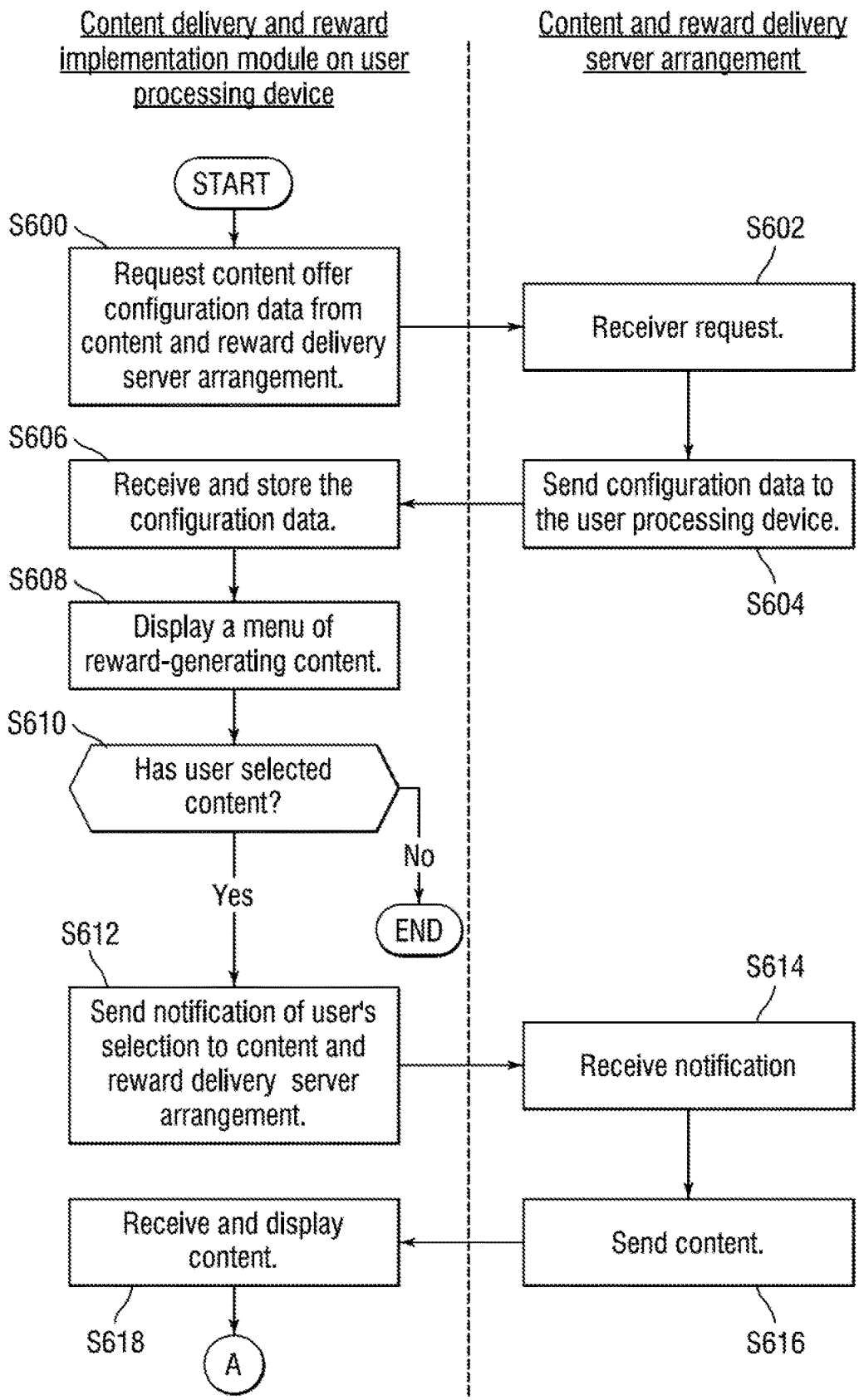
FIG. 6A and FIG. 6B show processing operations performed by the content delivery and reward implementation module on a user processing device and by a content and reward delivery server arrangement in embodiments of the invention, the operations being performed in order to generate content viewing rewards for users of the first application who view reward-generating content.
Figure 6B:
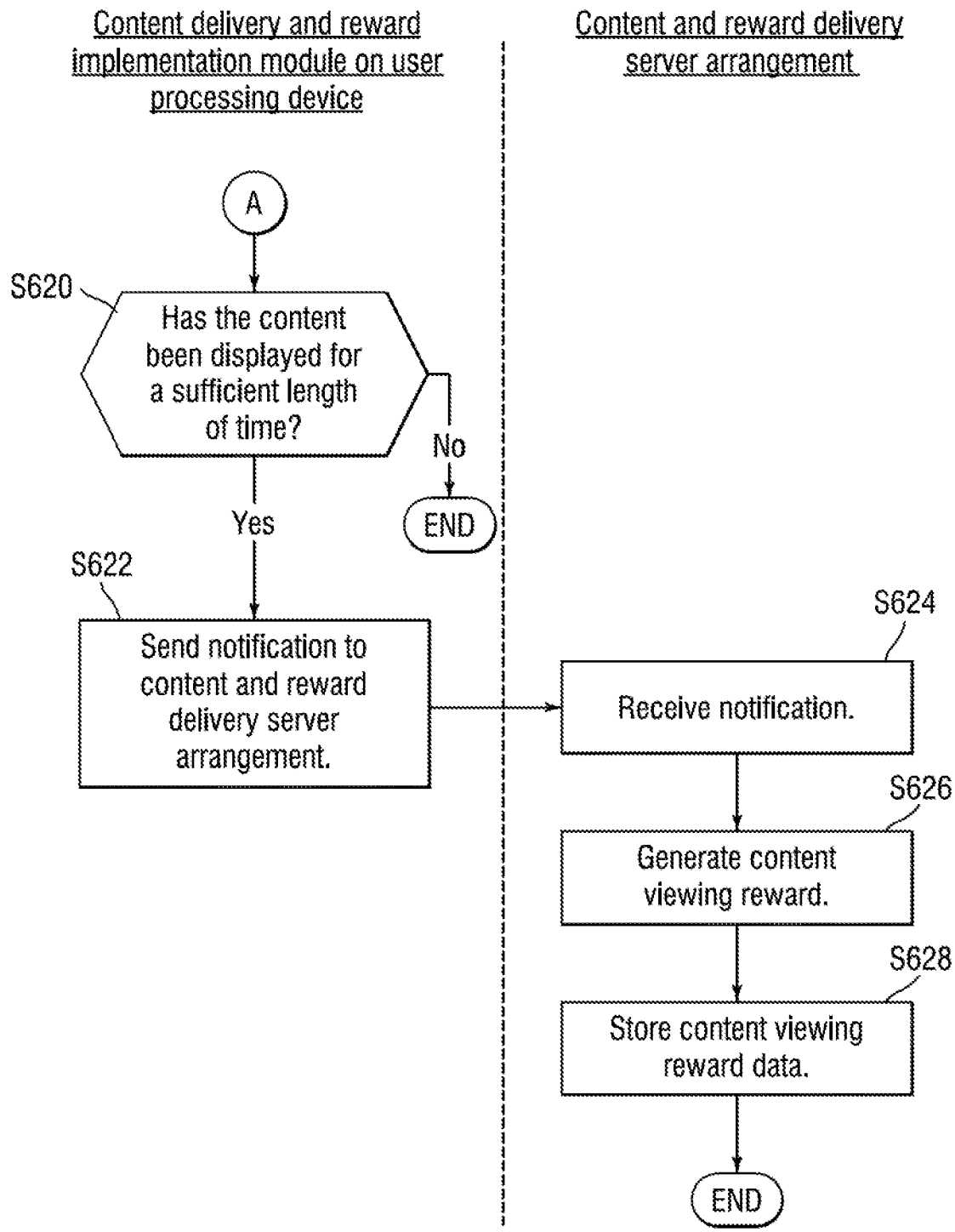
Figure 7:
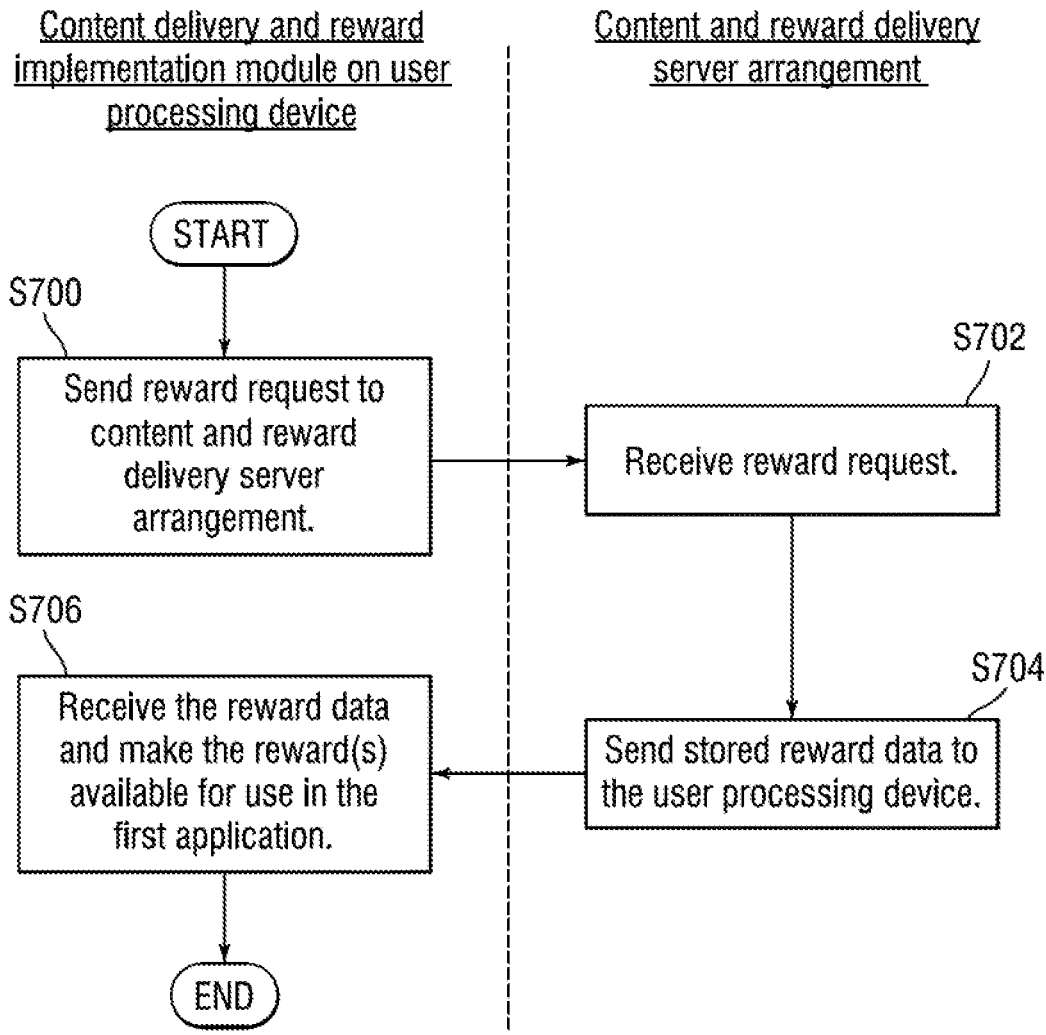
FIG. 7 shows processing operations performed by the content delivery and reward implementation module on a user processing device and by a content and reward delivery server arrangement in embodiments of the invention, the operations being performed in order to make rewards earned by users available for use in the first application.

Referring to FIG. 6A, at step S600, content delivery and reward implementation module 310 on user processing device 300 requests content offer configuration data from content and reward delivery server arrangement 130.

At step S602, the request for content offer configuration data is received by the content and reward delivery server arrangement 130 and, at step S604, the content and reward delivery server arrangement 130 sends configuration data to the requesting user processing device 300. The configuration data in this embodiment comprises data defining one or more content offers. For each offer, the configuration data may define, for example, content to be viewed (such as a video advertisement) and the nature and amount of a reward that will be provided in the first application if the user views the offered content.

The request for configuration data transmitted at step S600 and the configuration data transmitted at step S604 may be secured by encryption, using techniques well known to those skilled in the art.

At step S606, the configuration data sent by the content and reward delivery server arrangement 130 is received by content delivery and reward implementation module 310 and stored in a volatile working memory 230 and/or a non-volatile memory 234 of the user processing device 300 (the data stored in volatile working memory 230 can be used in a current session and the data stored in non-volatile memory 234 can be used in one or more future sessions until new configuration data is received from an content and reward delivery server arrangement 130).

The configuration data may be stored on the user processing device 300 and updated periodically, or may be requested before every time the menu is generated. Accordingly, the content being promoted can be changed by changing the configuration data. Furthermore, the promotion of certain content may be time-limited and may be ended by removing the identification of the content from the configuration data or by associating a time limit, expiry date, etc. with a piece of content in the configuration data for the user processing device to check.

Although not shown in FIG. 6A, steps S600, S602, S604 and S606 may be repeated at regular intervals in order to obtain up-to-date configuration data from content and reward delivery server arrangement 130.

At a predetermined time or event in the first application 301 (for example, when the first application starts, when the user has completed a predetermined task such as completing a level in an electronic game, when the user has used the first application for a predetermined length of time, when the user makes an in-app purchase when the user finishes a session in the first application, or when the first application ends) or at a time or event in the first application that has been randomly selected by the first application or by the user (for example by the user selecting an icon displayed by the first application or by the user entering a specific menu that is part of the first application), the first application 301 controls the content delivery and reward implementation module 310 to display to the user at step S608 a menu of the content offers received from the content and reward delivery server arrangement 130. The menu may take any form such as a list, table, wall or any other display format. Each content offer in the menu may be represented in any way, for example by a name and/or by an icon. In the present embodiment, the menu is displayed with one or more messages informing the user that one or more rewards for use in the first application 301 can be obtained by selecting and viewing one or more of the reward-generating content offers appearing in the menu. The message also gives the user an option of declining to select a reward-generating content offer, and instead returning to the first application 301.

At step S610, the content delivery and reward implementation module 310 determines whether the user has selected a reward-generating content offer from the displayed menu. If the user has not selected a reward-generating content offer, then processing ends. On the other hand, if the user has selected a reward-generating content offer from the menu (for example by selecting the name or the icon of a reward-generating content offer in the menu), then, at step S612, content delivery and reward implementation module 310 sends a notification of the user's selection to the content and reward delivery server arrangement 130. At step S614, content and reward delivery server arrangement 130 receives the selection notification and, at step S616, sends the selected content to the user processing device 300. At step S618, content delivery and reward implementation module 310 receives the content and displays it on user processing device 300. By way of example, if the content comprises a video advertisement, it may be displayed by a media player to show the video on the display screen of user processing device 300.

At step S620, content delivery and reward implementation module 310 determines whether the content has been displayed for a length of time sufficient for the user to earn a reward. For example, the user may be required to view content (such as a video advertisement) for a predetermined period of time (such as 30 seconds, 60 seconds, etc) or until the end. If it is determined at step S620 that the content has not been displayed for the necessary length of time, then processing ends. On the other hand, if it is determined that the content has been displayed for the necessary length of time, processing proceeds to step S622, at which content delivery and reward implementation module 310 sends a notification to content and reward delivery server arrangement 130.

At step S624, content and reward delivery server arrangement 130 receives the notification from reward implementation module 310. At step S626, content and reward delivery server arrangement 130 generates one or more content viewing rewards and, at step S628, stores data defining the generated content viewing reward(s).

A method performed by content delivery and reward implementation module 310 for the provision of rewards to a user for use in a first application 301 will now be described with reference to FIG. 7. The method may be performed at any appropriate time, such as when the first application 301 starts, when the first application 301 resumes, repeatedly while the first application 301 is proceeding, and/or it may be performed repeatedly in the background, even when the first application is not proceeding.

At step S700, content delivery and reward implementation module 310 sends a notification to content and reward delivery server arrangement 130 indicating a request for any rewards for use in the first application 301. The notification comprises an identifier for the user processing device 300 and/or the user, and also an identifier for the first application 301.

At step S702, content and reward delivery server arrangement 130 receives the notification, and, at step S704, sends a response to the user processing device 300 which contains reward data defining one or more rewards associated with the user processing device 300 and/or the user, and also with the first application 301.

At step S706, content delivery and reward implementation module 310 receives the reward data and makes the reward(s) available for use in the first application 301.

FIGS. 8A, 8B, 8C and 9 show processing operations performed by a monitoring module 320, a reward module 330 and an engagement reward server arrangement 140 in the first embodiment.

Figure 8A:
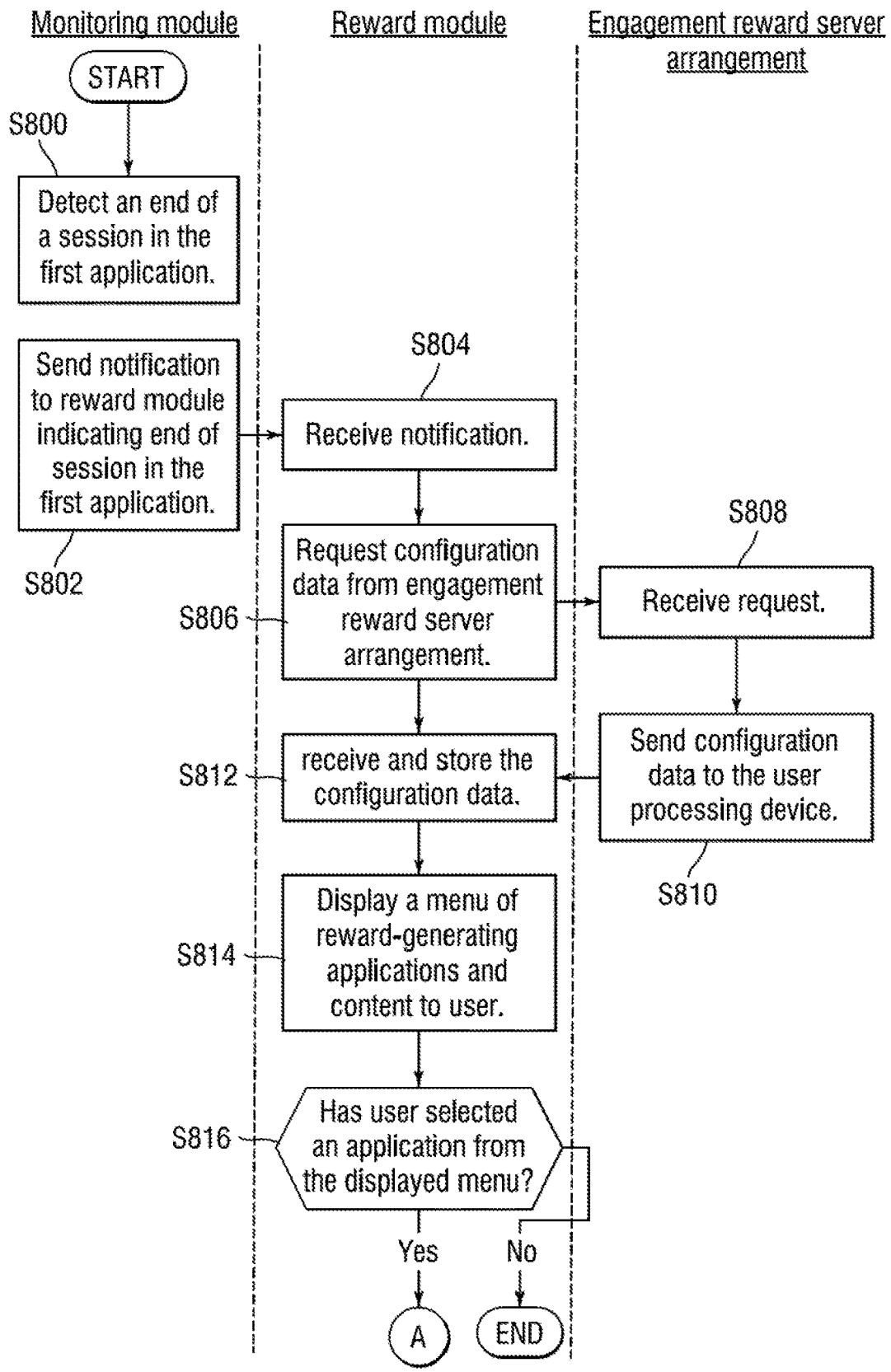
FIGS. 8A, 8B and 8C show processing operations performed by a monitoring module, a reward module and an engagement reward server arrangement in a first embodiment.

Referring now to FIG. 8A, at step S800, first application session end detection module 410 of monitoring module 320 detects an end of a session in a monitored first application 301. The end of a session may be defined as whenever the user stops engaging with the first application 301, or may alternatively be defined more specifically as when the user minimises the first application 301, opens a different application or closes the first application 301. In this embodiment, first application session end detection module 410 detects an end of a session by receiving a notification from the operating system of the user processing device, which, for example, detects when a user ends a session in an application and sends a notification to first application session end detection module 410. However, first application session end detection module 410 may detect a session end in different ways, for example by reading data defining or indicating a session end from memory, into which the data was written by the operating system of the user processing device 300; or first application session end detection module 410 may detect a session end by obtaining a list of applications running on the user processing device 300, sorted by the time of last engagement by the user, and determining that the first list entry is not the first application when previously it was the first list entry.

At step S802, monitoring module 320 notifies reward module 330 that a session in the first application 301 has ended.

At step S804, reward module 330 receives the notification and, at step S806, configuration module 520 of reward module 330 requests configuration data from an engagement reward server arrangement 140.

At step S808, the request for configuration data is received by the engagement reward server arrangement 140 and, at step S810, the engagement reward server arrangement 140 sends configuration data to the requesting user processing device 300. The configuration data in this embodiment comprises data defining one or more second applications 302 that are currently being promoted as reward-generating applications for the first application 301 on the user processing device 300, and also conversion data defining a conversion from a measure of engagement of the user with a second application 302 to one or more rewards in the first application 301. The conversion data may impose a maximum for the reward(s) that can be earned and may also impose a minimum for the reward(s) that can be earned.

The request for configuration data transmitted at step S806 and the configuration data transmitted at step S810 may be secured by encryption, using techniques well known to those skilled in the art.

At step S812, the configuration data sent by the engagement reward server arrangement 140 is received by configuration module 520 and stored in a volatile working memory 230 and/or a non-volatile memory 234 of the user processing device 300 (the data stored in volatile working memory 230 can be used in a current session and the data stored in non-volatile memory 234 can be used in one or more future sessions until new configuration data is received from an engagement reward server arrangement 140).

Although not shown in FIG. 8A, steps S806, S808, S810 and S812 may be repeated at regular intervals in order to obtain up-to-date configuration data from an engagement reward server arrangement 140.

At step S814, menu generation module 530 displays to the user a menu of the reward-generating second applications that were identified in the configuration data received from the engagement reward server arrangement 140. The menu may take any form such as a list, table, game wall or any other display format. Each application in the menu may be represented in any way, for example by a name or by an icon. In the present embodiment, the menu is displayed with one or more messages informing the user that one or more rewards for use in the first application can be obtained by selecting and engaging with one or more of the reward-generating applications appearing in the menu. The message also gives the user an option of declining to select a reward-generating application, and to close the menu.

In the present embodiment, second applications 302 that are identified in the configuration data, and are therefore included in the menu displayed at step S814, may include second applications 302 that are not yet installed on the user processing device 300 but are available for download, and/or second applications 302 that are already installed on the user processing device 300. Accordingly, the second applications 302 being promoted can be changed by changing the configuration data. Furthermore, the promotion of a second application 302 may be time-limited and may be ended by removing the identification of the second application 302 from the configuration data or by associating a time limit, expiry date, etc. with a second application 302 in the configuration data for the menu generation module 530 to check. Similarly, the promotion of a second application 302 can be restarted so as to promote re-engagement of the user with that second application 302 by including the identity of the second application 302 in the configuration data again.

At step S816, reward module 330 determines whether the user has selected a reward-generating application from the displayed menu. If the user has not selected a reward-generating application, then processing ends. On the other hand, if the user has selected a reward-generating application from the menu (for example by selecting the name or the icon of a reward-generating application in the menu), then processing proceeds to step S818.

Figure 8B:
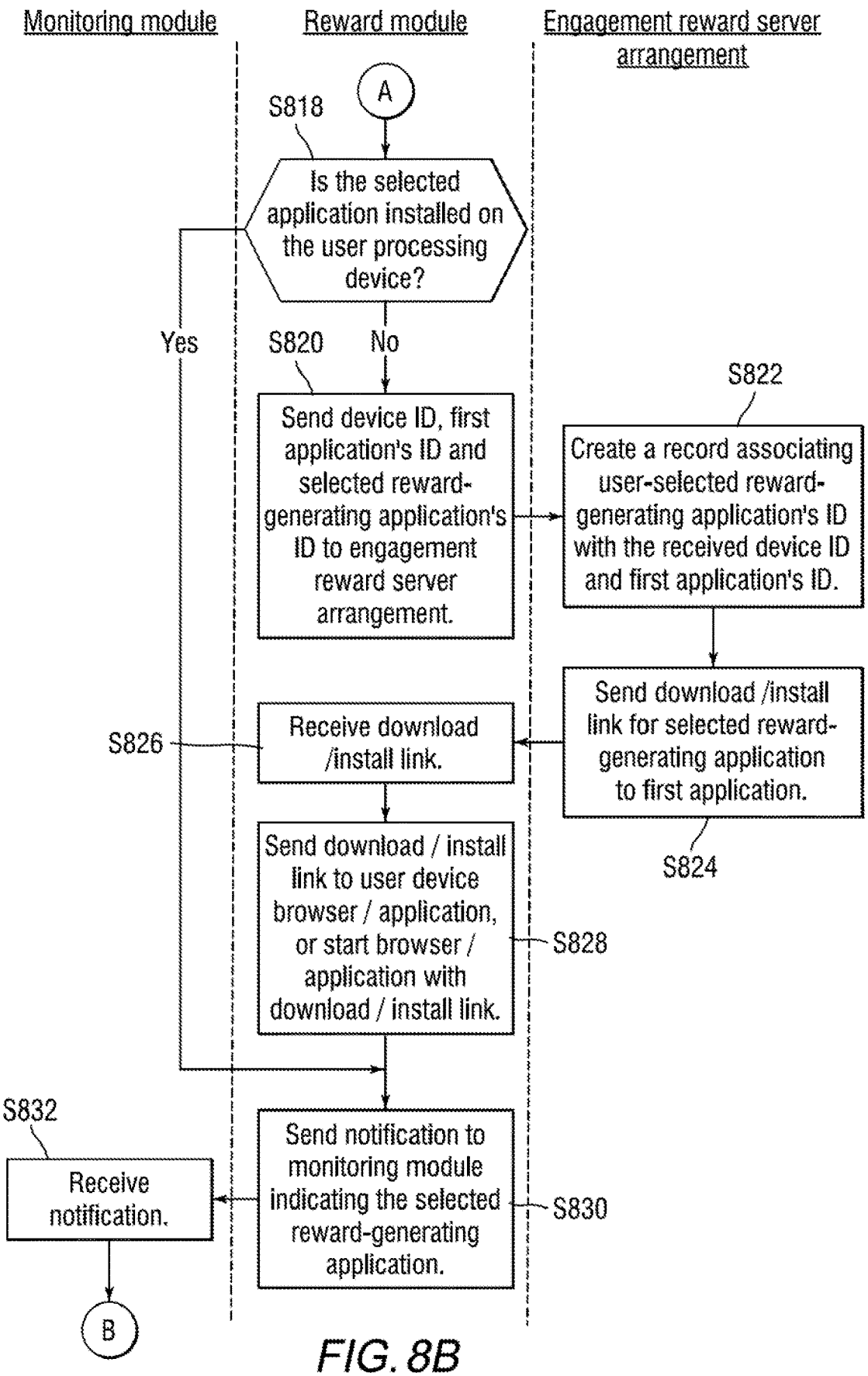

Referring now to FIG. 8B, at step S818, installation module 540 determines whether the selected reward-generating application is already installed on the user processing device 300. If it is determined that the selected reward-generating application is already installed on the user-processing device 300, then processing proceeds to step S830, to be described below. On the other hand, if it is determined that the selected reward-generating application is not installed on the user processing device 300, then processing proceeds to step S820. It should be noted that, with some operating systems such as Windows, it may not be possible for installation module 540 to determine at step S818 whether the selected reward-generating application is already installed on the user processing device 300. In such a case, installation module 540 may pass data defining the selected reward-generating application to the operating system and the operating system may then determine whether the selected reward-generating application is already installed on the user processing device 300 and inform installation module 540 of the result. Alternatively, if the operating system determines that the selected reward-generating application is not installed on the user processing device 300, it may download and install it, and then inform installation module 540 that the selected reward-generating application is installed. In that case, installation module 540 would always receive a positive result at step S818 (unless a download and install by the operating system was unsuccessful).

At step S820, installation module 540 sends a request to engagement reward server arrangement 140 requesting a download/install link for downloading the selected reward-generating application from application download server arrangement 120. In this embodiment, the request sent by installation module 540 comprises a unique device identifier that uniquely identifies the user processing device 300 (for example if the user processing device is a smartphone, the unique device ID may be the smartphone's IMEI number, or the Identifier for Advertisers (IDFA or IFA) on iOS devices, or the "Advertising ID" on Android devices), an identifier identifying the first application 301, and an identifier identifying the selected reward-generating application.

At step S822, engagement reward server arrangement 140 receives the request from the installation module 540 and creates a record in a database, the record associating the identifier identifying the selected reward-generating application with the unique identifier of the user processing device 300 and the identifier of the first application 301. Such a record is created for each user processing device 300 that connects to engagement reward server arrangement 140 and enables the engagement reward server arrangement 140 to track the number and identities of reward-generating applications that are selected by each user. This enables the success of a promotion campaign promoting reward-generating applications to be assessed.

At step S824, the engagement reward server arrangement 140 transmits the requested resource locator in a form of a download/install link (such as a URL) that allows an application in the user processing device 300 (for example the iTunes app on an iOS device) to locate and download the reward-generating application selected by the user.

At step S826, installation module 540 receives the download/install link from engagement reward server arrangement 140 and, at step S828, sends the received download/install link to a browser or a different application in the user processing device 300. In the present embodiment, the browser or different application then downloads the selected reward-generating application from an application download server arrangement 120 using the received download/install link, and installs the reward-generating application on the user processing device 300. It should be noted, however, that the user may choose to open the user processing device's application browser or different application and find the selected reward-generating application by himself/herself, without using the resource locator, and then download and install the selected reward-generating application.

At step S830, a notification indicative of the selected reward generating application is sent by the reward module 330 to the monitoring module 320. The notification is received by reward module 330 at step S832.

Figure 8C:
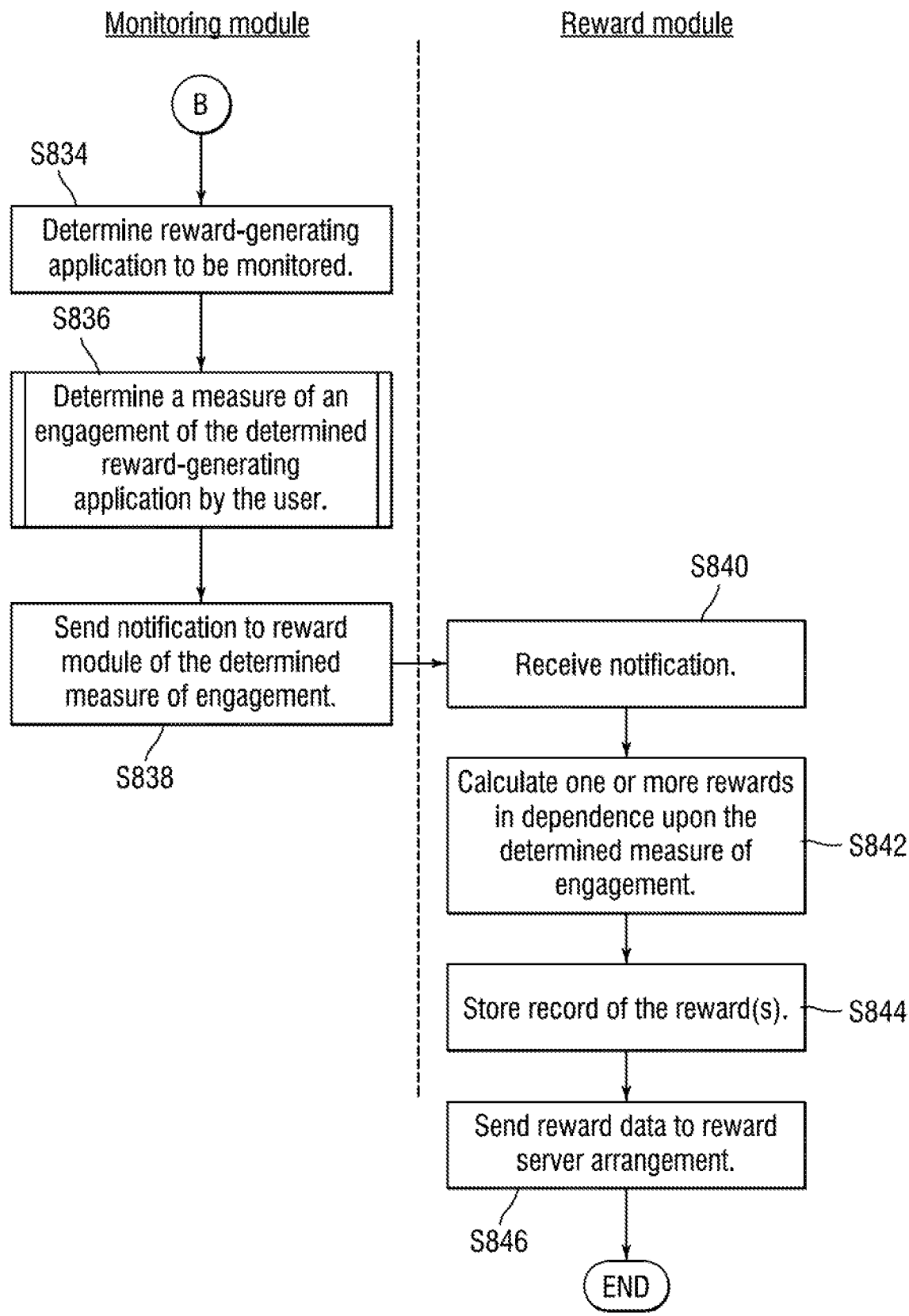

Referring now to FIG. 8C, at step S834, reward-generating-application determining module 420 in monitoring module 320 determines which reward-generating application is to be monitored. In this embodiment, this is achieved by determining which reward-generating application was selected by the user from the menu provided by the reward module 330 at step S814.

At step S836, monitoring module 320 determines a measure of an engagement of the determined reward-generating application by the user.

Figure 9:
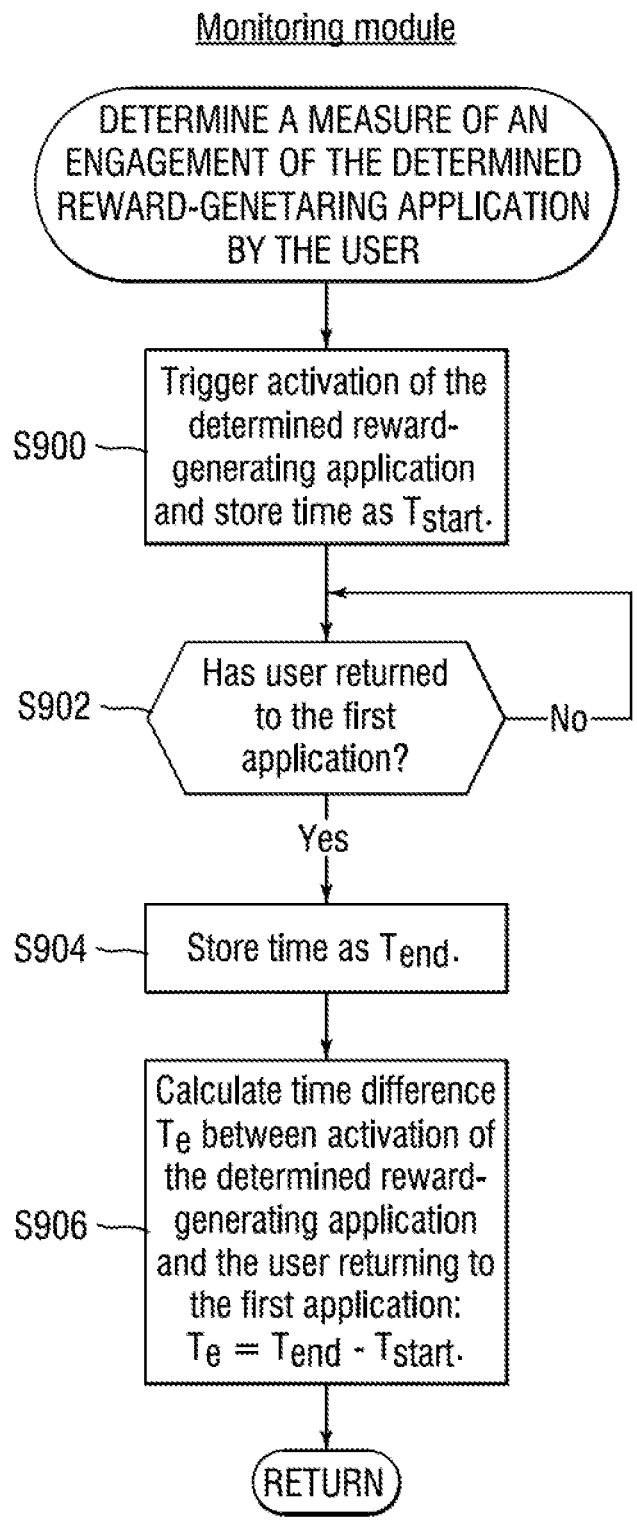
FIG. 9 shows processing operations performed at step S836 by the monitoring module in the first embodiment.

FIG. 9 shows the processing operations by monitoring module 320 at step S836.

Referring to FIG. 9, at step S900, reward-generating-application trigger module 430 triggers activation of the determined reward-generating application (this being the reward-generating application selected from the menu displayed at step S814 in this embodiment) and stores the time of the activation as a start time $T_{start}$. Activation of the determined reward-generating application can be effected, for example, by the reward-generating-application trigger module 430 sending an instruction to the operating system of the user processing device 300 to open the reward-generating application if the determined reward-generating application is closed, or to bring the reward-generating application to the foreground if it is already open but is in the background or dormant.

At step S902, return detection module 440 determines whether the user has returned to the first application 301. This processing can be performed in a number of different ways, for example by receiving a signal from the operating system of the user processing device 300 indicating an action of the user in the first application such as a click, tap, swipe, key pad input or other form of input, or by obtaining a list of applications running on the user processing device 300, sorted by time of last engagement by the user, and determining that the first entry on the list has become the first application when previously it was not the first list entry. Return detection module 440 repeats the processing at step S902 until it is determined that the user has returned to the first application.

When it is determined at step S902 that the user has returned to the first application, return detection module 440 stores, at step S904, the time of the user's return as an end time $T_{end}$.

At step S906, time duration calculation module 450 calculates a measure of the time during which the user may have been engaged with the determined reward-generating application. In this embodiment, time duration calculation module 450 calculates the measure of time as the time difference $T_e$ between activation of the determined reward-generating application and the user returning to the first application 301. By way of example, time duration calculation module 450 may calculate $T_e$ using the following equation:

$$T_e = T_{end} - T_{start} \qquad \text{Equation 1}$$

It will, of course, be appreciated that different measures of time may be calculated by time duration calculation module 450. For example, time duration calculation module 450 could adjust the value of $T_{start}$ by subtracting a predetermined amount of time typical of time taken for an application to start and be available for a user to use after it has been selected.

Referring again to FIG. 8C, at step S838, a notification indicating the determined measure of engagement is provided by monitoring module 320 to reward module 330. The notification is received by the reward module 330 at step S840.

At step S842, reward generating module 550 of reward module 330 calculates one or more rewards in dependence upon the determined measure of engagement. More particularly, in this embodiment, reward generating module 550 reads the conversion data from the configuration data stored at step S812 defining how a measure of engagement of the user with the reward-generating application is to be converted into one or more rewards in the first application 301, and applies the conversion to the measure of engagement determined at step S836. The conversion data may define a simple threshold for the measure of engagement, below which no reward is earned, and define what reward is to be made available if the measure of engagement is above the threshold. Alternatively, the conversion data may define a more complex algorithm giving varying values, types, and/or numbers of reward(s) for different measures of engagement of the user with the second application. The conversion data may impose a maximum for the reward(s) that can be earned regardless of how long the user engages with the reward-generating application.

After calculating one or more rewards at step S842, reward generating module 550 stores a record of the reward(s) at step S844.

At step S846, data defining the generated reward(s), as well as data identifying the user and/or user processing device 300, and also data identifying the first application 301 in which the rewards may be used, is transmitted by the user processing device 300 to reward server arrangement 350 when the user processing device 300 is able to establish a communication link with network 150. The data may be transmitted to engagement reward server arrangement 140 for forwarding to content and reward delivery server arrangement 130, or the data may be transmitted to content and reward delivery server arrangement 130.

Figure 10:
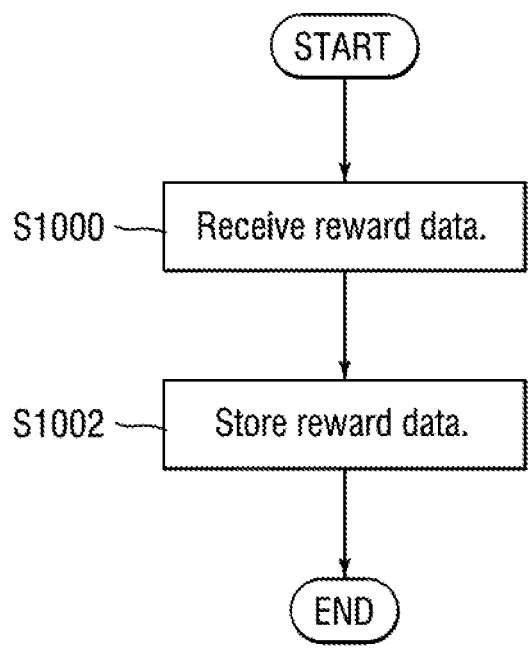
FIG. 10 shows processing operations performed by a content and reward delivery server arrangement in embodiments of the invention.

FIG. 10 shows the processing operations performed by content and reward delivery server arrangement 130 when reward data indicative of one or more engagement rewards is received either from a user processing device 300 or from engagement reward server arrangement 130.

Referring to FIG. 10, at step S1000, content and reward delivery server arrangement 130 receives the reward data. At step S1002, content and reward delivery server arrangement 130 stores the reward data. The reward data may be stored in combination with any reward data stored in previous processing of either step S628 or step S1002, to provide one unified set of reward data. The reward data is later retrieved according to the method of FIG. 7 to be made available for use by the user in the first application 301 on the user processing device 300.

Second Embodiment

Referring again to FIG. 3, only the functional processing modules of the monitoring module 320 and reward module 330 of the second embodiment are different from the first embodiment. These modules are described below referring to FIGS. 11 and 12. As in the first embodiment, the instructions defining monitoring module 320 and reward module 330 are separate from instructions defining the first application 301 and the second application 302. The instructions defining the monitoring module 320 and the reward module 330 may additionally be separate from the instructions defining the content delivery and reward implementation module 310. The instructions defining the monitoring module 320 and reward module 330 may be part of the instructions defining the operating system of the user processing device, they may define a separate application on the user processing device, or they may be part of a further application on the user processing device. In the latter two cases, the monitoring module may interface with the operating system of the user processing device to determine therefrom a measure of the engagement of the second application by the user. The instructions defining monitoring module 320 may be separate from the instructions defining reward module 330.

Figure 11:
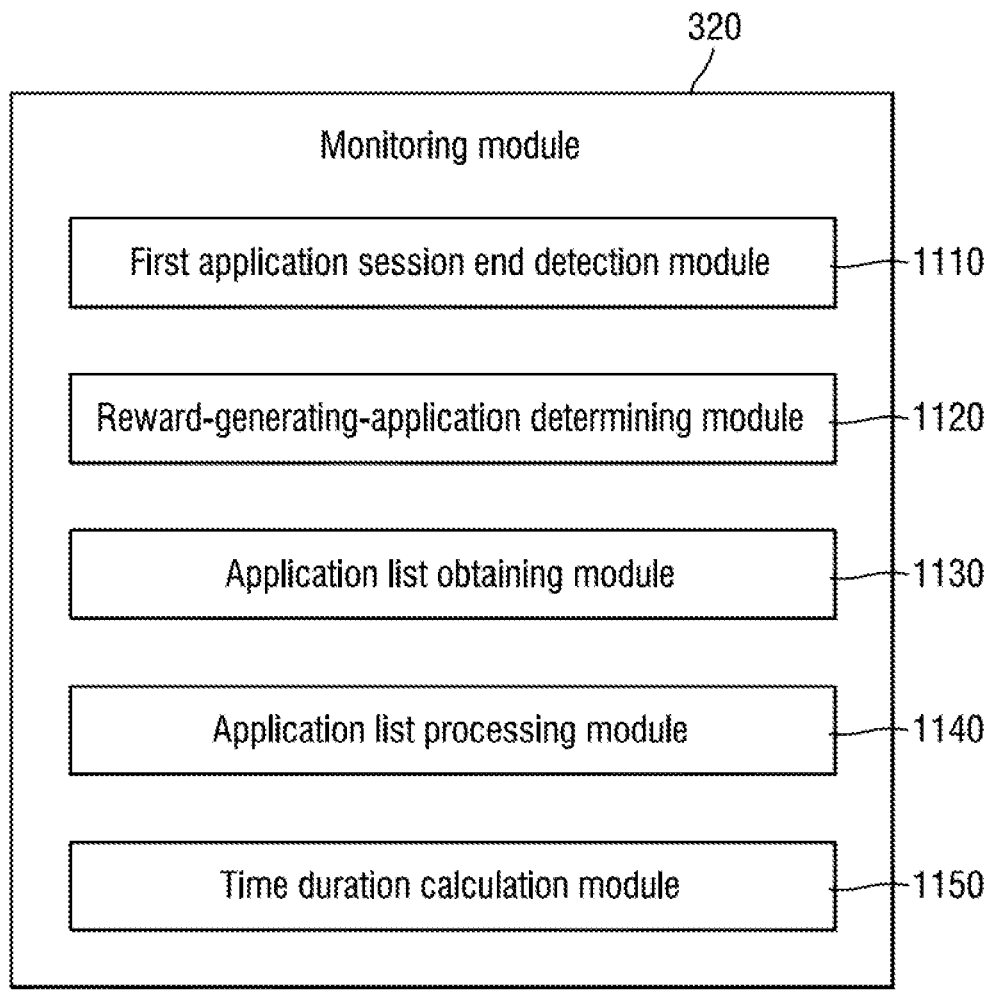
FIG. 11 schematically illustrates functional processing modules of a monitoring module in a second embodiment.

FIG. 11 schematically illustrates functional processing modules of monitoring module 320 in the second embodiment.

Referring to FIG. 11, monitoring module 320 comprises a first application session end detection module 1110, a reward-generating-application determining module 1120, an application list obtaining module 1130, an application list processing module 1140, and a time duration calculation module 1150.

The first application session end detection module 1110 has the same configuration, and performs the same processing operations, as the first application session end detection module 410 in the first embodiment and accordingly will not be described again here.

Reward-generating-application determining module 1120 is operable to determine one or more reward-generating application(s) to be monitored.

Application list obtaining module 1130 is operable to obtain a list of applications running on the user processing device, sorted by time of last engagement by the user. Application list obtaining module 1130 may obtain the list in any of a number of different ways. By way of example, application list obtaining module 1130 may obtain the list by receiving data defining the list from the operating system of the user processing device. Alternatively, application list obtaining module 1130 may obtain the list by reading data defining the list from a memory into which the data was written by the operating system of the user processing device. As a further alternative, application list obtaining module 1130 may obtain data from the operating system (either by the operating system transmitting the data to the application list obtaining module 1130 or by the application list obtaining module 1130 reading the data from memory into which the data was written by the operating system) defining currently open applications as well as the time of last engagement of each currently running application by the user, and application list obtaining module may then sort the applications itself in accordance with the time of last engagement to obtain a sorted list. It should be noted that the list may be a list of only one application. This could occur, for example, if only one application is running on the user processing device or if the operating system provides data to the application list obtaining module defining only the application that was last used by the user (this data being provided either by sending the data to the application list obtaining module or by writing it to memory from which it can be read by the application list obtaining module).

Application list processing module 1140 is operable to process a list obtained by the application list obtaining module 1130 to determine whether the application last used by the user is a reward-generating application to be monitored by monitoring module 320. Application list processing module 1140 is further operable to store a time at which the application last used by the user is first determined to be a reward-generating application to be monitored and a time at which the application last used by the user is determined to be no longer that reward-generating application.

Time duration calculation module 1150 is operable to determine a measure of engagement of a reward-generating application by the user by calculating a measure of time between a first time at which the application last used by the user is determined to be a reward-generating application and a time at which the application last used by the user is determined to be no longer the reward-generating application.

Figure 12:
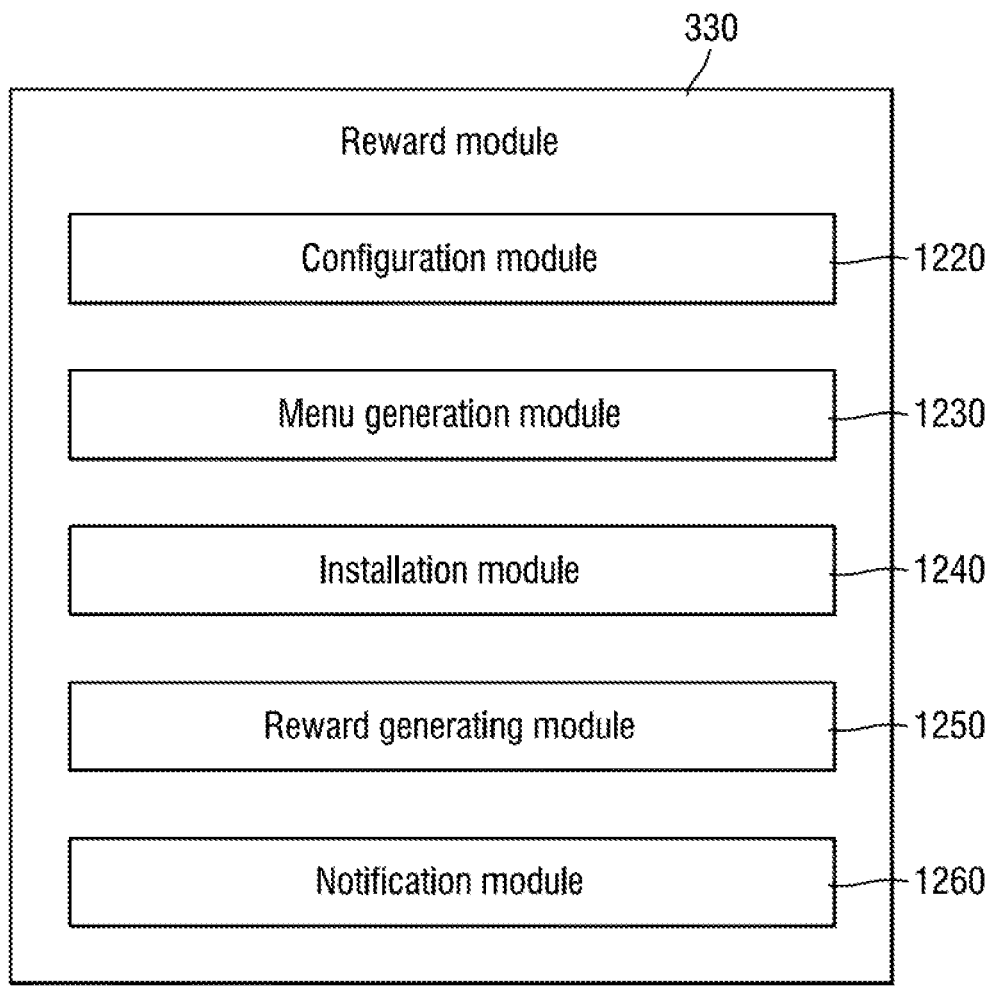
FIG. 12 schematically illustrates functional processing modules of a reward module in the second to ninth embodiments.

Referring to FIG. 12, in the second to ninth embodiments, reward module 330 comprises a configuration module 1220, a menu generation module 1230, an installation module 1240, a reward generating module 1250 and a notification module 1260.

Configuration module 1220, menu generation module 1230 and installation module 1240 have the same configurations and perform the same processing operations as configuration module 520, menu generation module 530 and installation module 540, respectively, in the first embodiment, and accordingly will not be described again here.

Reward generating module 1250 is operable to generate one or more rewards for use by the user in the first application by calculating one or more rewards in dependence upon a measure of engagement determined by the monitoring module 320.

Notification module 1260 is operable to trigger a notification to the user that one or more rewards have been earned for use in the first application. The notification may link to the first application so that the user can return to the first application. The notification may link to the first application using any mechanism that returns the user to the first application. For example, the notification may provide a visible link, the selection of which returns the user to the first application. Alternatively, opening or selecting the notification itself may return the user to the first application using a hidden link within the notification.

The processing operations performed by the functional processing modules of the second embodiment will now be described with reference to FIGS. 13A, 13B, 14, 15, and 16.

Figure 13A:
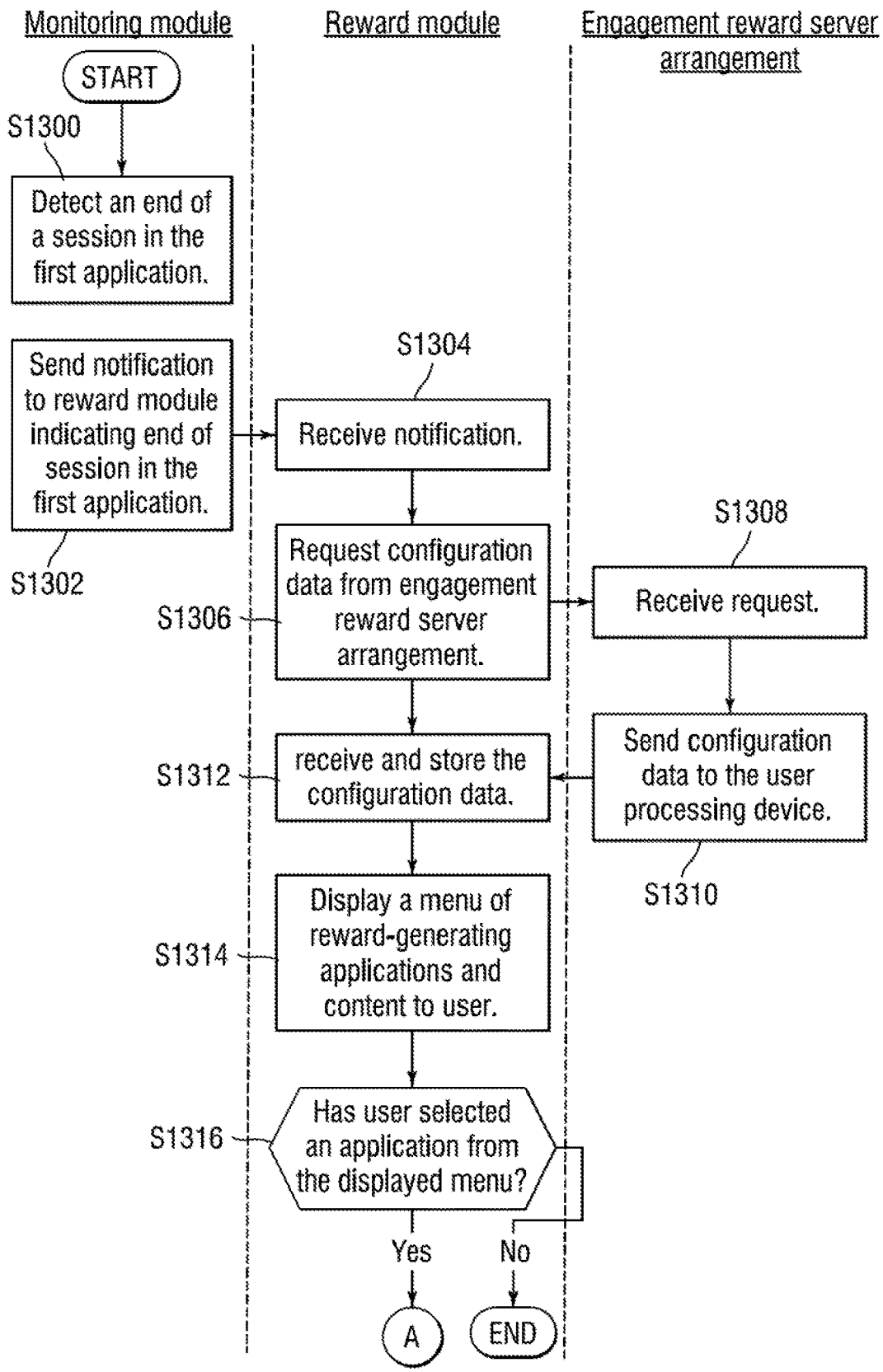
FIGS. 13A and 13B show processing operations performed by a reward module, a monitoring module and an engagement reward server arrangement in the second to ninth embodiments.
Figure 13B:
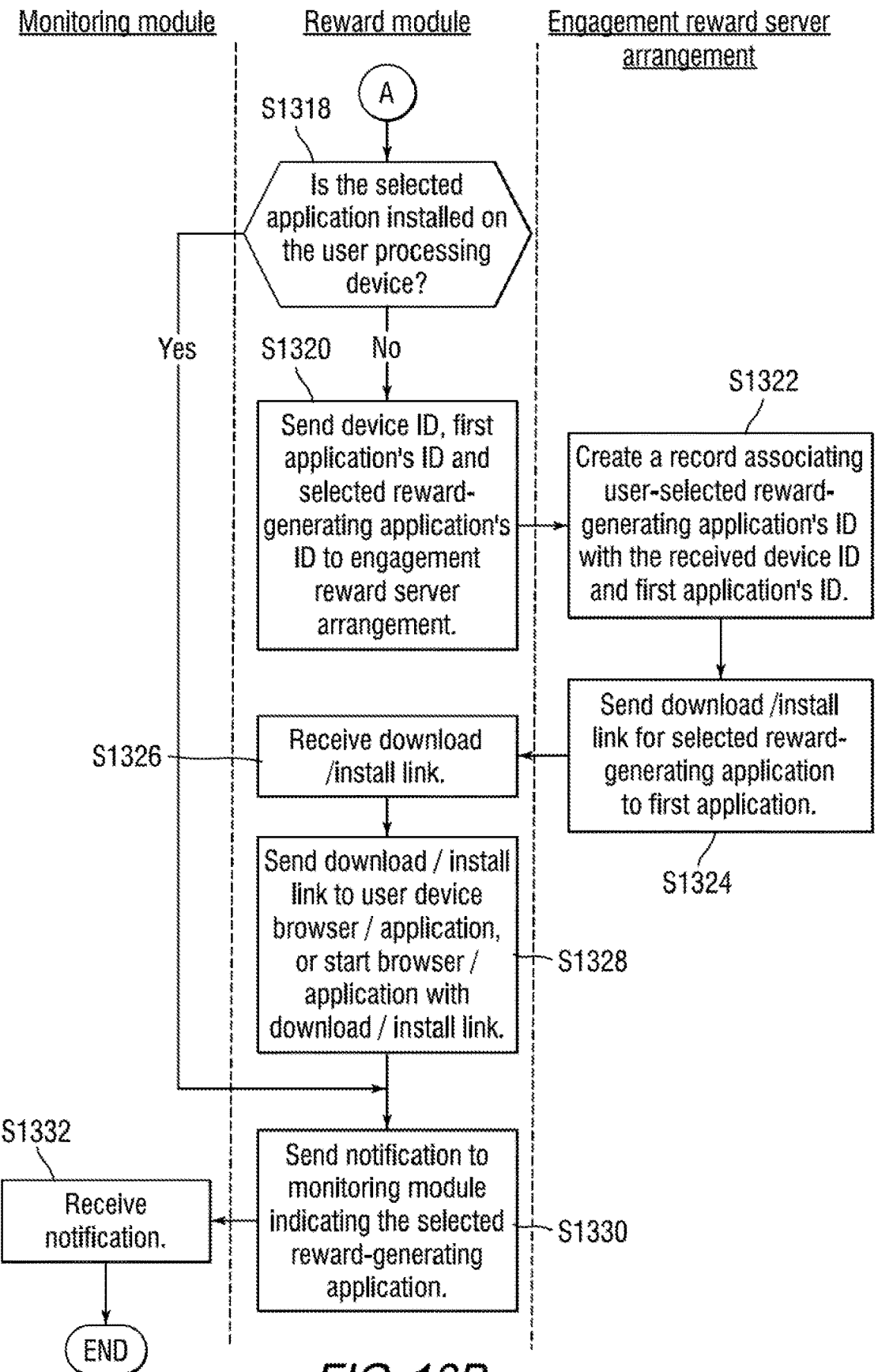
Figure 14:
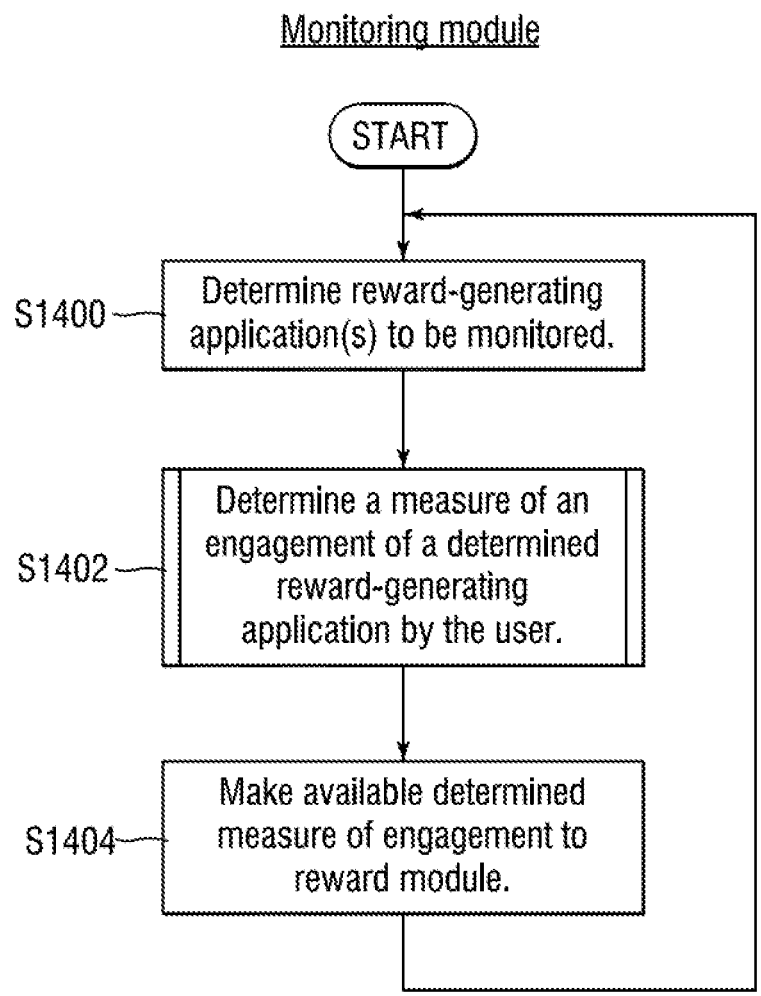
FIG. 14 shows processing operations performed by a monitoring module in the second to ninth embodiments.

FIGS. 13A and 13B show processing operations performed by monitoring module 320, reward module 330, and engagement reward server arrangement 140 in the second to ninth embodiments, when promoting second applications, and FIG. 14 shows the processing operations performed by monitoring module 320 when monitoring second applications. These two processes may be performed in parallel. Monitoring module 320 and reward module 330 may run continuously in the background on the user processing device to perform the processing operations shown in FIGS. 13A, 13B and 14.

The processing operations performed at steps S1300 to S1332 of FIGS. 13A and 13B are the same as those performed at steps S800 to S832 in the first embodiment, and will not be described again here. The notification indicative of the selected reward-generating application which is sent to, and received by, monitoring module 320 at steps S1330 and S1332 is used in embodiments two to nine by the monitoring module 320 to maintain a list of reward generating applications which are installed on the user processing device 300 and which are to be monitored. An application by the user selected from the menu displaying at step S1314 may optionally be started automatically upon completion of step S1332.

As a separate process from that described in FIGS. 13A and 13B, in the second to ninth embodiments monitoring module 320 determines a measure of an engagement of each reward-generating application by the user according to the process described below with reference to FIG. 14. This process is performed regardless of whether the reward-generating application is opened automatically after the user selects it from the menu displayed at step S1314 by the reward module 330, the reward-generating application is opened directly from the user processing device's home screen, desktop or another menu provided by the operating system of the user processing device 300, or the reward-generating application is opened in any other way (for example by opening it using a third application).

Referring to FIG. 14, at step S1400, reward-generating-application determining module 1120 determines the reward-generating application(s) to be monitored. In this embodiment, reward-generating-application determining module 1120 determines the reward-generating application(s) to be monitored from notifications previously received at step S1332. Alternatively, reward-generating-application determining module 1120 may use the configuration data received at step S1312 defining the reward-generating applications that are currently being promoted. This configuration data may be read by monitoring module 320 from a memory into which it was written by configuration module 1220 of reward module 330 or the configuration data may be transmitted to monitoring module 320 by configuration module 1220. It should be noted that the monitoring performed by monitoring module 320 is not, therefore, limited to monitoring of a single reward-generating application but can encompass multiple reward-generating applications.

At step S1402, monitoring module 320 determines a measure of an engagement of a determined reward-generating application by the user. The processing at step S1402 is performed for each reward-generating application determined to be an application to be monitored at step S1400.

Figure 15:
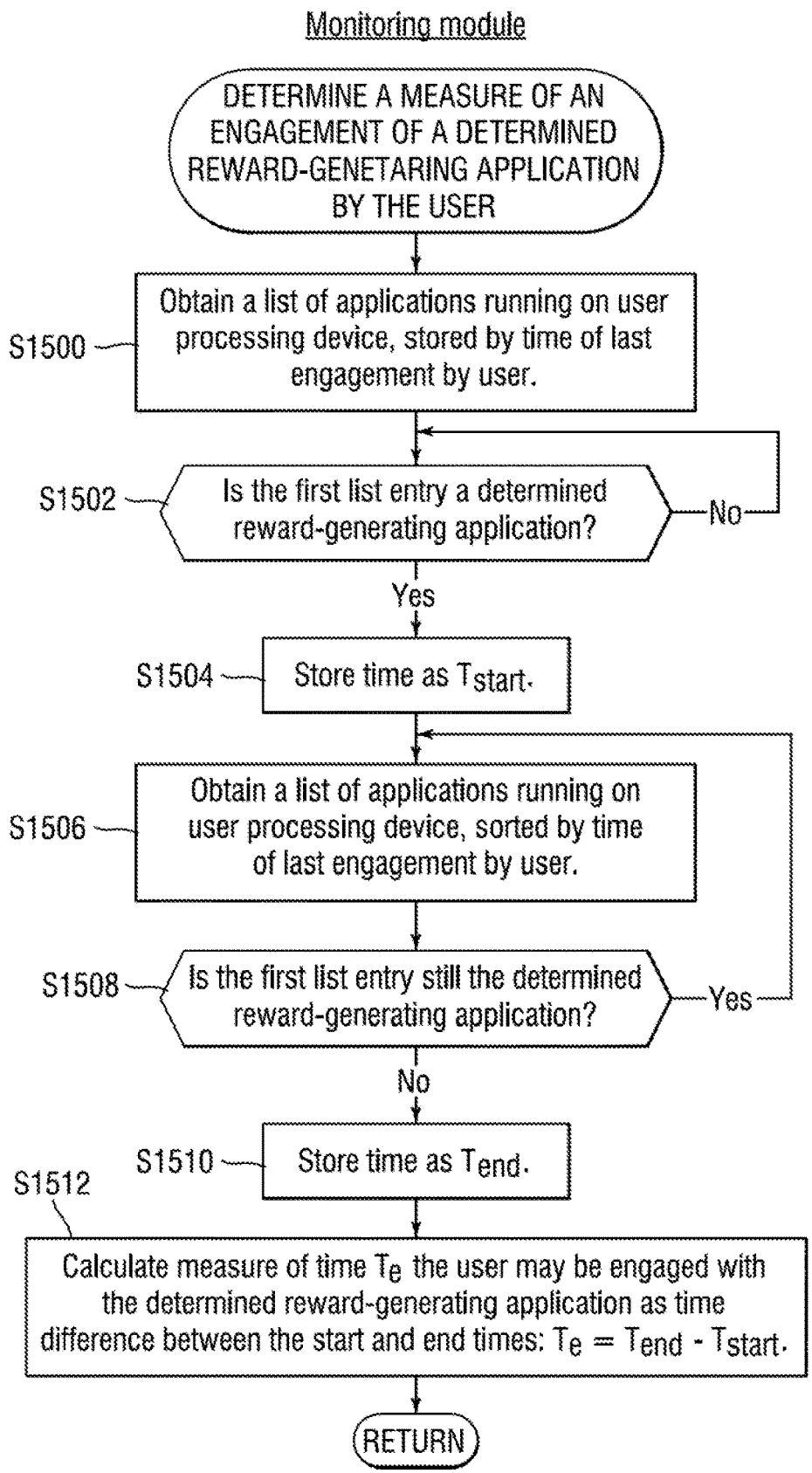
FIG. 15 shows processing operations performed at step S1402 in the second embodiment.

FIG. 15 shows the processing operations performed at step S1402 in the second embodiment.

Referring to FIG. 15, at step S1500, application list obtaining module 1130 obtains a list of applications running on the user processing device, sorted by time of last engagement by the user. In this embodiment, application list obtaining module 1130 obtains the sorted list by reading data defining the sorted list from memory into which the data was written by the operating system of the user processing device. This reading of data from memory to obtain the sorted list may occur at a predetermined frequency with a time $T_f$ between each reading. However, application list obtaining module 1130 may obtain the list in different ways.

At step S1502, application list processing module 1140 determines whether the first entry on the list obtained at step S1500 is a determined reward-generating application. The processing at steps S1500 and S1502 is performed at regular intervals so as to determine the time at which a determined reward-generating application first becomes the first entry on the list, indicating that the reward-generating application is now being engaged by the user.

When it is determined at step S1502 that a determined reward-generating application has become the first entry on the list, processing proceeds to step S1504, at which application list processing module 1140 stores the current time as a start time $T_{start}$.

At step S1506, application list obtaining module 1130 again obtains a list of applications running on the user processing device, sorted by time of last engagement by the user. In this embodiment, application list obtaining module 1130 obtains the list at step S1506 by reading data defining the sorted list from memory, into which it was written by the operating system of the user processing device. This reading of data from memory to obtain the sorted list may occur at a predetermined frequency with a time $T_f$ between each reading. However, as noted previously, application list obtaining module 1130 may obtain the list in different ways.

At step S1508, application list processing module 1140 processes the list obtained at step S1506 to determine whether the first entry on the list is still the determined reward-generating application. Steps S1506 and S1508 are repeatedly performed (for example at regular intervals) so as to determine the time at which a different application becomes the first entry on the sorted list, indicating that the user is now engaging with a different application, rather than the determined reward-generating application.

When it is determined at step S1508 that the determined reward-generating application is no longer the first entry on the sorted list, processing proceeds to step S1510, at which application list processing module 1140 stores the current time as an end time $T_{end}$.

At step S1512, time duration calculation module 1150 calculates a measure of time indicative of the time that the user may have been engaged with the determined reward-generating application. In this embodiment, time duration calculation module 1150 calculates the measure of time, $T_e$, using the following equation:

$$T_e = T_{end} - T_{start} \qquad \text{Equation 2}$$

Time duration calculation module 1150 could use other equations to calculate the measure of time $T_e$ at step S1512. For example, time duration calculation module 1150 may include an error factor in its calculation:

$$T_e = T_{end} - T_{start} + T_{error} \qquad \text{Equation 3}$$

where $T_{error}$ is an error factor that is added to take account of margins of error. For example, $T_{error}$ may be set to a predetermined time value indicative of the time resolution for obtaining the sorted lists at steps S1500 and S1506. Thus, by way of example, $T_{error}$ may be set to $T_f$, which is the time between each reading of list data by application list obtaining module 1130 at steps S1500 and S1506.

Referring again to FIG. 14, after processing has been performed at step S1402 to determine the measure of engagement of the user with the determined reward-generating application, processing proceeds to step S1404, at which monitoring module 320 makes the determined measure of engagement available to reward module 330. In this embodiment, monitoring module 320 makes the determined measure of engagement available by storing data defining the determined measure of engagement in memory that can also be accessed by reward module 330 to read the stored data. However, monitoring module 320 could make the determined measure of engagement available in different ways, for example by transmitting data defining the determined measure of engagement to reward module 330.

Figure 16:
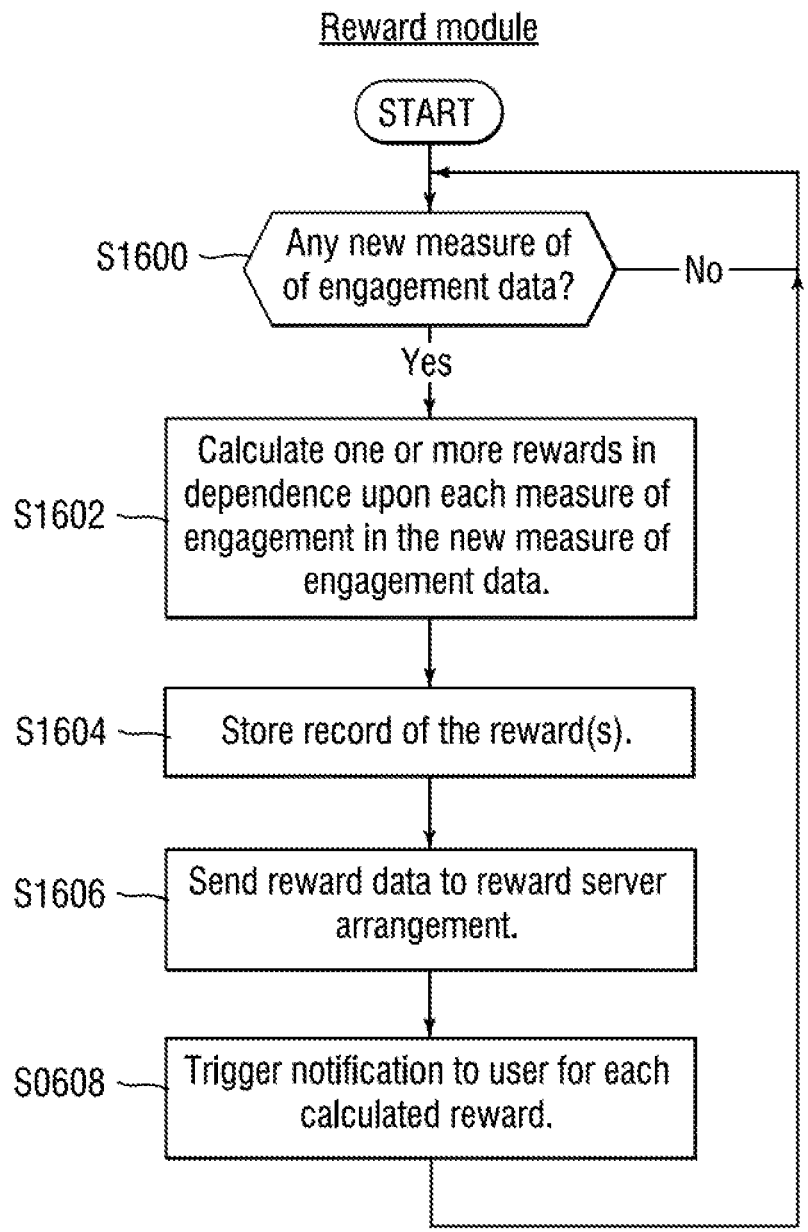
FIG. 16 shows processing operations performed by a reward module in the second to ninth embodiments.

Referring now to FIG. 16, the processing operations performed by reward module 330 in the second to ninth embodiments will be described. These processing operations may be repeatedly performed by reward module 330 which may run continuously in the background on the user processing device 300.

At step S1600, reward generating module 1250 determines whether any new measure of engagement data has been made available by monitoring module 320. In this embodiment, reward generating module 1250 checks whether any new measure of engagement data is available by reading data from the memory in which monitoring module 320 stores data defining a measure of engagement at step S1404. The processing at step S1600 is repeated at regular intervals until reward generating module 1250 determines that new measure of engagement data is available.

When it is determined at step S1600 that new measure of engagement data is available, processing proceeds to step S1602, at which reward generating module 1250 calculates one or more engagement rewards in dependence upon each measure of engagement in the new measure of engagement data. In this embodiment, reward generating module 1250 calculates the engagement reward(s) in dependence upon the conversion data in the configuration data received from engagement reward server arrangement 140 at step S1312 (this conversion data defining, as explained in the first embodiment, a conversion between a measure of the engagement of the user with a reward-generating application and the engagement reward(s) to be provided in the first application).

After calculating one or more rewards at step S1602, reward generating module 1250 stores a record of the engagement reward(s) at step S1604.

At step S1606, data defining the generated engagement reward(s), as well as data identifying the user processing device 300 and/or the user and also the data identifying the first application in which the rewards may be used, is transmitted by reward module 330 to reward server arrangement 350 when the user processing device is able to establish a communication link with network 150. The data may be transmitted to engagement reward server arrangement 140 for forwarding to content and reward delivery server arrangement 130, or the data may be transmitted to content and reward delivery server arrangement 130.

At step S1608, notification module 1260 triggers a notification to the user, informing the user of the reward(s) that are available for utilisation in the first application 301. In this embodiment, notification module 1260 interfaces with the operating system of the user processing device to send a notification which includes a link to the first application 301. In this way, by selecting the link in the notification, the user is returned to the first application so that he/she can enjoy the benefits of the reward(s) therein.

Third Embodiment

The components of the third embodiment and the processing operations performed thereby are the same as those in the second embodiment, with the exception of the components of monitoring module 320 and the processing operations performed by monitoring module 320 at step S1402. Accordingly, only these differences will be described here.

As will be explained below, monitoring module 320 in the third embodiment is operable to determine a measure of an engagement of a reward-generating application by a user by performing processing operations to determine a length of a session spent in the reward-generating application by the user. The processing operations performed by monitoring module 320 to determine a session length are different from the processing operations performed in the second embodiment.

Figure 17:
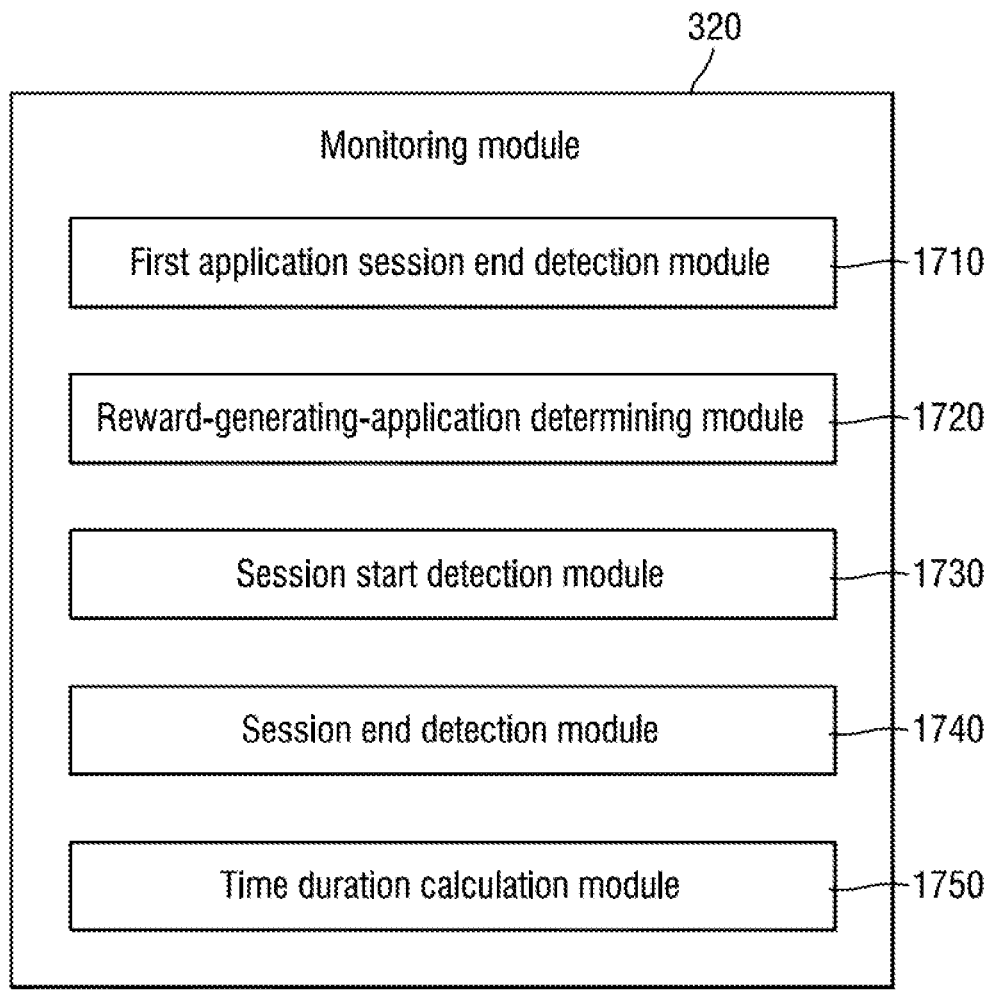
FIG. 17 schematically illustrates functional processing modules of a monitoring module in the third embodiment.

FIG. 17 schematically illustrates the functional processing modules of monitoring module 320 in the third embodiment.

Referring to FIG. 17, monitoring module 320 comprises a first application session end detection module 1710, a reward-generating-application determining module 1720, a session start detection module 1730, a session end detection module 1740, and a time duration calculation module 1750.

The first application session end detection module 1710 has the same configuration, and performs the same processing operations, as the first application session end detection module 410 in the first embodiment and accordingly will not be described again here.

Reward-generating-application determining module 1720 has the same configuration, and performs the same processing operations, as the reward-generating-application determining module 1120 in the second embodiment and accordingly will not be described again here.

Session start detection module 1730 is operable to detect a start of a session by the user in a determined reward-generating application, and to store a time indicative of the time at which the session started. Session start detection module 1730 may detect a start of a session in a reward-generating application in any of a number of different ways. By way of example, session start detection module 1730 may detect a start of a session by receiving a notification of the session start from the operating system of the user processing device. Alternatively, session start detection module 1730 may detect a session start by reading data indicative of the session start from a memory, into which the data was written by the operating system of the user processing device.

Session end detection module 1740 is operable to detect an end of a session by the user in the determined reward-generating application, and to store a time indicative of the time at which the session ended. Session end detection module 1740 may detect an end of a session in a reward-generating application in any of a number of different ways. By way of example, session end detection module 1740 may detect an end of a session by receiving a notification of the session end from the operating system of the user processing device. Alternatively, session end detection module 1740 may detect a session end by reading data indicative of the session end from a memory, into which the data was written by the operating system of the user processing device.

Time duration calculation module 1750 is operable to determine a measure of an engagement of a determined reward-generating application by the user by calculating a measure of time between the start of the session and the end of the session.

Figure 18:
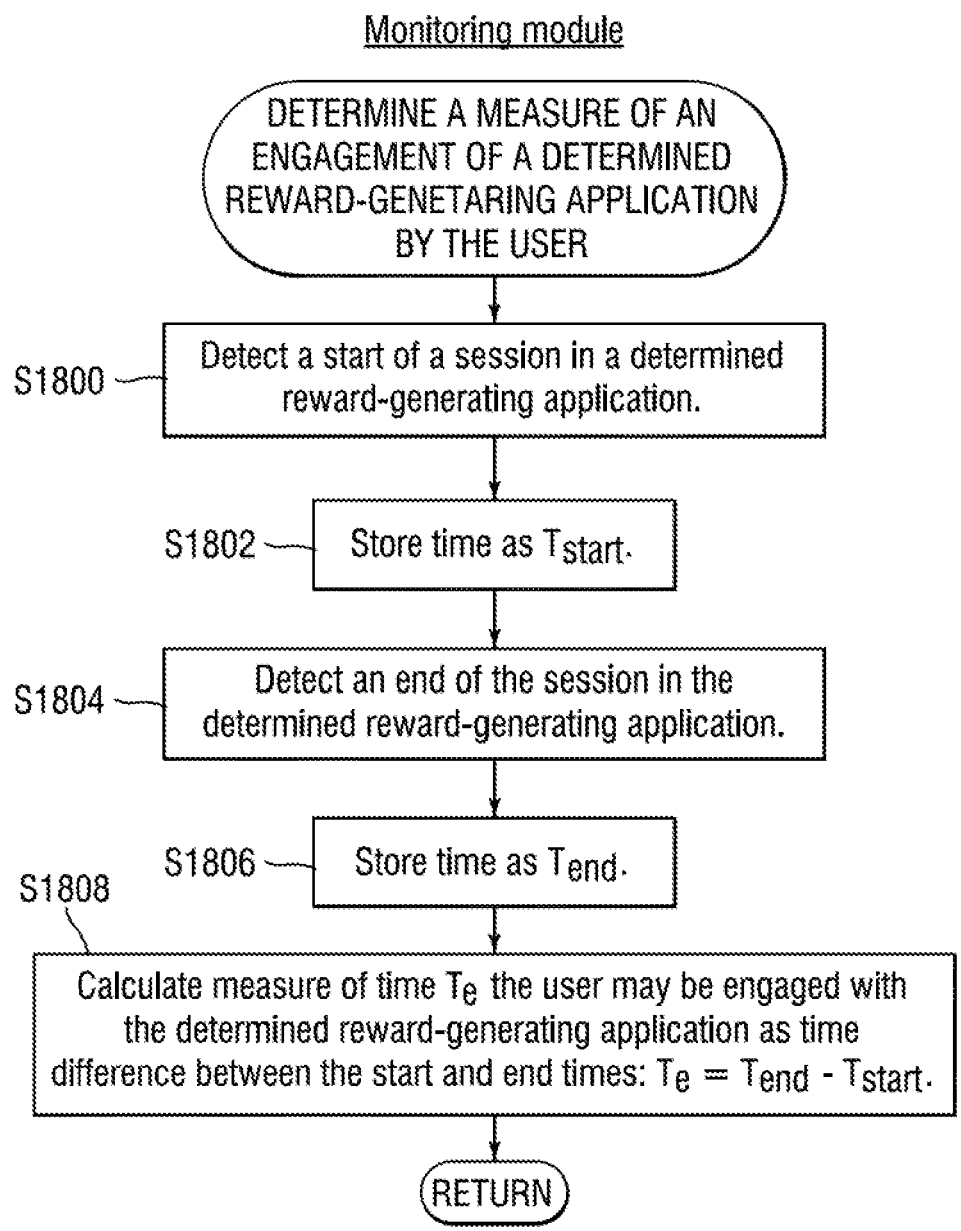
FIG. 18 shows processing operations performed by a monitoring module at step S1402 in the third embodiment.

FIG. 18 shows the processing operations performed by the components of monitoring module 320 at step S1402 in the third embodiment.

Referring to FIG. 18, at step S1800, session start detection module 1730 detects the start of a session by the user in a determined reward-generating application. In this embodiment, session start detection module 1730 detects the start of the session by receiving a notification from the operating system of the user processing device, which detects, for example, when the user starts using an application and sends a notification to session start detection module 1730. However, as noted above, session start detection module 1730 may detect a session start in different ways, for example by reading data indicative of a session start from memory, into which the data was written by the operating system of the user processing device.

When a start of a session is detected at step S1800, processing proceeds to step S1802, at which session start detection module 1730 stores the current time as a session start time $T_{start}$. At step S1804, session end detection module 1740 detects the end of the session in the determined reward-generating application. In this embodiment, session end detection module 1740 detects the end of the session by receiving a notification from the operating system of the user processing device, which, for example, detects when a user ends a session in an application and sends a notification to session end detection module 1740. However, as noted above, session end detection module 1740 may detect a session end by reading data defining a session end from memory, into which the data was written by the operating system of the user processing device.

It should be noted that the notifications received at step S1800 and S1804 may be generic (rather than specifically identifying a session start and a session end, respectively) with the session start detection module 1730 and session end detection module 1740 operating as a latch to determine that a first notification is a session start notification, a second notification is a session end notification, a third notification is a session start notification, a fourth notification is a session end notification, etc.

Upon detection, at step S1804, of the end of the session in the determined reward-generating application, processing proceeds to step S1806, at which session end detection module 1740 stores the current time as a session end time $T_{end}$.

At step S1808, time duration calculation module 1750 calculates a measure of an engagement of the determined reward-generating application by the user by calculating a measure of session time during which the user may be engaged with the determined reward-generating application. In this embodiment, time duration calculation module 1750 calculates a measure of time $T_e$ using the following equation:

$$T_e = T_{end} - T_{start} \qquad \text{Equation 4}$$

Time duration calculation module 1750 could use other equations to calculate the measure of time $T_e$ at step S1808. For example, time duration calculation module 1750 may include an error factor in its calculation:

$$T_e = T_{end} - T_{start} + T_{error} \qquad \text{Equation 5}$$

where $T_{error}$ is an error factor that is added to take account of margins of error. For example, if session start detection module 1730 and session end detection module 1740 detect session starts and session ends at steps S1800 and S1804, respectively, by reading data from a memory to see if the operating system of the user processing device has stored data indicative of a session start or session end, then $T_{error}$ may be set to a predetermined time value indicative of the frequency at which the memory is read at steps S1800 and S1804. Thus, by way of example, if the time interval between each memory read at steps S1800 and S1804 is $T_f$, then $T_{error}$ may be set to $T_f$.

Fourth Embodiment

The components of the fourth embodiment and the processing operations performed thereby are the same as those in the second embodiment, with the exception of the components of monitoring module 320 and the processing operations performed by monitoring module 320 at step S1402. Accordingly, only these differences will be described here.

As will be explained below, monitoring module 320 in the fourth embodiment is operable to determine a measure of an engagement of a reward-generating application by a user by performing processing operations to determine a length of a session spent in the reward-generating application by the user. The processing operations performed by monitoring module 320 to determine a session length are different from the processing operations performed in the second embodiment and in the third embodiment.

Figure 19:
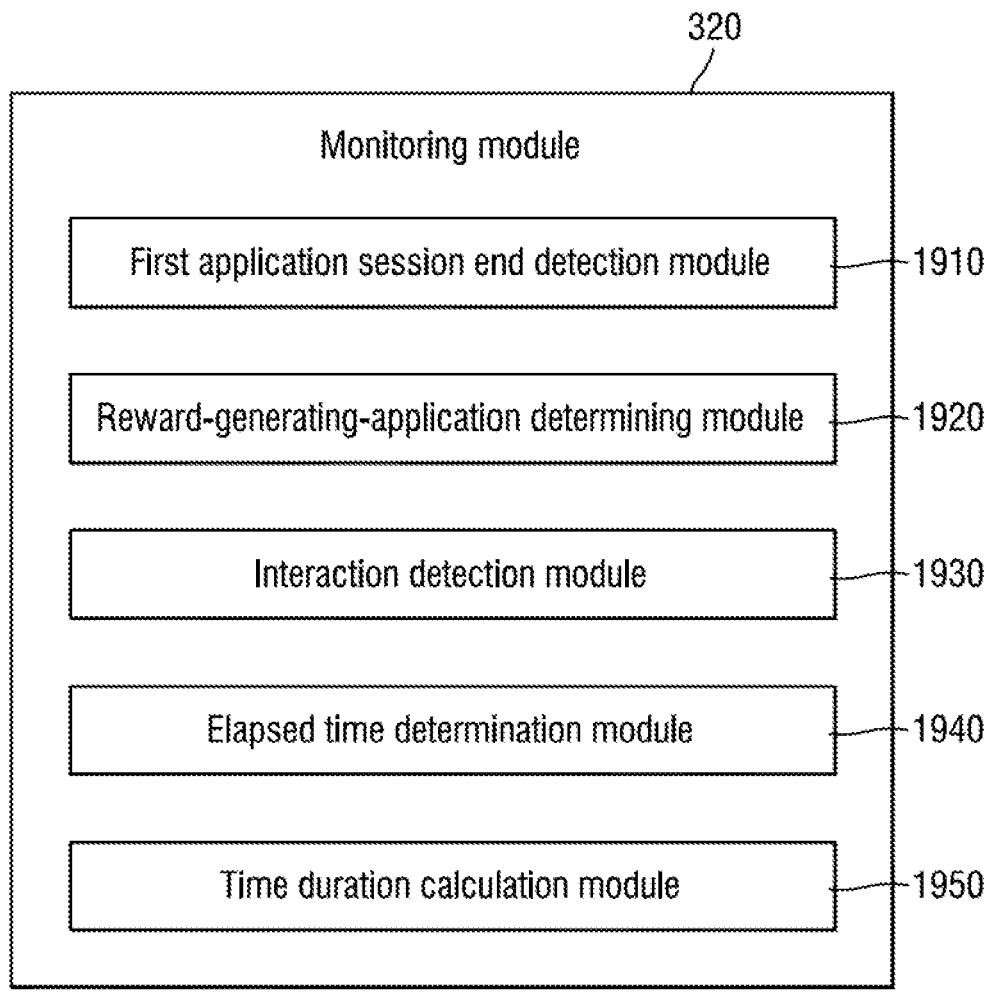
FIG. 19 schematically illustrates functional processing modules of a monitoring module in the fourth embodiment.

FIG. 19 schematically illustrates the functional processing modules of monitoring module 320 in the fourth embodiment.

Referring to FIG. 19, monitoring module 320 comprises a first application session end detection module 1910, a reward-generating-application determining module 1920, an interaction detection module 1930, an elapsed time determination module 1940, and a time duration calculation module 1950.

The first application session end detection module 1910 has the same configuration, and performs the same processing operations, as the first application session end detection module 410 in the first embodiment and accordingly will not be described again here.

Reward-generating-application determining module 1920 has the same configuration, and performs the same processing operations, as the reward-generating-application determining module 1120 in the second embodiment and accordingly will not be described again here.

Interaction detection module 1930 is operable to detect user interactions in a reward-generating application, and to store a time indicative of the time of receipt of each notification. A user interaction may be any user action such as a click, tap, swipe, key pad input, in-app purchase, or any other type of user interaction. Interaction detection module 1930 may detect a user interaction in any of a number of different ways. By way of example, interaction detection module 1930 may read data indicative of a user interaction from a memory, into which the data was written by the operating system of the user processing device. By way of further example, interaction detection module 1930 may receive a notification of a user interaction sent to it by the operating system of the user processing device.

Elapsed time determination module 1940 is operable to determine whether a predetermined time has elapsed since a last user interaction in a reward generating application.

Time duration calculation module 1950 is operable to determine a measure of an engagement of a determined reward-generating application by the user by calculating a measure of time between user interactions in the reward-generating application based upon the received notifications of user interactions.

Figure 20:
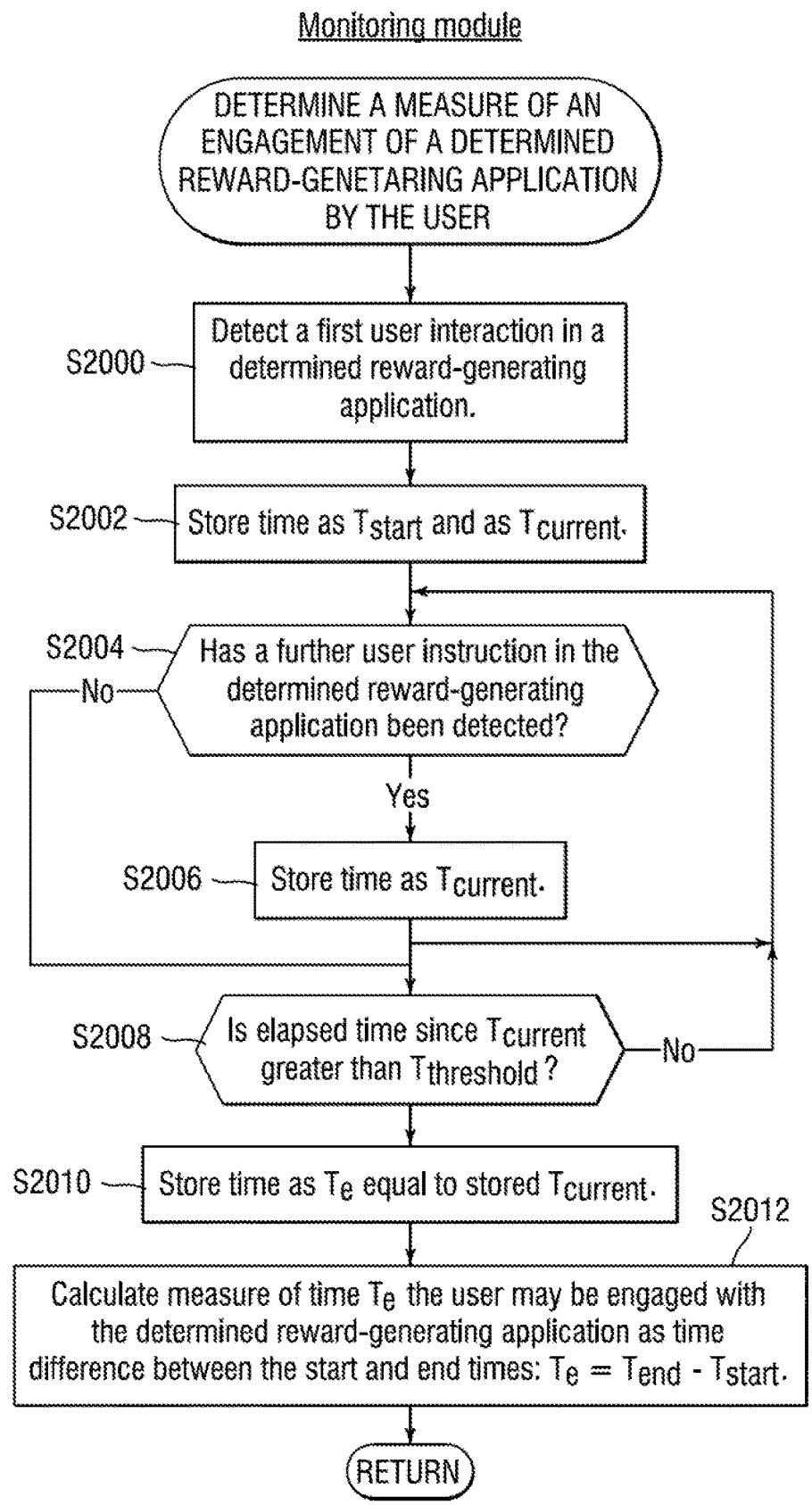
FIG. 20 shows processing operations performed by a monitoring module at step S1402 in the fourth embodiment.

FIG. 20 shows the processing operations performed by the components of monitoring module 320 at step S1402 in the fourth embodiment.

Referring to FIG. 20, at step S2000, interaction detection module 1930 detects a first user interaction in a determined reward-generating application. As noted above, a user interaction may comprise any user interaction, such as a click, tap, swipe, key pad input, in-app purchase, etc. In this embodiment, interaction detection module 1930 detects the first user interaction by reading data indicative of a user interaction from memory, into which the data was written by the operating system of the user processing device. This reading of data from memory to check for data indicative of a first user interaction may be performed at a predetermined frequency, with a time $T_f$ between each reading. However, as noted previously, interaction detection module 1930 may detect user interactions in different ways, for example by receiving notifications of user interactions sent by the operating system of the user processing device.

Upon detection of the first user interaction at step S2000, processing proceeds to step S2002, at which interaction detection module 1930 stores a time indicating the time of detection as a start time $T_{start}$ and also as a time $T_{current}$. The stored start time $T_{start}$ is therefore indicative of a time at which a user session in the determined reward-generating application started.

At step S2004, interaction detection module 1930 checks whether a further user interaction has been detected in the determined reward-generating application. Again, the user interaction may be any user interaction, such as a click, tap, swipe, key pad input, in-app purchase, etc. and, in this embodiment, interaction detection module 1930 detects a user interaction by reading data defining a user interaction from a memory, into which the data was written by the operating system of the user processing device, although detection could be performed in other ways, as described above.

When it is determined at step S2004 that a further user interaction has been detected, processing proceeds to step S2006, at which interaction detection module 1930 stores a time indicative of the time of the detection as time $T_{current}$ (thereby changing the time $T_{current}$ previously stored at step S2002).

On the other hand, when it is determined at step S2004 that no a further user interaction has been detected, then processing proceeds to step S2008, at which elapsed time determination module 1940 determines whether the time that has elapsed since $T_{current}$ stored at step S2006 (or stored at step S2002 if step S2006 has not been performed) is greater than a threshold time $T_{threshold}$.

If it is determined at step S2008 that the elapsed time is not greater than $T_{threshold}$, then processing returns to step S2004. Accordingly, the processing operations at steps S2004, S2006 and S2008 are repeated until no user interaction in the determined reward-generating application is detected for a period of time greater than $T_{threshold}$.

When it is determined at step S2008 that the elapsed time since the last user interaction is greater than $T_{threshold}$, processing proceeds to step S2010, at which a time $T_{end}$, indicative of the time at which the user's session in the determined reward-generating application ended, is set equal to $T_{current}$ previously stored at step S2006 (or step S2002 if step S2006 has not been performed).

At step S2012, time duration calculation module 1950 calculates a measure of an engagement of the determined reward-generating application by the user by calculating a measure of session time during which the user may have been engaged with the determined reward-generating application. In this embodiment, time duration calculation module 1950 calculates a measure of time $T_e$ using the following equation, $$T_e = T_{end} - T_{start} \qquad \text{Equation 6}$$

Time duration calculation module 1950 could use other equations to calculate the measure of time $T_e$ at step S2012. For example, time duration calculation module 1950 may include an error factor in its calculation:

$$T_e = T_{end} - T_{start} + T_{error} \qquad \text{Equation 7}$$

where $T_{error}$ is an error factor that is added to take account of margins for error. For example, $T_{error}$ may be set to a predetermined time value indicative of the resolution of the memory read operations performed at steps S2000 and S2004 by interaction detection module 1930. Thus, by way of example, $T_{error}$ may be set to $T_f$, which is the time between each reading of data by interaction detection module 1930 at steps S2000 and S2004.

In the processing operations described above, time duration calculation module 1950 calculates the measure of time $T_e$ in response to a determination at step S2008 that the elapsed time since the last user interaction is greater than $T_{threshold}$. However, instead, time duration calculation module 1950 may calculate $T_e$ before elapsed time determination module 1940 determines whether the time since the last user interaction is greater than $T_{threshold}$. An example of such processing is shown in FIG. 21.

Figure 21:
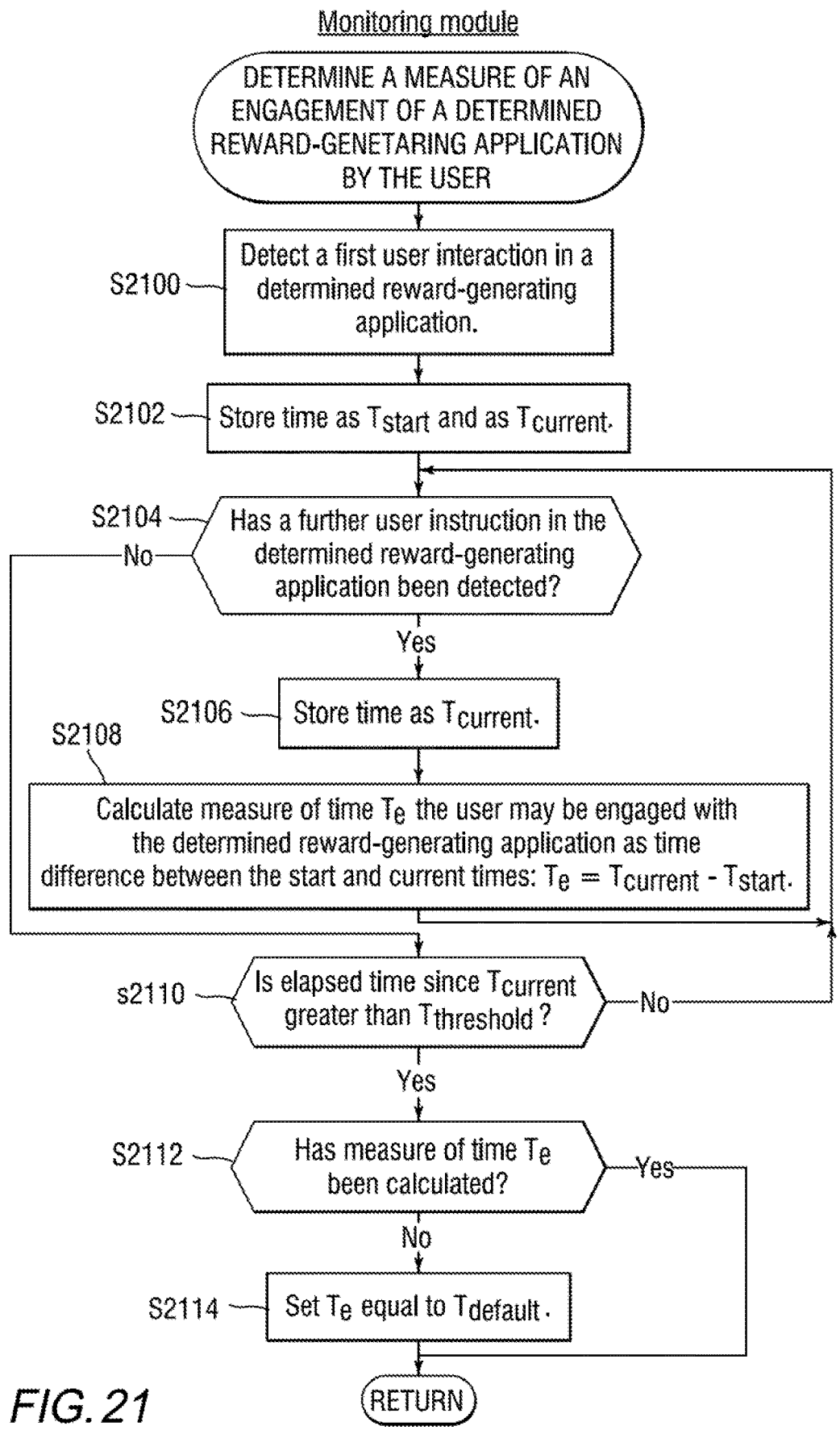
FIG. 21 shows processing operations performed by a monitoring module at step S1402 in a modification of the fourth embodiment.

Referring to FIG. 21, the processing operations steps S2100, S2102, S2104 and S2106 are the same as those in steps S2000, S2002, S2004 and S2006, respectively.

At step S2108, time duration calculation module 1950 calculates $T_e$ using the following equation:

$$T_e = T_{current} - T_{start} \qquad \text{Equation 8}$$

Time duration calculation module 1950 could use other equations to calculate the measure of time $T_e$ at step S2108. For example, time duration calculation module 1950 may include an error factor in its calculation:

$$T_e = T_{end} - T_{start} + T_{error} \qquad \text{Equation 9}$$

where $T_{error}$ is an error factor that is added to take account of margins for error. For example, $T_{error}$ may be set to a predetermined time value indicative of the resolution of the memory read operations performed at steps S2100 and S2104 by interaction detection module 1930. Thus, by way of example, $T_{error}$ may be set to $T_f$, which is the time between each reading of data by interaction detection module 1930 at steps S2100 and S2104.

Following the processing at step S2108, processing returns to step S2104.

When it is determined at step S2104 that no further user interaction has been detected, processing proceeds to step S2110, at which elapsed time determination module 1940 determines whether the elapsed time since $T_{current}$ (indicative of the time of the last user interaction in the determined reward-generating application) is greater than $T_{threshold}$.

If it is determined at step S2110 that the elapsed time is not greater than $T_{threshold}$, then processing returns to step S2104. On the other hand, when it is determined at step S2110 that the elapsed time is greater than $T_{threshold}$, then processing proceeds to step S2112 at which time duration calculation module 1950 determines whether a measure of time $T_e$ was previously calculated at step S2108 (it being possible that step S2108 was not performed if only one user interaction was detected).

If it is determined at step S2112 that no measure of time $T_e$ has been calculated, then processing proceeds to step S2114, at which time duration calculation module 1950 sets the measure of time $T_e$ equal to a predetermined default time $T_{default}$. For example, $T_{default}$ may be set to a predetermined time value that is below the threshold for the user to earn a reward. On the other hand, if it is determined at step S2112 that a measure of time $T_e$ has been calculated, the processing at step S2112 is omitted.

Fifth Embodiment

The components of the fifth embodiment and the processing operations performed thereby are the same as those in the second embodiment, with the exception of the components of monitoring module 320 and the processing operations performed by monitoring module 320 at step S1402. Accordingly, only these differences will be described here.

In the second, third and fourth embodiments, monitoring module 320 is operable to perform processing operations to determine a measure of an engagement of a reward-generating application by a user based upon a length of a session spent in the reward-generating application by the user. As will be explained below, monitoring module 320 in the fifth embodiment is operable to determine a measure of an engagement of a reward-generating application by a user in a different way by performing processing operations to determine a length of time indicative of the time the user was actively interacting with the reward-generating application. This measure of time is different from the time of a session length, as session length also includes time when the user was not interacting with the reward-generating application, but the reward-generating application was in an active state.

Figure 22:
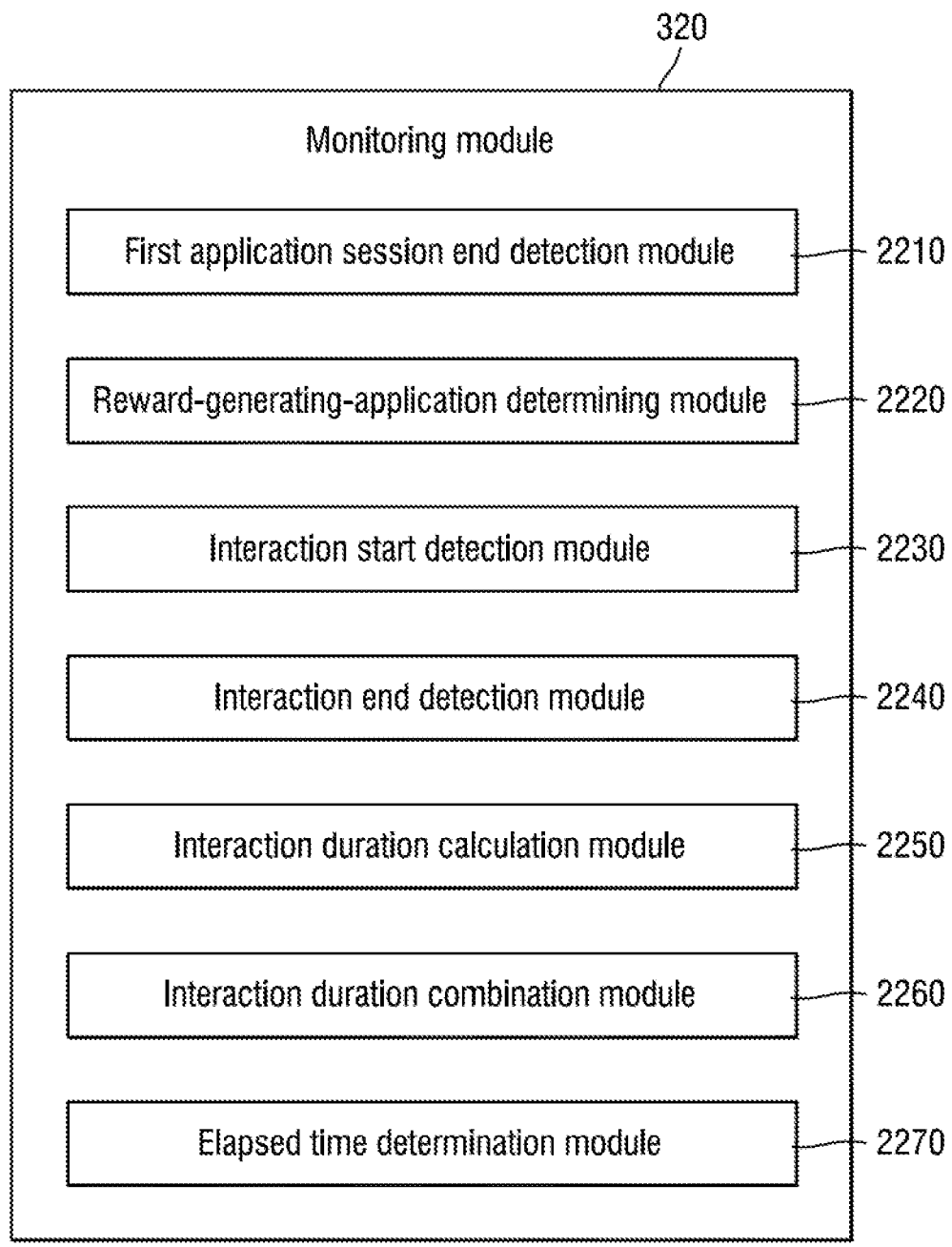
FIG. 22 schematically illustrates functional processing modules of a monitoring module in the fifth embodiment.

FIG. 22 schematically illustrates the functional processing modules of monitoring module 320 in the fifth embodiment.

Referring to FIG. 22, monitoring module 320 comprises a first application session end detection module 2210, a reward-generating-application determining module 2220, an interaction start detection module 2230, an interaction end detection module 2240, an interaction duration calculation module 2250, an interaction duration combination module 2260, and an elapsed time determination module 2270.

The first application session end detection module 2210 has the same configuration, and performs the same processing operations, as the first application session end detection module 410 in the first embodiment and accordingly will not be described again here.

Reward-generating-application determining module 2220 has the same configuration, and performs the same processing operations, as the reward-generating-application determining module 1120 in the second embodiment and accordingly will not be described again here.

Interaction start detection module 2230 is operable to detect a start of a user interaction in a reward-generating application, and to store a time indicative of the time at which the user interaction started. A user interaction may comprise, for example, click, tap, swipe, key pad input, in-app purchase, or any other type of user interaction. Interaction start detection module 2230 may detect a start of a user interaction in any of a number of different ways. By way of example, interaction start detection module 2230 may detect a start of a user interaction by reading data indicative of a start of a user interaction from a memory, into which the data was written by the operating system of the user processing device. By way of further example, interaction start detection module 2230 may detect a start of a user interaction by receiving a notification indicative of a start of a user interaction start from the operating system of the user processing device.

Interaction end detection module 2240 is operable to detect the end of a user interaction in a reward-generating application, and to store a time indicative of the time at which the user interaction ended. Interaction end detection module 2240 may detect an end of a user interaction in any of a number of different ways. By way of example, interaction end detection module 2240 may detect an end of a user interaction by reading data indicative of an end of a user interaction from a memory, into which the data was written by the operating system of the user processing device. By way of further example, interaction end detection module 2240 may detect an end of a user interaction by receiving a notification indicative of an end of a user interaction sent from the operating system of the user processing device.

Interaction duration calculation module 2250 is operable to calculate a time indicative of a duration of an individual user interaction by calculating a measure of time between the start of the user interaction and the end of the user interaction.

Interaction duration combination module 2260 is operable to combine the times of individual user interactions to determine an overall measure of time for all of the user interactions.

Elapsed time determination module 2270 is operable to determine whether a predetermined time has elapsed since the time of the last user interaction in a reward-generating application.

Figure 23:
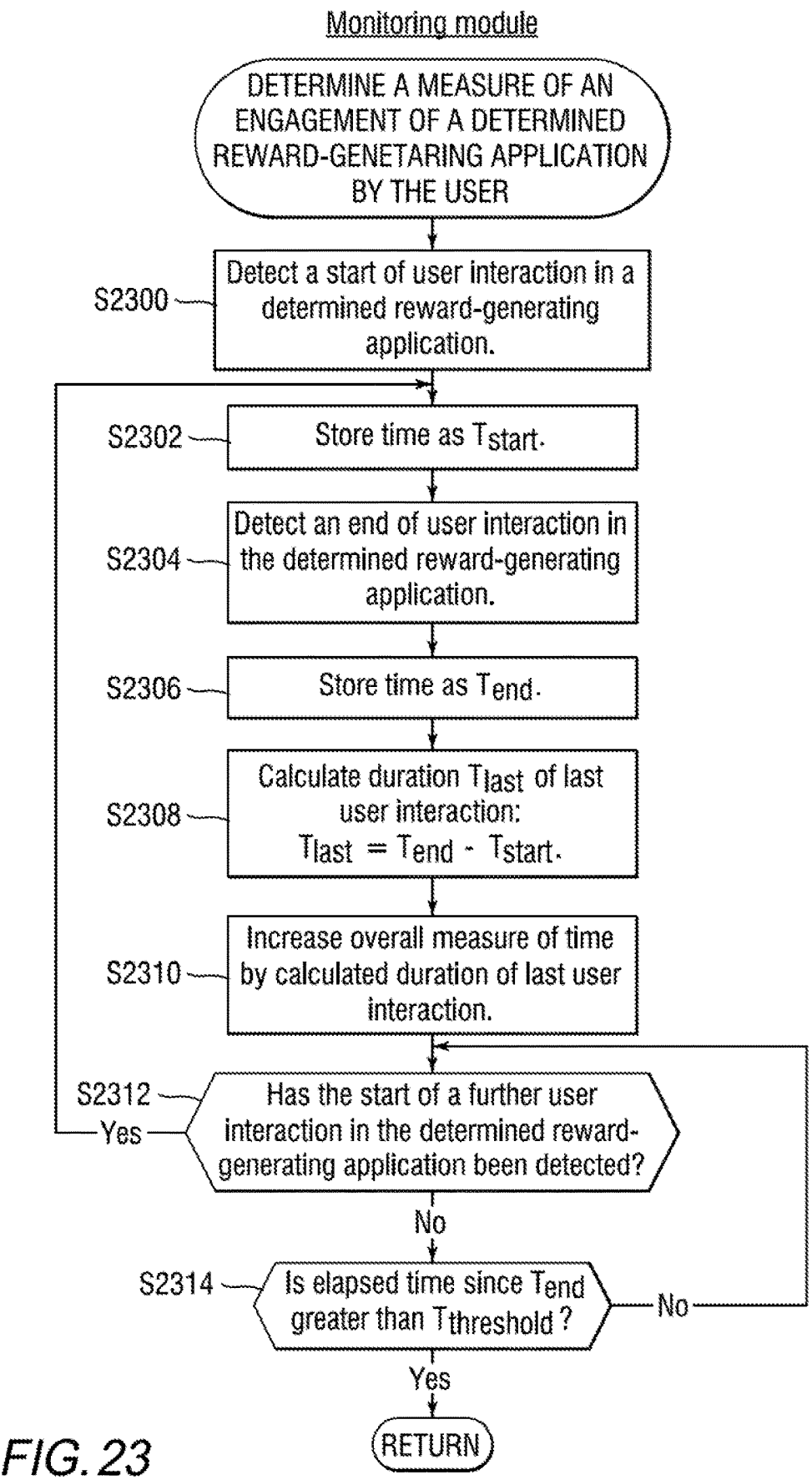
FIG. 23 shows processing operations performed by a monitoring module at step S1402 in the fifth embodiment.

FIG. 23 shows the processing operations performed by the components of monitoring module 320 at step S1402 in the fifth embodiment.

Referring to FIG. 23, at step S2300, interaction start detection module 2230 detects a start of a user interaction in a determined reward-generating application. As noted above, a user interaction may comprise any user interaction, such as a click, tap, swipe, key pad input, in-app purchase, etc. In this embodiment, interaction start detection module 2230 detects a start of a user interaction by reading data indicative of a start of a user interaction from memory, into which the data was written by the operating system of the user processing device. This reading of data from memory to check for data indicative of the start of a user interactive may occur at a predetermined frequency, with a time $T_f$ between each reading. However, as noted previously, interaction start detection module 2230 may detect a start of a user interaction in different ways.

Upon detection of a start of a user interaction at step S2300, processing proceeds to step S2302, at which interaction start detection module 2230 stores a time indicative of the detection as an interaction start time $T_{start}$.

At step S2304, interaction end detection module 2240 detects the end of the user interaction in the determined reward-generating application. In this embodiment, interaction end detection module 2240 detects the end of the user interaction by reading data indicative of the end of the user interaction from a memory, into which the data was written by the operating system of the user processing device. This reading of data from memory may occur at a predetermined frequency with a time $T_f$ between each reading. However, as noted previously, interaction end detection module 2240 may detect the end of the user interaction in different ways.

Upon detection of the end of the user interaction at step S2304, processing proceeds to step S2306, at which interaction end detection module 2240 stores a time indicative of the time of detection as an interaction end time $T_{end}$.

At step S2308, interaction duration calculation module 2250 calculates a time indicative of the length of the last user interaction. In this embodiment, interaction duration calculation module 2250 calculates a measure of time $T_{last}$ using the following equation:

$$T_{last} = T_{end} - T_{start} \qquad \text{Equation 10}$$

Time duration calculation module 2250 could use other equations to calculate the measure of time $T_e$ at step S2308. For example, time duration calculation module 2250 may include an error factor in its calculation:

$$T_{last} = T_{end} - T_{start} + T_{error} \qquad \text{Equation 11}$$

where $T_{error}$ is an error factor that is added to take account of margins for error. For example, $T_{error}$ may be set to a predetermined time value indicative of the time resolution for reading the data from memory at steps S2300 and S2304. Thus, by way of example, $T_{error}$ may be set to $T_f$, which is the time between each reading of data at step S2300 by interaction start detection module 2230 and at step S2304 by interaction end detection module 2240.

At step S2310, interaction duration combination module 2260 calculates an overall measure of time for all of the detected user interactions in the determined reward-generating application. In this embodiment, interaction duration combination module 2260 stores a cumulative overall measure of time and increases the measure by $T_{last}$ calculated at step S2308. Thus, the first time step S2310 is performed, interaction duration combination module 2260 merely stores $T_{last}$ calculated when step S2308 is performed for the first time. On each subsequent iteration of step S2302 to S2312, interaction duration combination module 2260 increases the stored overall measure of time by the value of $T_{last}$ calculated at step S2308 on that iteration. In this way, the overall measure of time stored after step S2310 has been performed is indicative of the total length of all of the detected user interactions in the determined reward-generating application.

At step S2312, interaction start detection module 2230 determines whether a start of a further user interaction in the determined reward-generating application has been detected. The processing at step S2312 is the same as the processing at step S2300 described above. If it is determined at step S2312 that the start of a further user interaction has been detected, then processing returns to S2302.

On the other hand, if it is determined at step S2312 that no start of a further user interaction in the determined reward-generating application has been detected, then processing proceeds to step S2314, at which elapsed time determination module 2270 determines whether the time that has elapsed since time $T_{end}$ previously stored upon the last performance of the processing at step S2306 (this time being indicative of the end of the last user interaction in the determined reward-generating application) is greater than a threshold time $T_{threshold}$. If it is determined at step S2314 that the elapsed time is not greater than $T_{threshold}$, then processing returns to step S2312.

On the other hand, if it is determined at step S2314 that the elapsed time since the end of the last user interaction in the determined reward-generating application is greater than the threshold time, then the processing by monitoring module 320 at step S1402 ends.

In the processing operations described above, interaction duration combination module 2260 calculates the overall measure of time indicative of the length of all of the detected user interactions in the determined reward-generating application before processing is performed at step S2314 to determine whether the elapsed time since the end of the last user interaction in the determined reward-generating application is greater than a predetermined threshold. However, instead, interaction combination module 2260 may be arranged to calculate the overall measure of time after it is determined that the time since the end of the last user interaction in the determined reward-generating application is greater than a threshold time. An example of this processing is shown in FIG. 24.

Figure 24:
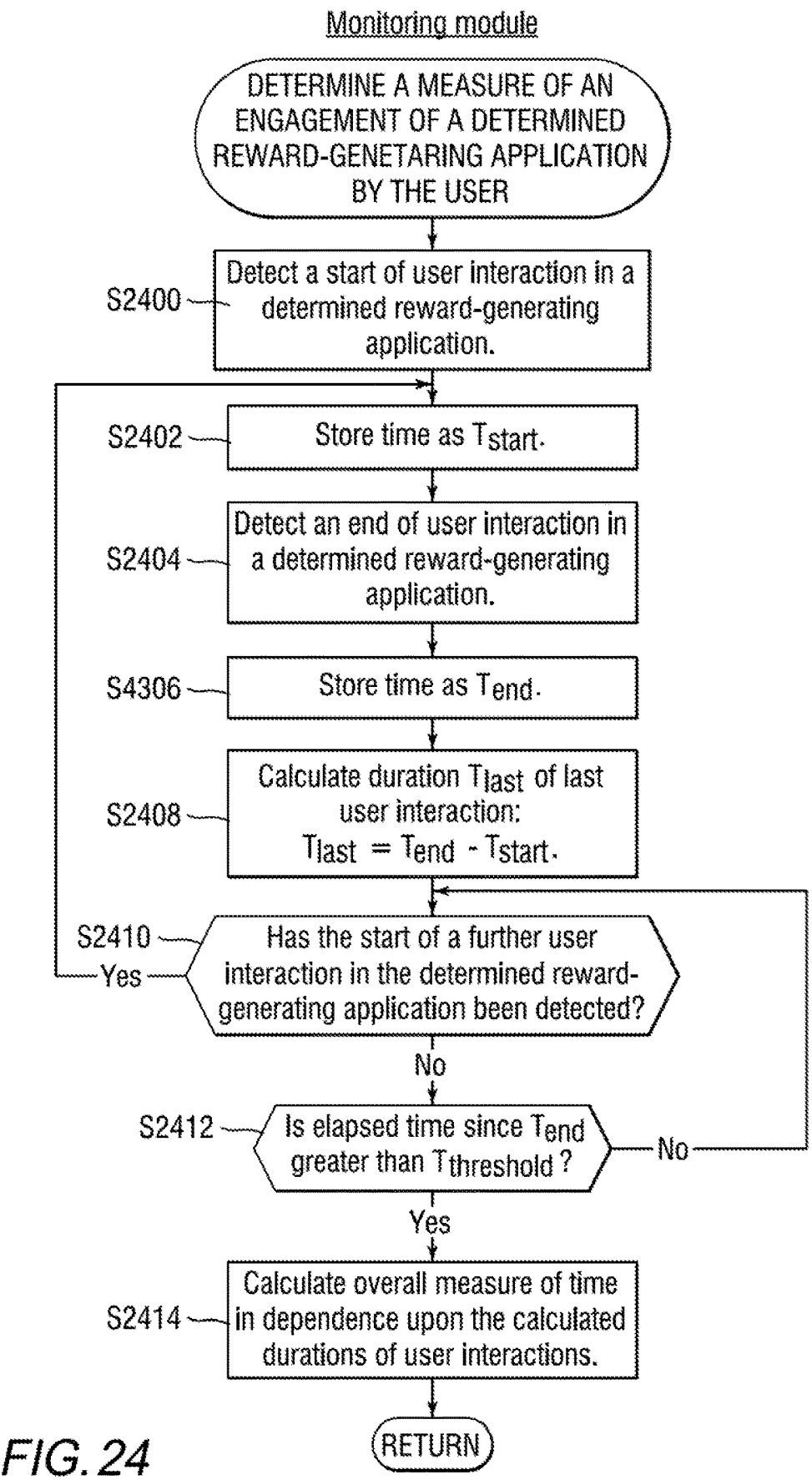
FIG. 24 shows processing operations performed by a monitoring module at step S1402 in a modification of the fifth embodiment.

Referring to FIG. 24, steps S2400, S2402, S2404, S2406 and S2408 are the same as steps S2300, S2302, S2304, S2306 and S2308, respectively, in FIG. 23.

At step S2410, interaction start detection module 2230 determines whether the start of a further user interaction in the determined reward-generator application has been detected (the processing at step S2410 being the same as the processing at step S2300 described above). If it is determined at step S2410 that the start of a further user interaction has been detected, then processing returns to step S2402.

On the other hand, if it is determined at step S2410 that no start of a further user interaction in the determined reward-generating application has been detected, then processing proceeds to step S2412, at which elapsed time determination module 2270 determines whether the time elapsed since the end of the last user interaction in the determined reward-generating application (this time being indicated by the time $T_{end}$ last stored at step S2406) is greater than a threshold time $T_{threshold}$. If it is determined at step S2412 that the elapsed time is not greater than the threshold time, then processing returns to step S2410.

On the other hand, when it is determined at step S2412 that the elapsed time since the end of the last user interaction is greater than the threshold time, processing proceeds to step S2414, at which interaction duration combination module 2260 calculates an overall measure of time for all of the detected user interactions in the determined reward-generating application. In this embodiment, interaction duration combination module 2260 calculates the overall measure of time by combining the durations of the individual user interactions calculated and stored at step S2408.

Sixth Embodiment

The components of the sixth embodiment and the processing operations performed thereby are the same as those in the second embodiment, with the exceptions of the components of monitoring module 320 and the processing operations performed by monitoring module 320 at step S1402. Accordingly, only these differences will be described here.

As will be explained below, monitoring module 320 in the sixth embodiment is operable to determine a measure of an engagement of a reward-generating application by a user by performing processing operations to determine a length of time indicative of the time the user was actively interacting with the reward-generating application. The processing operations performed by monitoring module 320 to determine a measure of time indicative of the length of time the user was actively interacting with a reward-generating application are different from the processing operations performed in the fifth embodiment.

Figure 25:
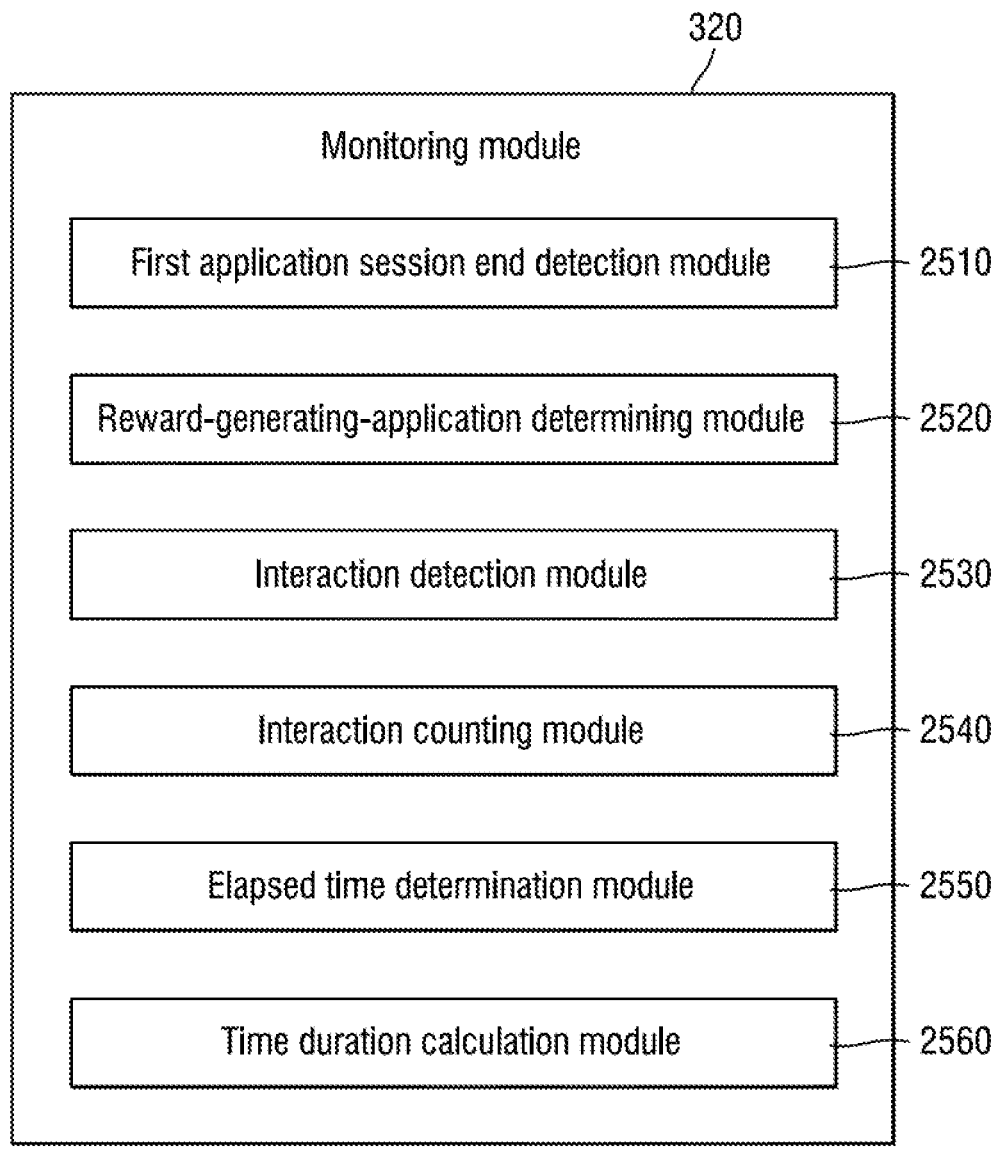
FIG. 25 schematically illustrates functional processing modules of a monitoring module in the sixth embodiment.

FIG. 25 schematically illustrates the functional processing modules of monitoring module 320 in the sixth embodiment.

Referring to FIG. 25, monitoring module 320 comprises a first application session end detection module 2510, a reward-generating-application determining module 2520, an interaction detection module 2530, an interaction counting module 2540, an elapsed time determination module 2550, and a time duration calculation module 2560.

The first application session end detection module 2510 has the same configuration, and performs the same processing operations, as the first application session end detection module 410 in the first embodiment and accordingly will not be described again here.

Reward-generating-application determining module 2520 has the same configuration, and performs the same processing operations, as the reward-generating-application determining module 1120 in the second embodiment and accordingly will not be described again here.

Interaction detection module 2530 is operable to detect user interactions in a reward-generating application, and to store a time indicative of the time of detection. A user interaction may comprise any type of user interaction, such as a click, tap, swipe, key pad input, in-app purchase, etc. Interaction detection module 2530 may detect a user interaction in any of a number of different ways. For example, interaction detection module 2530 may detect a user interaction by reading data indicative of a user interaction from a memory, into which the data has been written by the operating system of the user processing device. By way of a further example, interaction detection module 2530 may detect a user interaction by receiving a notification indicative of a user interaction sent from the operating system of the user processing device.

Interaction counting module 2540 is operable to count the number of detected user interactions in a reward-generating application.

Elapsed time determination module 2550 is operable to determine whether a time since a last user interaction in the reward-generating application exceeds a threshold.

Time duration calculation module 2560 is responsive to a determination by the elapsed time determination module 2550 that the threshold has been exceeded to calculate a measure of time indicative of the time during which the user was actively interacting with a reward-generating application in dependence upon the determined number of user interactions.

Figure 26:
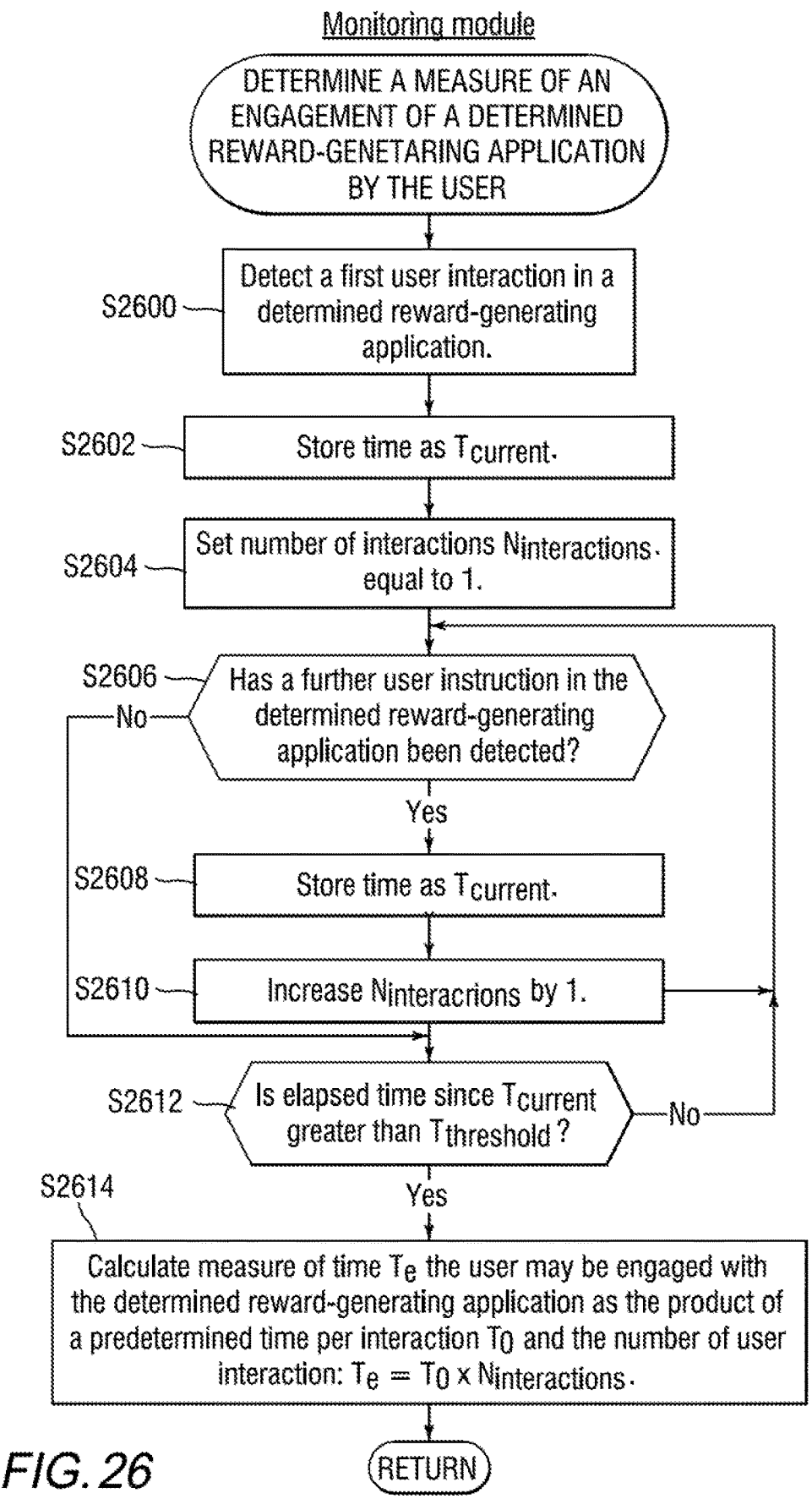
FIG. 26 shows processing operations performed by a monitoring module at step S1402 in the sixth embodiment.

FIG. 26 shows the processing operations performed by the components of monitoring module 320 at step S1402 in the sixth embodiment.

Referring to FIG. 26, at step S2600, interaction detection module 2530 detects a first user interaction in a determined reward-generating application. As noted above, a user interaction may comprise, for example, a click, tap, swipe, key pad input, in-app purchase, or any other user interaction. In this embodiment, interaction detection module 2530 detects the first user interaction by reading data indicative of a first user interaction from memory, into which the data was written by the operating system of the user processing device. This reading of data from memory to check for data indicative of the first user interaction may occur at a predetermined frequency with a time $T_f$ between each reading. However, as noted previously, interaction detection module 2530 may detect a first user interaction in different ways.

Upon detection of the first user interaction in a reward-generating application, processing proceeds to step S2602, at which interaction detection module 2530 stores a time $T_{current}$ indicative of the time of detection.

At step S2604, interaction counting module 2540 sets the value of a counter defining the number of user interactions $N_{interactions}$ equal to 1.

At step S2606, interaction detection module 2530 determines if a further user interaction in the determined reward-generating application has been detected (the processing at step S2606 being the same as the processing at step S2600 described above). If it is determined at step S2606 that a further user interaction has not been detected, then processing proceeds to step S2612, which will be described below.

On the other hand, if it is determined at step S2606 that a further user interaction has been detected, then processing proceeds to step S2608, at which interaction detection module 2530 replaces currently-stored time $T_{current}$ with a new time $T_{current}$ indicative of the time at which the further notification was detected.

At step S2610, interaction counting module 2540 increases the value of the counter defining the number of detected user interactions in the determined reward-generating application by 1. Processing then returns to step S2606.

When it is determined at step S2606 that no further user interaction in the determined reward-generating application has been detected, processing proceeds to step S2612, at which elapsed time determination module 2550 determines whether the elapsed time since the last user interaction in the determined reward-generating application (indicated by the currently-stored value of $T_{current}$ is greater that a threshold time $T_{threshold}$.

If it is determined at step S2612 that the elapsed time since the last user interaction is not greater than the threshold time, then processing returns to step S2606.

On the other hand, if it is determined at step S2612 that the elapsed time since the last user interaction is greater than the threshold time, then processing proceeds to step S2614, at which time duration calculation module 2560 calculates a measure of time indicative of the length of time during which the user was actively interacting with the reward-generating application. In this embodiment, time duration calculation module 2560 calculates the measure of time by multiplying the number of user interactions by a predetermined time value $T_0$ that is indicative of a typical time duration for an individual user interaction in accordance with the following equation (although other equations could be used instead):

$$T_e = T_0 \times N_{interactions} \qquad \text{Equation 12}$$

In the sixth embodiment described above, no distinction is made between different types of user interactions in the determined reward-generating application. Consequently, each user interaction, irrespective of its type, increases the value of the counter by one and increases the measure of time calculated at step S2614 by $T_0$. As a modification, however, interaction detection module 2530 may determine the type of each interaction, for example, by reading data defining the type of user interaction from memory, into which the data was written by the operating system of the user processing device, or by receiving a notification of the type of the user interaction sent by the operating system of the user processing device. In this case, a separate count may be maintained for each type of user interaction and, at step S2614, each respective count may be multiplied by a different predetermined time value that is indicative of a typical length of a user interaction of that type, with the respective overall times for each type of user interaction then being combined together to give a combined overall time.

Seventh Embodiment

The components of the seventh embodiment and the processing operations performed thereby are the same as those in the second embodiment, with the exception of the components of monitoring module 320 and the processing operations performed by monitoring module 320 at step S1402. Accordingly, only these differences will be described here.

As will be explained below, monitoring module 320 in this seventh embodiment is operable to determine a measure of an engagement of a reward-generating application by a user by performing processing operations to determine a length of time that is indicative of the length of time during which the user was actively interacting with the reward-generating application. The processing operations performed by monitoring module 320 to determine this length of time are different from the processing operations performed in the fifth and sixth embodiments.

Figure 27:
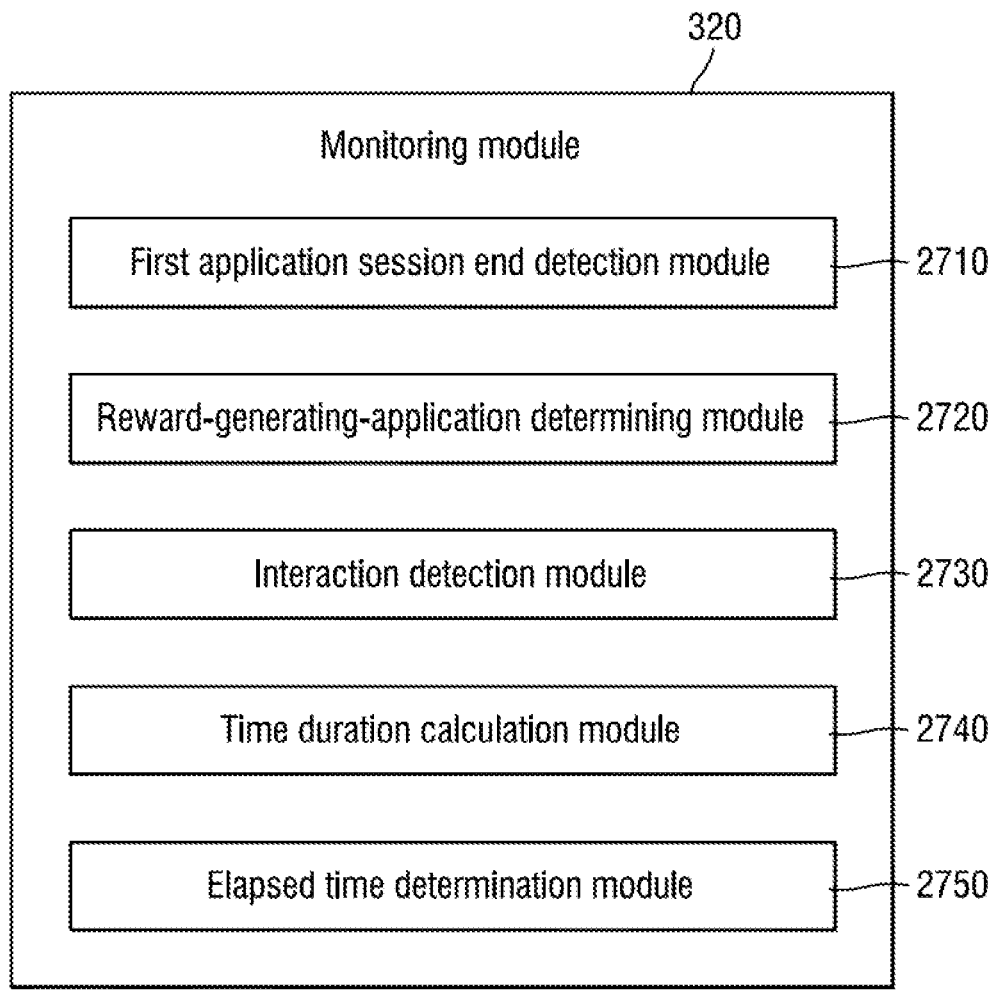
FIG. 27 schematically illustrates functional processing modules of a monitoring module in the seventh embodiment.

FIG. 27 schematically illustrates the functional processing modules of monitoring module 320 in the seventh embodiment.

Referring to FIG. 27, monitoring module 320 comprises a first application session end detection module 2710, a reward-generating-application determining module 2720, an interaction detection module 2730, a time duration calculation module 2740, and an elapsed time determination module 2750.

The first application session end detection module 2710 has the same configuration, and performs the same processing operations, as the first application session end detection module 510 in the first embodiment and accordingly will not be described again here.

Reward-generating-application determining module 2720 has the same configuration, and performs the same processing operations, as the reward-generating-application determining module 1120 in the second embodiment and accordingly will not be described again here.

Interaction detection module 2730 is operable to detect user interactions in a reward-generating application, and to store a time indicative of the time of detection of each user interaction. A user interaction may comprise any user interaction, such as a click, tap, swipe, key pad input, in-app purchase, etc. Interaction detection module 2730 may detect a user interaction in any of a number of different ways. For example, interaction detection module 2730 may read data indicative of a user interaction from memory, into which the data was written by the operating system of the user processing device. By way of further example, interaction detection module 2730 may detect a user interaction by receiving a notification indicative of a user interaction sent by the operating system of the user processing device.

Time duration calculation module 2740 is operable to calculate a measure of time indicative of the time the user was actively interacting with a reward-generating application in dependence upon the detected user interactions.

Elapsed time determination module 2750 is operable to determine whether the elapsed time since the last user interaction in a reward-generating application exceeds a predetermined threshold.

Figure 28:
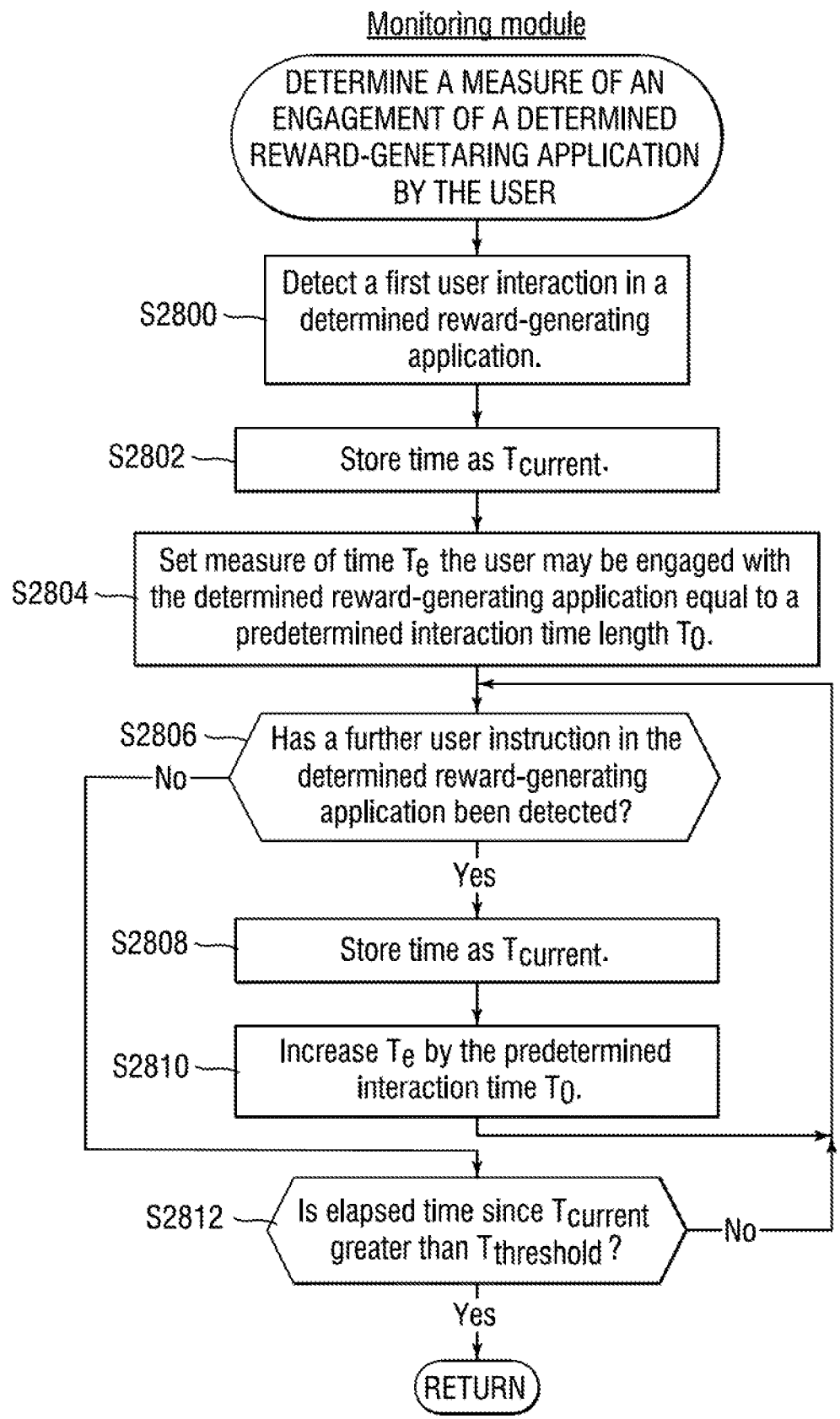
FIG. 28 shows processing operations performed by a monitoring module at step S1402 in the seventh embodiment.

FIG. 28 shows the processing operations performed by the components of monitoring module 320 at step S1402 in the seventh embodiment.

Referring to FIG. 28, at step S2800, interaction detection module 2730 detects a first user interaction in a determined reward-generating application. As noted above, a user interaction may comprise for example, a click, tap, swipe, key pad input, in-app purchase, or any other user interaction. In this embodiment, interaction detection module 2730 detects a user interaction by reading data indicative of a user interaction from memory, into which the data was written by the operating system of the user processing device. This reading of data from memory to check for data indicative of a user interaction may occur at a predetermined frequency, with a time $T_f$ between each reading. However, as noted previously, interaction detection module 2730 may detect a user interaction in different ways.

Upon detection of a first user interaction at step S2800, processing proceeds to step S2802, at which interaction detection module 2740 stores a time $T_{current}$ indicative of the time at which the detection was made.

At step S2804, time duration calculation module sets the value of a time $T_e$, indicative of the time during which the user was actively interacting with the reward-generating application by performing the first user interaction, equal to a predetermined time $T_0$ that is a typical time length for a user interaction.

At step S2806, interaction detection module 2730 determines whether a further user interaction in the determined reward-generating application has been detected (the processing at step S2806 being the same as the processing at step S2800 described above).

If it is determined at step S2806 that a further user interaction has been detected, then processing proceeds to step S2808, at which interaction detection module 2730 stores a time $T_{current}$ indicative of the time at which the detection was made.

At step S2810, time duration calculation module 2740 increases the stored time $T_e$ by the predetermined time value $T_0$ that is indicative of a typical time duration for a user interaction. Processing then returns to step S2806.

When it is determined at step S2806 that no further user interaction in the determined reward-generating application has been detected, processing proceeds to step S2812, at which elapsed time determination module 2750 determines whether the time since the last user interaction in the determined reward-generating application (indicated by the currently-stored value of $T_{current}$) is greater than a threshold time $T_{threshold}$.

If it is determined at step S2812 that the elapsed time is not greater than the threshold time, then processing returns to step S2806. On the other hand, if it is determined at step S2812 that the elapsed time is greater than the threshold, then the processing operations by monitoring module 320 at step S1402 end.

In the seventh embodiment described above, no distinction is made between different types of user interactions in the determined reward-generating application. Consequently, each user interaction, irrespective of its type, contributes the same length of time $T_0$ to the overall measure of time indicative of how long the user was interacting with the reward-generating application. However, as a modification, interaction detection module 2730 may determine the type of each user interaction, for example, by reading data defining the type of user interaction from memory, into which the data was written by the operating system of the user processing device, or by receiving a notification of the type of the user interaction sent by the operating system of the user processing device. Time duration calculation module 2740 may then increase the stored measure of time $T_e$ by a different predetermined time duration $T_0$ in dependence upon the type of interaction.

Eighth Embodiment

The components of the eighth embodiment and the processing operations performed thereby are the same as those in the second embodiment, with the exception of the components of monitoring module 320 and the processing operations performed by monitoring module 320 at step S1402. Accordingly, only these differences will be described here.

As will be explained below, monitoring module 320 in the eighth embodiment is operable to determine a measure of an engagement of a reward-generating application by a user by performing processing operations to determine the number of user interactions in the reward-generating application. Thus, in the eighth embodiment, the determined measure of engagement of a reward-generating application by a user is not a measure of time, as in the proceeding embodiments.

Figure 29:
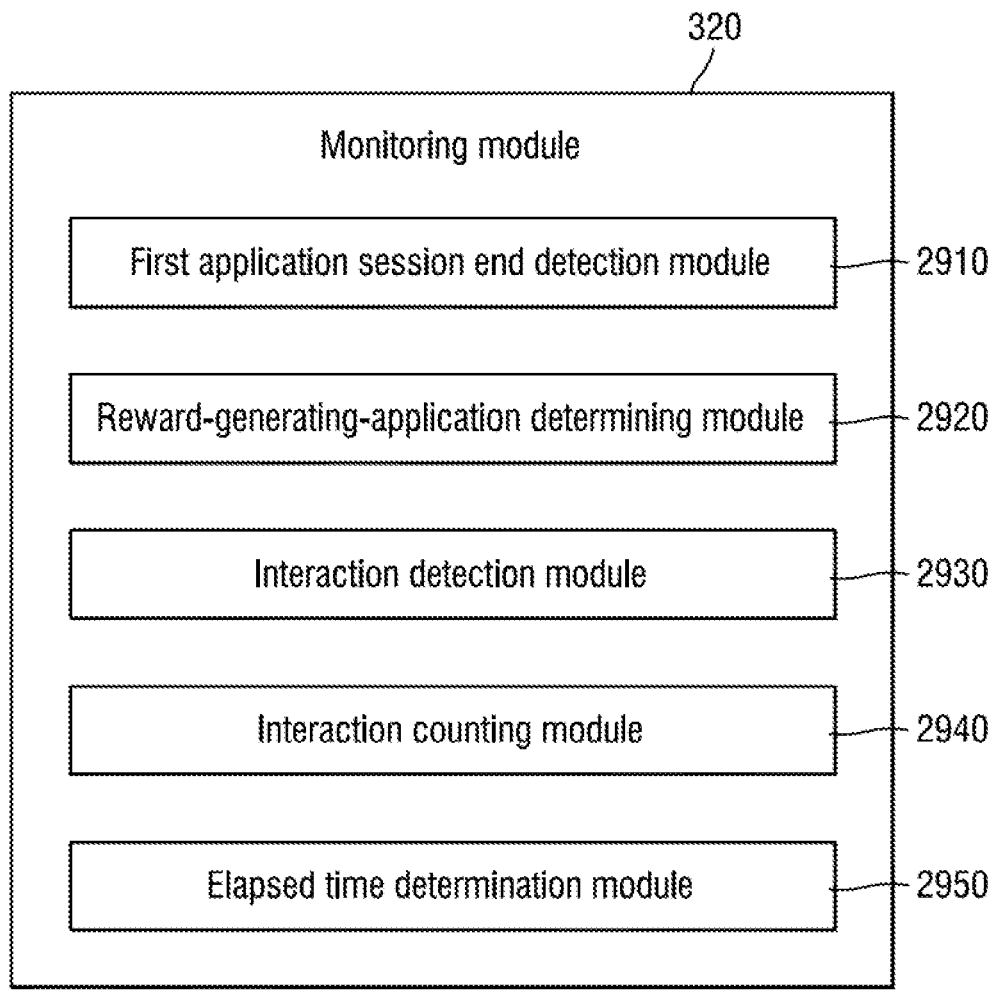
FIG. 29 schematically illustrates functional processing modules of a monitoring module in the eighth embodiment.

FIG. 29 schematically illustrates the functional processing modules of monitoring module 320 in the eighth embodiment.

Referring to FIG. 29, monitoring module 320 comprises a first application session end detection module 2910, a reward-generating-application determining module 2920, an interaction detection module 2930, an interaction counting module 2940, and an elapsed time determination module 2950.

The first application session end detection module 2910 has the same configuration, and performs the same processing operations, as the first application session end detection module 410 in the first embodiment and accordingly will not be described again here.

Reward-generating-application determining module 2920 has the same configuration, and performs the same processing operations, as the reward-generating-application determining module 1120 and availability module 1160, respectively, in the second embodiment and accordingly will not be described again here.

Interaction detection module 2930 is operable to detect user interactions in a reward-generating application and to store a respective time for each detection. A user interaction may comprise any user interaction, such as a click, tap, swipe, key pad input, in-app purchase, etc. Interaction detection module 2930 may detect a user interaction in any of a number of different ways. For example, interaction detection module 2930 may detect a user interaction by reading data indicative of a user interaction from a memory, into which the data was written by the operating system at the user processing device. By way of further example, interaction detection module 2930 may detect a user interaction by receiving a notification indicative of a user interaction sent by the operating system of the user processing device.

Interaction counting module 2940 is operable to count the number of detected user interactions in a reward-generating application.

Elapsed time determination module 2950 is operable to determine whether the time elapsed since the last user interaction in a reward-generating application exceeds a predetermined threshold.

Figure 30:
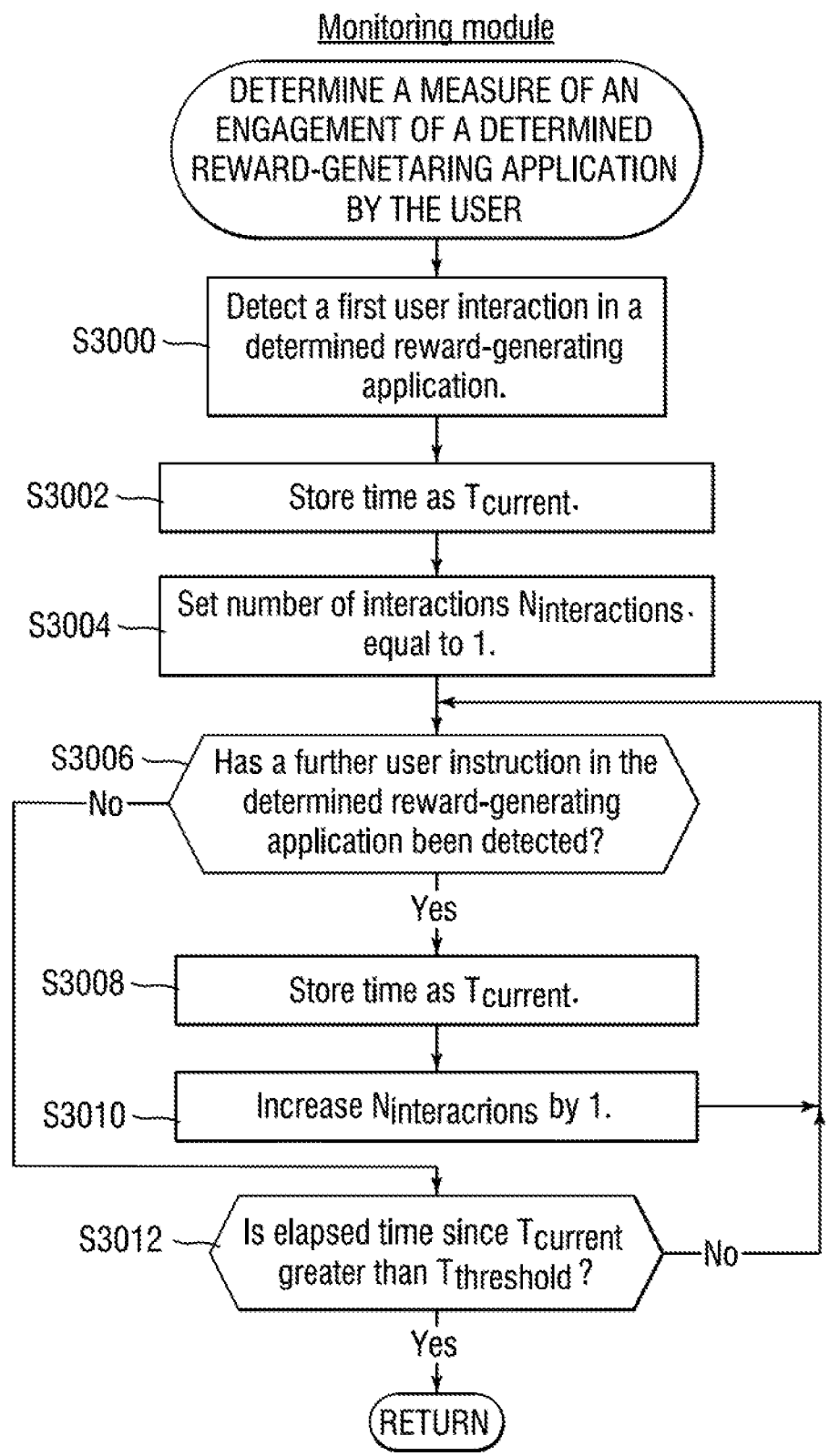
FIG. 30 shows processing operations performed by a monitoring module at step S1402 in the eighth embodiment.

FIG. 30 shows the processing operations performed by the components of monitoring module 320 at step S1402 in the eighth embodiment.

Referring to FIG. 30, at step S3000, interaction detection module 2930 detects a first user interaction in a determined reward-generating application. As noted above, a user interaction may comprise for example, a click, tap, swipe, key pad input, in-app purchase, or any other user interaction. In this embodiment, interaction detection module 2930 detects a user interaction by reading data indicative of a user interaction from memory, into which the data was written by the operating system of the user processing device. This reading of data from memory to check for data indicative of a user interaction may occur at a predetermined frequency with a time $T_f$ between each reading. However, as noted previously, interaction detection module 2930 may detect a user interaction in different ways.

Upon detection of a first user interaction at step S3000, processing proceeds to step S3002, at which interaction detection module 2930 stores a time $T_{current}$ indicative of the time of the detection.

At step S3004, interaction counting module 2940 sets the value of a counter indicative of the number interactions $N_{interactions}$ performed by the user in the reward-generating application equal to 1.

At step S3006, interaction detection module 2930 determines whether a further user interaction in the determined reward-generating application has been detected (the processing at step S3006 being the same as the processing at step S3000 described above).

If it is determined at step S3006 that a further user interaction has been detected, processing proceeds to step S3008, at which interaction detection module 2930 stores a time $T_{current}$ indicative of the detection time.

At step S3010, interaction counting module 2940 increases the value of the counter defining the number of interactions $N_{interactions}$ performed by the user in the determined reward-generating application by 1. Processing then returns to step S3006.

When it is determined at step S3006 that no further user interaction in the determined reward-generating application has been detected, processing proceeds to step S3012, at which elapsed time determination module 2950 determines whether the elapsed time since the last user interaction in the determined reward-generating application (indicated by the currently-stored value $T_{current}$) is greater than a threshold time $T_{threshold}$.

If it is determined that the elapsed time since the last user interaction is not greater than the threshold, then processing returns to step S3006. On the other hand, when it is determined at step S3012 that the elapsed time since the last user interaction is greater than the threshold, the processing by monitoring module 320 at step S1402 ends.

Ninth Embodiment

The components of the ninth embodiment and the processing operations performed thereby are the same as those in the second embodiment, with the exception of the components of monitoring module 320 and the processing operations performed by monitoring module 320 at step S1402. Accordingly, only these differences will be described here.

As will be explained below, monitoring module 320 in the ninth embodiment is operable to determine a measure of an engagement of a reward-generating application by a user by performing processing operations to determine a length of a session spent in the reward-generating application by the user. The processing operations performed by monitoring module 320 to determine a session length are different from the processing operations performed in the second, third and fourth embodiments.

Figure 31:
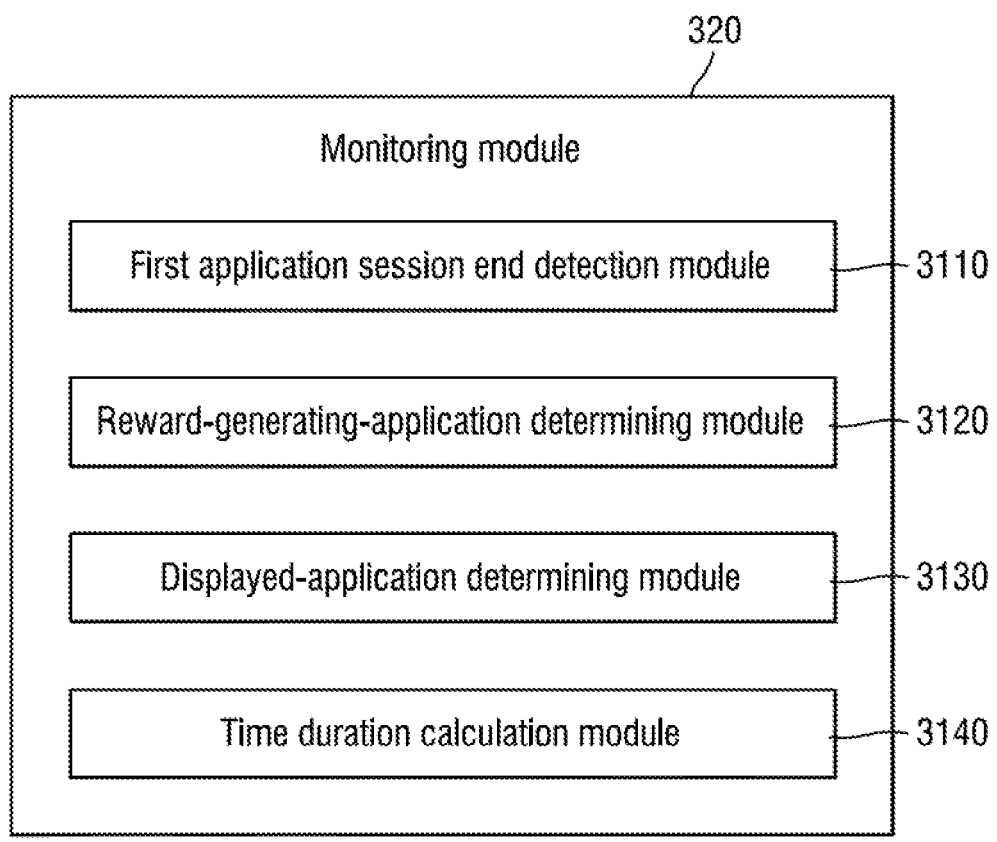
FIG. 31 schematically illustrates functional processing modules of a monitoring module in a ninth embodiment.

FIG. 31 schematically illustrates the functional processing modules of monitoring module 320 in the ninth embodiment.

Referring to FIG. 31, monitoring module 320 comprises a first application session end detection module 3110, a reward-generating-application determining module 3120, a displayed-application determining module 3130, and a time duration calculation module 3140.

The first application session end detection module 3110 has the same configuration, and performs the same processing operations, as the first application session end detection module 410 in the first embodiment and accordingly will not be described again here.

Reward-generating-application determining module 3120 has the same configuration, and performs the same processing operations, as the reward-generating-application determining module 1120 in the second embodiment and accordingly will not be described again here.

Displayed-application determining module 3130 is operable to determine an application currently displayed to a user and to determine whether the application displayed to the user is a determined reward-generating application. Displayed-application determining module 3130 is further operable to store a time at which the application currently displayed to the user is first determined to be a reward-generating application to be monitored and at a time at which the application currently displayed to the user is determined to be no longer that reward-generating application. Displayed-application determining module 3130 may determine an application currently being displayed to a user in a number of different ways. For example, displayed-application determining module 3130 may determine an application displayed to a user by reading data indicative of a currently displayed application from memory, into which the data was written by the operating system of the user processing device. By way of further example, displayed-application determining module 3130 may determine an application displayed to a user by receiving a notification indicative of the displayed application sent by the operating system of the user processing device.

Time duration calculation module 3140 is operable to determine a measure of engagement of a reward-generating application by a user by calculating a measure of time between the first time at which the application currently displayed to the user is determined to be a reward-generating application and the time at which the application currently displayed to the user is determined to be no longer the reward-generating application.

Figure 32:
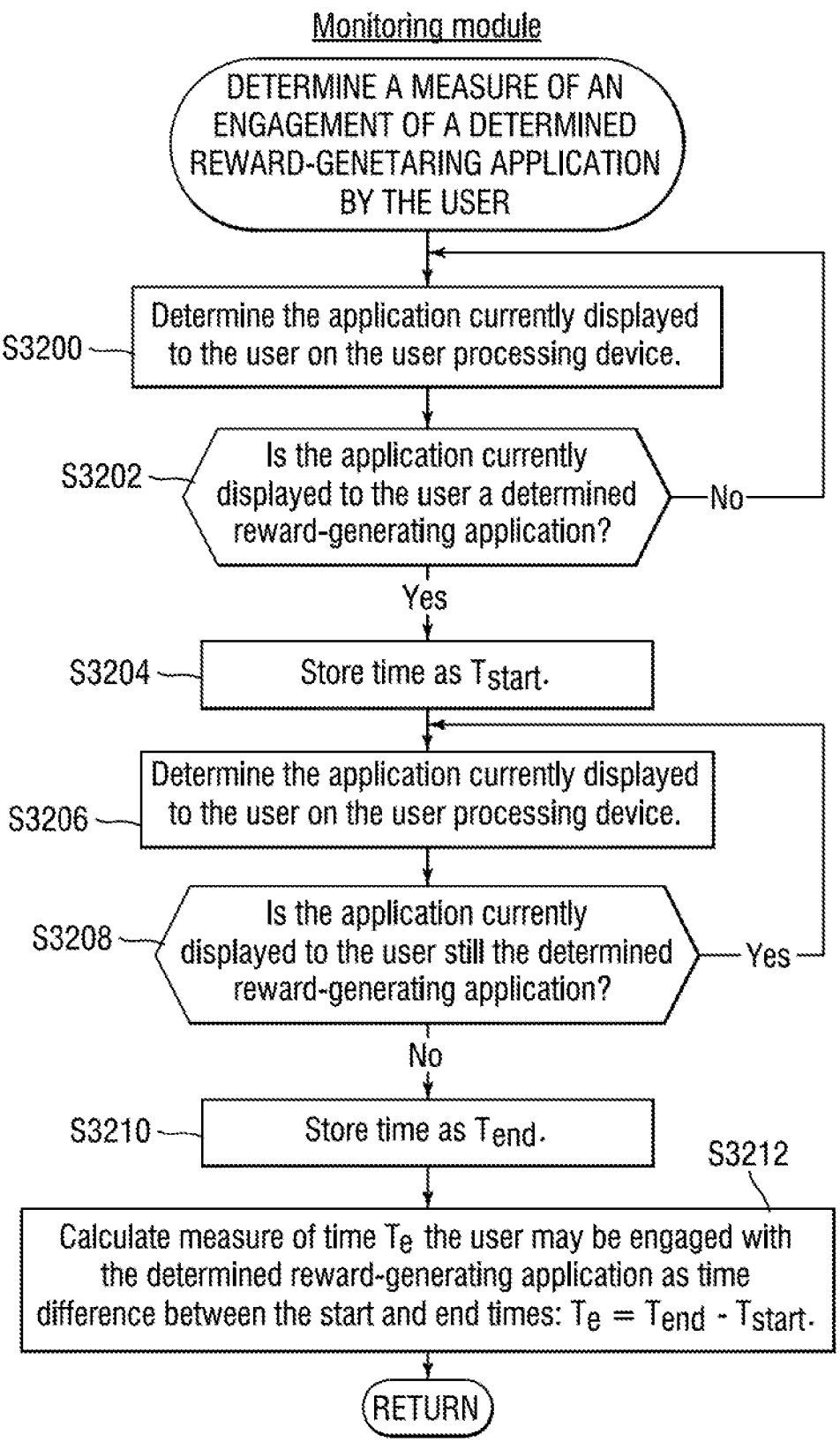
FIG. 32 shows processing operations performed by a monitoring module at step S1402 in the ninth embodiment.

FIG. 32 shows the processing operations performed by components of monitoring module 320 at step S1402 in the ninth embodiment.

Referring to FIG. 32, at step S3200, displayed-application determining module 3130 determines the application currently displayed to the user on the user processing device. In this embodiment, displayed-application determining module 3130 determines the application currently displayed to the user by reading data indicative of the currently displayed application from memory, into which the data was written by the operating system of the user processing device. This reading of data from memory may occur at a predetermined frequency with a time $T_f$ between each reading. However, as noted previously, displayed-application determining module 3130 may determine the application currently displayed to the user in different ways.

At step S3202, displayed-application determining module 3130 determines whether the application currently displayed to the user is a determined reward-generating application.

When it is determined at step S3202 that the application currently displayed to the user is a determined reward-generating application, processing proceeds to step S3204, at which displayed-application determining module 3130 stores the current time as a start time $T_{start}$.

At step S3206, displayed-application determining module 3130 again determines the application currently displayed to the user on the user processing device. This processing is the same as the processing at step S3200 described above.

At step S3208, displayed-application determining module 3130 determines whether the application currently displayed to the user is still the determined reward-generating application.

When it is determined at step S3208 that the application currently displayed to the user is no longer the determined reward-generating application, this is indicative of the end of the user's session in the determined reward-generating application and so processing proceeds to step S3210, at which displayed-application determining module 3130 stores the current time as an end time $T_{end}$.

At step S3212, time duration calculation module 3140 calculates a measure of time indicative of the time that the user may have been engaged with the determined reward-generating application. In this embodiment, time duration calculation module 3140 calculates the measure of time, $T_e$, using the following equation:

$$T_e = T_{end} - T_{start} \qquad \text{Equation 13}$$

Time duration calculation module 3140 could use other equations to calculate the measure of time $T_e$ at step S3212.

For example, time duration calculation module 3140 may include an error factor in its calculation:

$$T_e = T_{end} - T_{start} + T_{error} \quad \text{Equation 14}$$

where $T_{error}$ is an error factor that is added to take account of margins of error. For example, $T_{error}$ may be set to a predetermined time value indicative of the time resolution for obtaining the data at steps S3200 and S3206 defining the application currently displayed to the user on the user processing device. Thus, by way of example, $T_{error}$ may be set to $T_f$, which is a time between each reading of data from memory by displayed-application determining module 3130 at steps S3200 and S3206.

Figure 33:
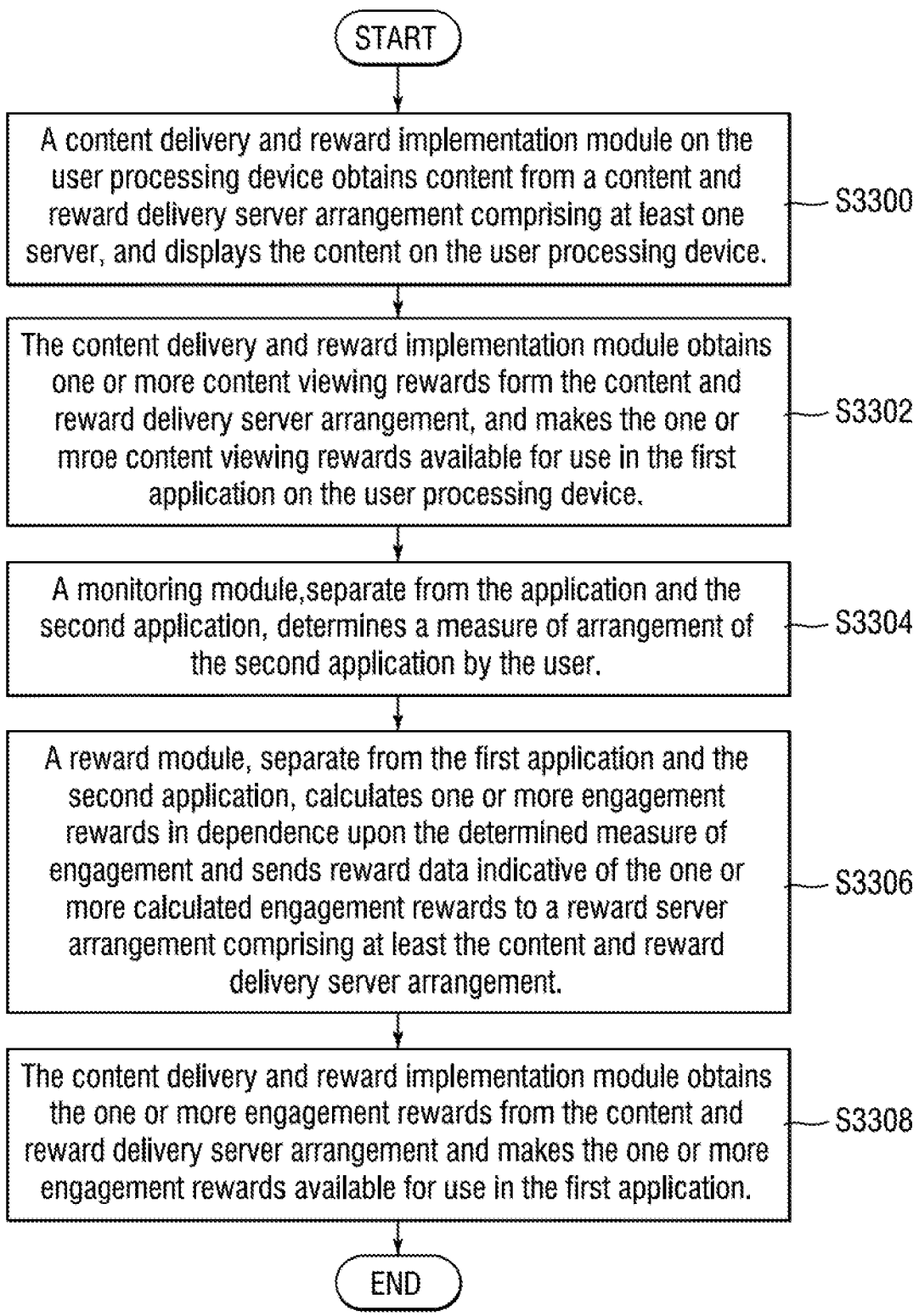
FIG. 33 shows processing operations performed by certain embodiments to effect a method of generating one or more rewards for use in a first application on a processing device in response to user engagement of a second application on the processing device.

It will be appreciated from the description above that certain embodiments of the present invention perform processing operations to effect a method of generating one or more rewards for use in a first application on a processing device in response to user engagement of a second application on the processing device as shown in FIG. 33.

Referring to FIG. 33, at step S3300, a content delivery and reward implementation module on the user processing device obtains content from a content and reward delivery server arrangement comprising at least one server, and displays the content on the user processing device.

At step S3302, the content delivery and reward implementation module obtains one or more content viewing rewards from the content and reward delivery server arrangement, and makes the one or more content viewing rewards available for use in the first application on the user processing device.

At step S3304, a monitoring module, separate from the first application and the second application, determines a measure of an engagement of the second application by the user.

At step S3306, a reward module, separate from the first application and the second application, calculates one or more engagement rewards in dependence upon the determined measure of engagement and sends reward data indicative of the one or more calculated engagement rewards to a reward server arrangement comprising at least the content and reward delivery server arrangement.

At step S3308, the content delivery and reward implementation module obtains the one or more engagement rewards from the content and reward delivery server arrangement and makes the one or more engagement rewards available for use in the first application.

Figure 34:
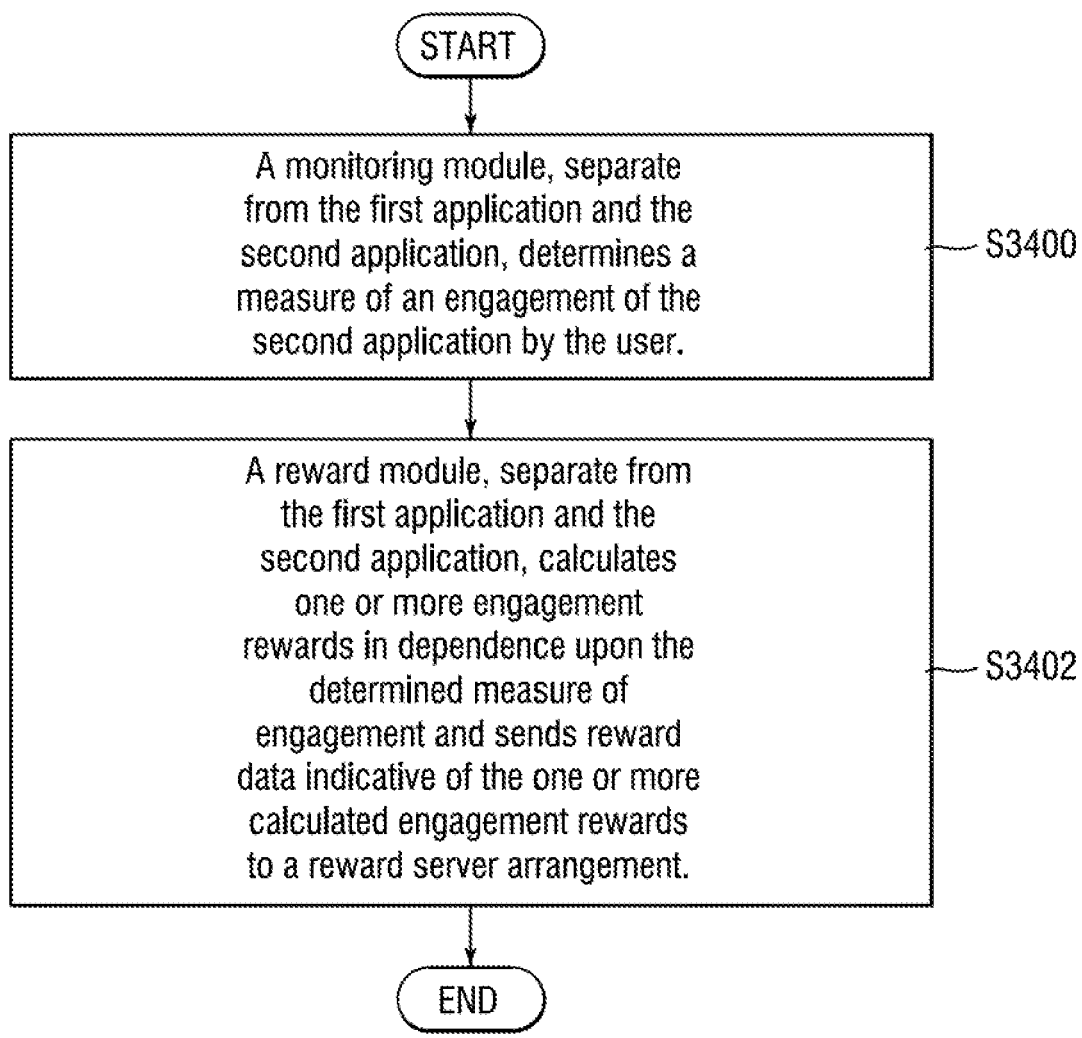
FIG. 34 shows processing operations performed by certain embodiments to effect a method of generating one or more rewards for use in a first application on a user processing device in response to user engagement of a second application on the user processing device.

It will also be appreciated from the description above that certain embodiments of the present invention perform processing to effect a method of generating one or more rewards for use in a first application on a user processing device in response to user engagement of a second application on the user processing device as shown in FIG. 34.

Referring to FIG. 34, at step S3400, a monitoring module, separate from the first application and the second application, determines a measure of an engagement of the second application by the user.

At step S3402, a reward module, separate from the first application and the second application, calculates one or more engagement rewards in dependence upon the determined measure of engagement and sends reward data indicative of the one or more calculated engagement rewards to a reward server arrangement.

Figure 35:
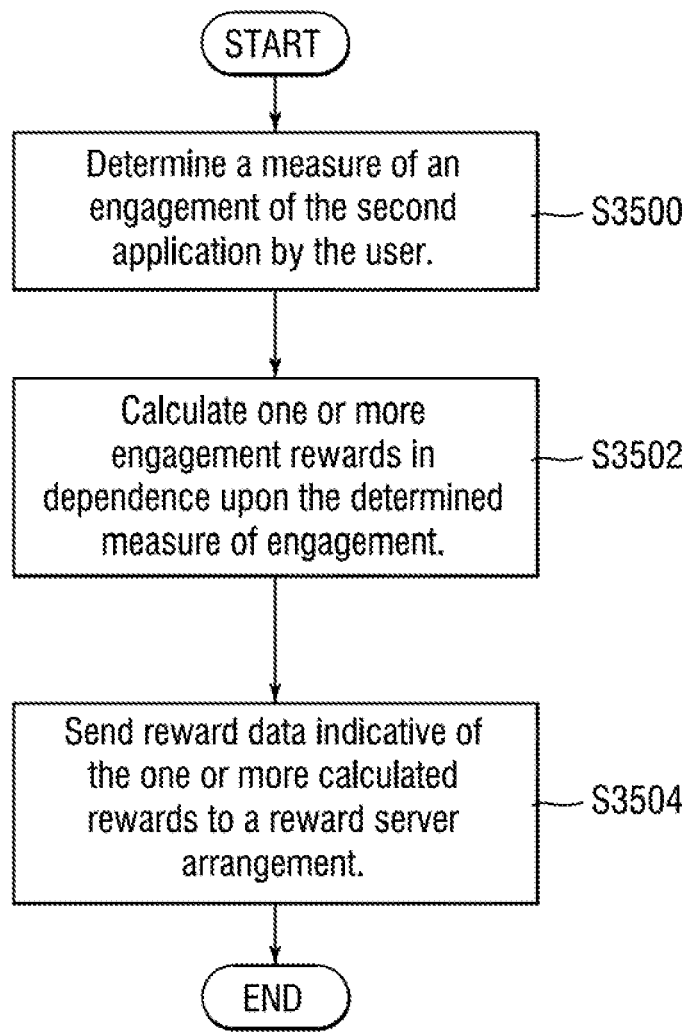
FIG. 35 shows processing operations performed in certain embodiments by the execution of computer program instructions by a processing device that has first application instructions, separate from the computer program instructions, defining a first application and second application instructions, separate from the computer program instructions, defining a second application.

It will further be appreciated from the description above that certain embodiments of the present invention provide a non-transitory storage medium storing computer program instructions which, when executed by a processing device that has first application instructions, separate from the computer program instructions, defining a first application and second application instructions, separate from the computer program instructions, defining a second application, cause the processing device to perform processing operations as shown in FIG. 35.

Referring to FIG. 35, at step S3500, the computer program instructions cause the processor to determine a measure of an engagement of the second application by the user.

At step S3502, the computer program instructions cause the processor to calculate one or more engagement rewards in dependence upon the determined measure of engagement.

At step S3504, the computer program instructions cause the processor to send reward data indicative of the one or more calculated engagement rewards to a reward server arrangement.

Comparison of Certain Embodiments Using an Example Scenario

Certain embodiments of the invention will now be compared using the following example scenario:
- a user selects a reward-generating application from a menu displayed at step S814 in the first embodiment or at step S1314 in the second to ninth embodiments;
- the user uses the selected reward-generating application for 1 minute (60 seconds), performing 30 user interactions with the application (clicks, taps, swipes, etc.), with these user interactions starting 10 seconds into the session, ending 10 seconds before the user closes the selected reward-generating application, and being evenly distributed in time between the first and last user interactions;
- the user then closes the selected reward-generating application, stops using the user processing device 300 for 1 minute and then resumes using the user processing device by returning to the first application 301.

The first embodiment would determine a measure of engagement of the user with the reward-generating application by calculating the time between the time at which activation of the reward-generating application is triggered (this being indicated for example by the time at which the user selected the reward-generating application) and the time at which the user returns to the first application 301. Accordingly, in the example scenario above, the first embodiment would determine a measure of engagement of 2 minutes.

The second embodiment would determine a measure of engagement of the user with the reward-generating application by processing a list of applications running on the user processing device, sorted by time of last engagement by the user, so as to calculate the time between the first time at which the last application used by the user was determined to be the selected reward-generating application (this occurring when the user selected the reward-generating application in the example scenario) and the time at which the application last used by the user was determined to no longer be the reward-generating application (this being the time at which the user closed the reward-generating application in the example scenario as the reward-generating application would then no longer be running and so would not appear on the sorted list of applications). Accordingly, in the example scenario above, the second embodiment would determine a measure of engagement of 1 minute (or, if the second embodiment included an error factor in its calculation, 1 minute $T_{error}$). Similarly, the third embodiment, which determines the start and end of a session in the selected reward-generating application, and the ninth embodiment, which determines when the selected reward-generating application is displayed to the user and when the selected reward-generating application is no longer displayed to the user, would determine a measure of engagement of 1 minute in the example scenario (or, if either the third or ninth embodiment included an error factor in its calculation, 1 minute+ $T_{error}$).

The fourth embodiment would determine a measure of engagement of the user with the reward-generating application by detecting user interactions in the reward-generating application and determining the time between the first user interaction and the last user interaction. Accordingly, in the example scenario above, the fourth embodiment would detect the first user interaction 10 seconds into the session and would detect the last user interaction 10 seconds before the end of the session. The fourth embodiment would therefore determine a measure of engagement of 40 seconds (or, if the fourth embodiment included an error factor in its calculation, 40 seconds+$T_{error}$).

The fifth embodiment would determine a measure of engagement of the user with the reward-generating application by detecting user interactions in the reward-generating application and determining a time measure as a combination of the actual length of each of the interactions. Accordingly, in the example scenario above, the fifth embodiment would detect and measure the length of each of the 30 interactions including the first interaction 10 seconds into the session and the last interaction 10 seconds before the end of the session, and combine the 30 interaction lengths into an overall measure of time. The fifth embodiment would therefore determine a measure of engagement of 40 seconds or less, depending on the length of each interaction (or, if the fifth embodiment included an error factor in its calculation for each interaction, 40+30·$T_{error}$ seconds or less).

The sixth and seventh embodiments would determine a measure of engagement of the user with the reward-generating application by detecting user interactions in the reward-generating application and determining a time measure as the product of a predetermined time per interaction $T_0$ and the number of interactions.

Accordingly, in the example scenario above and if the predetermined time per interaction was an estimated time per interaction of 1 second, the sixth or seventh embodiments would detect 30 interactions and therefore determine a measure of engagement of 30 seconds. Similarly, the eighth embodiment, which determines a measure of engagement of the user as a count of user interactions, would detect 30 interactions and determine a measure of engagement of 30 interactions.

[Modifications]

Many modifications can be made to the embodiments described above without departing from the spirit and scope of the present invention.

For example, in the embodiments described above, the reward-generating applications to be monitored may be determined from notifications sent from the reward module 330 to the monitoring module 320 when an application is selected from a menu at step S814 in the first embodiment and step S1314 in the second to ninth embodiments. In addition or instead, the reward-generating applications to be monitored may be determined from the configuration data received from an engagement reward server arrangement 140. In addition or instead, the reward-generating applications to be monitored may be determined from a predefined list of reward-generating applications or a list generated by the reward module 330 or the monitoring module 320 based on attributes of the reward-generating applications. Alternatively, the reward-generating applications to be monitored may comprise all applications running on the user processing device 300.

In the processing performed at step S1608 in the second to ninth embodiments described above, notification module 1260 interfaces with the operating system of the user processing device 300 to send a notification which links to the first application 301. As an alternative, notification module 1260 may interface with an email application on the user processing device 300 to send a notification to the user comprising an email that includes a link to the first application 301.

The described embodiments can be used to promote applications that the user has not previously downloaded or has downloaded and are identified in the configuration data from engagement reward server arrangement 140 as reward-generating applications that are still being promoted. The described embodiments can also be used to promote re-engagement of users with existing applications that have already been installed on the user processing device 300 but which the user has not engaged with for a period of time and which have been removed from the applications that are identified in the configuration data as reward-generating applications. Such promotion of re-engagement with a second application 302 can be achieved, for example, by re-identifying a second application 302 as a promoted application in the configuration data.

Each of the embodiments described above can be modified so as to report determined measures of engagement of each reward-generating application by a user to an engagement reward server arrangement 140. If the user processing device 300 does not have a connection to network 140, such a report could be sent the next time the user processing device establishes a connection with the network 140. By sending reports in this way, the receiving engagement reward server arrangement 140 would be able to monitor how successful a promotion of a second application 302 was by using the reported measures of engagement from different user processing devices 300.

In the embodiments described above, it is not necessary for any change to be made to a second application 302 to enable a user's engagement with the second application 302 to be monitored or for rewards to be generated based upon a user's engagement with the second application 302. However, if the developer of a second application 302 permits modifications to be made to the second application 302 (by itself, by the developer of a first application 301 or by a third party), a second application 302 may be modified to send a notification when the second application 302 is installed and/or first opened on the user processing device 300. The notification may be transmitted for example to an engagement reward server arrangement 140 or to a third party tracker.

In the embodiments described above, reward module 330 is operable to offer rewards for use in the first application 301 in exchange for the user engaging with one or more second applications 302. Optionally, reward module 330 may be further operable to provide offers for viewing rewards for use in the first application 301 in exchange for the user viewing content. In embodiments of the invention in which reward module 330 is operable to present offers for viewing rewards in exchange for the user viewing content, the configuration data obtained by the configuration module 520, 1220 in reward module 330 may define content offers (such as advertisements, by way of example) and a corresponding reward value for each content offer. In these embodiments, menu generation module 530, 1230 is operable to display a menu of both second applications 302 and content that the user may select from, and the reward module 330 further provides modules (not shown in FIGS. 5 and 12) for sending notification of content selection to the content and reward delivery server arrangement 130, receiving content from the content and reward delivery server arrangement 130, displaying the content, determining whether the content has been displayed for a sufficient length of time and sending a notification to content and reward delivery server arrangement 130 (these processes correspond to those at steps S612, S618, S620 and S622 in FIG. 6A and FIG. 6B).

In the embodiments described above, content and reward delivery server arrangement 130 stores reward data, and content delivery and reward implementation module 310 requests reward data from content and reward delivery server arrangement 130 at step S700. Alternatively, steps S700 and S702 may be omitted and the reward data may be pushed from the content and reward delivery server arrangement 130 to the content delivery and reward implementation module 130 so that content delivery and reward implementation module 130 obtains the reward data without requesting it.

In the embodiments described above, engagement reward data may be transmitted to engagement reward server arrangement 140. Engagement reward server 140 may act as a proxy for content and reward delivery server arrangement 130, and may also track the number of rewards earned through the use of different promoted applications. Engagement reward server arrangement 140 may forward a copy of engagement reward data to content and reward delivery server arrangement 130 immediately, periodically and/or in response to a request made by content and reward delivery server arrangement 130.

In the embodiments described above, menu generation module 530 generates and displays a menu of reward-generating applications and content to a user in response to a detection of an end of a session in the first application. However, instead, menu generation module 530 may generate and display the menu at a predetermined time or event in the first application (for example, when the first application starts, when the user has completed a predetermined task such as completing a level in an electronic game, when the user has used the first application for a predetermined length of time, when the user makes an in-app-purchase, or when the first application ends) or at a time or event in the first application that has been randomly selected by the first application or by the user (for example by the user selecting an icon displayed by the first application or by the user entering a specific menu that is part of the first application.

Alternative techniques for calculating a measure of engagement of a second application by a user can be used in addition to or instead of those described in embodiments above. By way of example a measure of engagement of a second application may be calculated based upon in-app-purchases made by the user in the second application such as by using the number of in-app-purchases, the value of in-app-purchases, or by allocating a predetermined measure of engagement if an in-app-purchase is made.

In the embodiments above, the configuration data obtained by configuration module 520 comprises data defining one or more second applications that are currently being promoted, and, optionally, data defining content offers. In a modification, the configuration data may further comprise data defining one or more non-reward-generating applications that are being promoted for the first application 301. In this modification, the menu generated by menu generation module 530 additionally includes non-reward-generating applications identified in the configuration data that was obtained from engagement reward server arrangement 140. The non-reward-generating applications identified in the configuration data, and therefore in the menu generated and displayed by menu generation module 530, may include non-reward-generating applications that are not installed on the user processing device but are available for download, and/or non-reward-generating applications that are already installed on the user processing device. Also in this modification, installation module 540 is further operable to facilitate the installation of a non-reward-generating application that is downloaded from application download server arrangement 120 onto the user processing device.

Although the methods performed by the embodiments have been described separately above, the different respective methods can be selectively combined and used together.

A person skilled in the art will, of course, recognise that modifications other than those described above can be made.

The invention claimed is:

1. A system operable to generate one or more engagement rewards for use in a first application on a user processing device by a user in response to user engagement of a second application on the user processing device, the system comprising:

the user processing device storing instructions defining the first application and the second application, wherein:

the user processing device further stores instructions defining a content delivery and reward implementation module operable to display on the user processing device content obtained from a content and reward delivery server arrangement comprising at least one server, to obtain one or more content viewing rewards from the content and reward delivery server arrangement, and to make the one or more content viewing rewards available for use in the first application; and the user processing device further stores instructions separate from the first application and separate from the second application defining:

a monitoring module in the user processing device that is operable to determine a measure of time as a measure of an engagement of the second application by the user of the user processing device, the monitoring module comprising:

an application list obtaining module operable to obtain a list of applications running on the user processing device sorted by time of last engagement by the user;

an application list processing module operable to repeatedly process the list to determine whether the application last used by the user is the second application; and a time duration calculation module operable to calculate the measure of time between a first time at which the application last used by the user is determined to be the second application and a time at which the application last used by the user is determined to be no longer the second application; and a reward module in the user processing device that is operable to calculate the one or more engagement rewards in dependence upon the determined measure of engagement and to send reward data indicative of the one or more calculated engagement rewards to a reward server arrangement comprising at least the content and reward delivery server arrangement;

wherein the reward server arrangement is operable to receive the reward data indicative of the one or more calculated engagement rewards from the user processing device and to make the one or more engagement rewards available via the content and reward delivery server arrangement; and wherein the content delivery and reward implementation module is further operable to obtain the one or more engagement rewards from the content and reward delivery server arrangement and to make the one or more engagement rewards available for use in the first application.

2. The system according to claim 1, wherein the instructions defining the content delivery and reward implementation module are part of the instructions defining the first application.

3. The system according to claim 1, wherein the instructions defining the monitoring module and the reward module are separate from the instructions defining the first application, the instructions defining the second application, and the instructions defining the content delivery and reward implementation module.

4. The system according to claim 1, wherein the instructions defining the monitoring module are separate from the instructions defining the reward module.

5. The system according to claim 1, wherein:
the reward server arrangement comprises the content and reward delivery server arrangement and an engagement reward server arrangement comprising at least one server; and
the engagement reward server arrangement is operable to receive the reward data indicative of the one or more calculated engagement rewards from the user processing device and to forward the reward data to the content and reward delivery server arrangement.

6. The system according to claim 1, wherein:
the first application comprises a game;
the second application comprises a game; and
the content and reward delivery server arrangement is arranged to provide content comprising an advertisement to the content delivery and reward implementation module, and the content delivery and reward implementation module is operable to display the advertisement on the user processing device.

7. The system according to claim 1, wherein:
the reward module includes a menu generation module operable, in response to an event or time in the first application, to display a menu of second applications from which the user selects.

8. The system according to claim 1, wherein the monitoring module further comprises:
a reward-generating-application trigger module operable to trigger an activation of the second application; and
a return detection module operable to detect a return of the user to the first application;
wherein the time duration calculation module is further operable to calculate the measure of time between a time at which the activation of the second application is triggered and a time at which the user returns to the first application.

9. The system according to claim 1, wherein the monitoring module further comprises:

a session start detection module operable to detect a start of a session in the second application; and
a session end detection module operable to detect an end of the session in the second application;
wherein the time duration calculation module is further operable to calculate the measure of time between the start of the session and the end of the session.

10. The system according to claim 1, wherein the monitoring module further comprises:
an interaction detection module operable to detect user interactions in the second application; and
an elapsed time determination module operable to determine when a time since a last user interaction in the second application exceeds a threshold;
wherein the time duration calculation module is responsive to a determination by the elapsed time determination module that the threshold has been exceeded to further calculate the measure of time between a first user interaction in the second application and the last user interaction in the second application.

11. The system according to claim 1, wherein:
the monitoring module further comprises an interaction detection module operable to detect user interactions in the second application;
the time duration calculation module is further operable to calculate a measure of time between a first user interaction in the second application and subsequent user interactions in the second application; and
the monitoring module further comprises an elapsed time determination module operable to determine when a time since a last user interaction in the second application exceeds a threshold.

12. The system according to claim 1, wherein the monitoring module further comprises:
an interaction start detection module operable to detect, for each of a plurality of user interactions in the second application, a start of the user interaction;
an interaction end detection module operable to detect, for each of the plurality of user interactions in the second application, an end of the user interaction;
an interaction duration calculation module operable to calculate a duration of each of the plurality of user interactions by calculating a measure of time between the start of the user interaction and the end of the user interaction; and
an interaction duration combination module operable to combine the durations of the user interactions calculated by the interaction duration calculation module.

13. The system according to claim 1, wherein the monitoring module comprises:
an interaction detection module operable to detect user interactions in the second application;
an interaction counting module operable to count the detected user interactions in the second application; and
an elapsed time determination module operable to determine whether a time since a last user interaction in the second application exceeds a threshold;
wherein the time duration calculation module is responsive to a determination by the elapsed time determination module that the threshold has been exceeded o further calculate the measure of time in dependence upon the number of detected user interactions in the second application.

14. The system according to claim 1, wherein:
the monitoring module further comprises an interaction detection module operable to detect user interactions in the second application;

the time duration calculation module is further operable to calculate a measure of time in dependence upon the detected user interactions; and the monitoring module further comprises an elapsed time determination module operable to determine whether a time since a last user interaction in the second application exceeds a threshold.

15. The system according to claim 1, wherein the monitoring module further comprises:
an interaction detection module operable to detect user interactions in the second application; and
an interaction counting module operable to count the detected user interactions in the second application.

16. The system according to claim 1, wherein:
the monitoring module further comprises a displayed-application determining module operable to determine an application displayed to the user and operable to determine whether the application displayed to the user is the second application; and
the time duration calculation module is further operable to calculate the measure of time between a first time at which the application displayed to the user is determined to be the second application and a time at which the application displayed to the user is determined to no longer be the second application.

17. The system according to claim 1, further comprising instructions defining a notification module, the notification module being operable to trigger a notification to the user of one or more rewards, the notification linking to the first application.

18. A user processing device operable to generate one or more engagement rewards for use in a first application on the user processing device by a user in response to user engagement of a second application on the user processing device, wherein:
the user processing device stores instructions defining a content delivery and reward implementation module operable to display on the user processing device content obtained from a content and reward delivery server arrangement comprising at least one server, to obtain one or more content viewing rewards from the content and reward delivery server arrangement, and to make the one or more content viewing rewards available for use in the first application; and
the user processing device further stores instructions separate from instructions defining the first application and separate from instructions defining the second application defining:
a monitoring module in the user processing device that is operable to determine a measure of time as a measure of an engagement of the second application by the user of the user processing device, the monitoring module comprising:
an application list obtaining module operable to obtain a list of applications running on the user processing device sorted by time of last engagement by the user;
an application list processing module operable to repeatedly process the list to determine whether the application last used by the user is the second application; and
a time duration calculation module operable to calculate the measure of time between a first time at which the application last used by the user is determined to be the second application and a time at which the application last used by the user is determined to be no longer the second application; and
a reward module in the user processing device that is operable to calculate the one or more engagement rewards in dependence upon the determined measure of engagement and to send reward data indicative of the one or more calculated engagement rewards to a reward server arrangement comprising at least the content and reward delivery server arrangement;
wherein the content delivery and reward implementation module is further operable to obtain the one or more engagement rewards from the content and reward delivery server arrangement, and to make the one or more engagement rewards available for use in the first application.

19. The user processing device according to claim 18, wherein the instructions defining the content delivery and reward implementation module are part of the instructions defining the first application.

20. The user processing device according to claim 18, wherein the instructions defining the monitoring module and the reward module are separate from the instructions defining the first application, the instructions defining the second application, and the instructions defining the content delivery and reward implementation module.

21. The user processing device according to claim 18, wherein the instructions defining the monitoring module are separate from the instructions defining the reward module.

22. The user processing device according to claim 18, wherein:
the reward server arrangement further comprises an engagement reward server arrangement comprising at least one server; and
the reward module is arranged to send the reward data to the engagement reward server arrangement.

23. The user processing device according to claim 18, wherein:
the first application comprises a game;
the second application comprises a game; and
the content delivery and reward implementation module is operable to obtain content comprising an advertisement from the content and reward delivery server arrangement, and to display the advertisement on the user processing device.

24. The user processing device according to claim 18, wherein:
the reward module includes a menu generation module operable, in response to an event or time in the first application, to display a menu of second applications from which the user selects.

25. The user processing device according to claim 18, wherein
the monitoring module further comprises:
a reward-generating-application trigger module operable to trigger an activation of the second application; and
a return detection module operable to detect a return of the user to the first application; and
the time duration calculation module is further operable to calculate the measure of time between a time at which the activation of the second application is triggered and a time at which the user returns to the first application.

26. The user processing device according to claim 18, wherein
the monitoring module further comprises:
a session start detection module operable to detect a start of a session in the second application; and
a session end detection module operable to detect an end of the session in the second application; and
the time duration calculation module is further operable to calculate the measure of time between the start of the session and the end of the session.

27. The user processing device according to claim 18, wherein
the monitoring module further comprises:
an interaction detection module operable to detect user interactions in the second application; and
an elapsed time determination module operable to determine when a time since a last user interaction in the second application exceeds a threshold; and
the time duration calculation module is responsive to a determination by the elapsed time determination module that the threshold has been exceeded to further calculate the measure of time between a first user interaction in the second application and the last user interaction in the second application.

28. The user processing device according to claim 18, wherein
the monitoring module further comprises an interaction detection module operable to detect user interactions in the second application;
the time duration calculation module is further operable to calculate a measure of time between a first user interaction in the second application and subsequent user interactions in the second application; and
the monitoring module further comprises an elapsed time determination module operable to determine when a time since a last user interaction in the second application exceeds a threshold.

29. The user processing device according to claim 18, wherein the monitoring module further comprises:
an interaction start detection module operable to detect, for each of a plurality of user interactions in the second application, a start of the user interaction;
an interaction end detection module operable to detect, for each of the plurality of user interactions in the second application, an end of the user interaction;
an interaction duration calculation module operable to calculate a duration of each of the plurality of user interactions by calculating a measure of time between the start of the user interaction and the end of the user interaction; and
an interaction duration combination module operable to combine the durations of the user interactions calculated by the interaction duration calculation module.

30. The user processing device according to claim 18, wherein
the monitoring module comprises:
an interaction detection module operable to detect user interactions in the second application;
an interaction counting module operable to count the detected user interactions in the second application; and
an elapsed time determination module operable to determine whether a time since a last user interaction in the second application exceeds a threshold; and
the time duration calculation module is responsive to a determination by the elapsed time determination module that the threshold has been exceeded to further calculate the measure of time in dependence upon the number of detected user interactions in the second application.

31. The user processing device according to claim 18, wherein
the monitoring module further comprises an interaction detection module operable to detect user interactions in the second application;
the time duration calculation module is further operable to calculate a measure of time in dependence upon the detected user interactions; and
the monitoring module further comprises an elapsed time determination module operable to determine whether a time since a last user interaction in the second application exceeds a threshold.

32. The user processing device according to claim 18, wherein the monitoring module further comprises:
an interaction detection module operable to detect user interactions in the second application; and
an interaction counting module operable to count the detected user interactions in the second application.

33. The user processing device according to claim 18, wherein
the monitoring module further comprises a displayed-application determining module operable to determine an application displayed to the user and operable to determine whether the application displayed to the user is the second application; and
the time duration calculation module is further operable to calculate the measure of time between a first time at which the application displayed to the user is determined to be the second application and a time at which the application displayed to the user is determined to no longer be the second application.

34. The user processing device according to claim 18, further comprising instructions defining a notification module, the notification module being operable to trigger a notification to the user of one or more rewards, the notification linking to the first application.

35. A method of generating one or more engagement rewards for use in a first application on a user processing device by a user in response to user engagement of a second application on the user processing device, the method comprising:
a content delivery and reward implementation module on the user processing device obtaining content from a content and reward delivery server arrangement comprising at least one server, and displaying the content on the user processing device;
the content delivery and reward implementation module obtaining one or more content viewing rewards from the content and reward delivery server arrangement, and making the one or more content viewing rewards available for use in the first application on the user processing device;
a monitoring module in the user processing device, separate from the first application and the second application, determining a measure of time as a measure of an engagement of the second application by the user of the user processing device, wherein the monitoring module:
obtains a list of applications running on the user processing device sorted by time of last engagement by the user;
repeatedly processes the list to determine whether the application last used by the user is the second application; and calculates the measure of time between a first time at which the application last used by the user is determined to be the second application and a time at which the application last used by the user is determined to be no longer the second application;

a reward module in the user processing device, separate from the first application and the second application, calculating the one or more engagement rewards in dependence upon the determined measure of engagement and sending reward data indicative of the one or more calculated engagement rewards to a reward server arrangement comprising at least the content and reward delivery server arrangement; and the content delivery and reward implementation module obtaining the one or more engagement rewards from the content and reward delivery server arrangement and making the one or more engagement rewards available for use in the first application.

36. The method according to claim 35, wherein the content delivery and reward implementation module is part of the first application.

37. The method according to claim 35, wherein the monitoring module and the reward module are separate from the first application, the second application, and the content delivery and reward implementation module.

38. The method according to claim 35, wherein the monitoring module is separate from the reward module.

39. The method according to claim 35, wherein:
the reward server arrangement further comprises an engagement reward server arrangement comprising at least one server; and
the reward module sends the reward data to the engagement reward server arrangement.

40. The method according to claim 35, wherein:
the first application comprises a game;
the second application comprises a game; and
the content delivery and reward implementation module obtains content comprising an advertisement from the content and reward delivery server arrangement and displays the advertisement on the user processing device.

41. The method according to claim 35, wherein:
in response to an event or time in the first application, the reward module displays a menu of second applications from which the user selects.

42. The method according to claim 35, further comprising the monitoring module:
triggering an activation of the second application;
detecting a return of the user to the first application; and
calculating the measure of time between a time at which the activation of the second application is triggered and a time at which the user returns to the first application.

43. The method according to claim 35, further comprising the monitoring module:
detecting a start of a session in the second application;
detecting an end of the session in the second application; and
calculating the measure of time between the start of the session and the end of the session.

44. The method according to claim 35, further comprising the monitoring module:
detecting user interactions in the second application;
determining when a time since a last user interaction in the second application exceeds a threshold; and
in response to a determination that the threshold has been exceeded, calculating the measure of time between a first user interaction in the second application and the last user interaction in the second application.

45. The method according to claim 35, further comprising the monitoring module:
detecting user interactions in the second application;
calculating a measure of time between a first user interaction in the second application and subsequent user interactions in the second application; and
determining when a time since a last user interaction in the second application exceeds a threshold.

46. The method according to claim 35, further comprising the monitoring module:
detecting, for each of a plurality of user interactions in the second application, a start of the user interaction;
detecting, for each of the plurality of user interactions in the second application, an end of the user interaction;
calculating a duration of each of the plurality of user interactions by calculating a measure of time between the start of the user interaction and the end of the user interaction; and
combining the durations of the user interactions calculated by the interaction duration calculation module.

47. The method according to claim 35, further comprising the monitoring module:
detecting user interactions in the second application;
counting the detected user interactions in the second application;
determining whether a time since a last user interaction in the second application exceeds a threshold; and
in response to a determination that the threshold has been exceeded, calculating the measure of time in dependence upon the number of detected user interactions in the second application.

48. The method according to claim 35, further comprising the monitoring module:
detecting user interactions in the second application;
calculating a measure of time in dependence upon the detected user interactions; and
determining whether a time since a last user interaction in the second application exceeds a threshold.

49. The method according to claim 35, further comprising the monitoring module:
detecting user interactions in the second application; and
counting the detected user interactions in the second application.

50. The method according to claim 35, further comprising the monitoring module:
determining an application displayed to a user;
determining whether the application displayed to the user is the second application; and
calculating the measure of time between a first time at which the application displayed to the user is determined to be the second application and a time at which the application displayed to the user is determined to no longer be the second application.

51. The method according to claim 35, further comprising triggering a notification to the user of one or more rewards, the notification linking to the first application.

52. A user processing device operable to generate one or more engagement rewards for use in a first application on the user processing device by a user in response to user engagement of a second application on the user processing device, the user processing device storing instructions separate from instructions defining the first application and separate from instructions defining the second application defining:
a monitoring module in the user processing device operable to determine a measure of time as a measure of an engagement of the second application by the user of the user processing device, wherein the monitoring module comprises:
  an application list obtaining module operable to obtain a list of applications running on the user processing device sorted by time of last engagement by the user;
  an application list processing module operable to repeatedly process the list to determine whether the application last used by the user is the second application; and
  a time duration calculation module operable to calculate the measure of time between a first time at which the application last used by the user is determined to be the second application and a time at which the application last used by the user is determined to be no longer the second application; and
a reward module in the user processing device operable to calculate the one or more engagement rewards in dependence upon the determined measure of engagement and to send reward data indicative of the one or more calculated engagement rewards to a reward server arrangement.

53. The user processing device according to claim 52, wherein the instructions defining the monitoring module are separate from the instructions defining the reward module.

54. The user processing device according to claim 52, wherein:
the reward module includes a menu generation module operable, in response to an event or time in the first application, to display a menu of second applications from which the user selects.

55. The user processing device according to claim 52, wherein
the monitoring module further comprises:
  a reward-generating-application trigger module operable to trigger an activation of the second application; and
  a return detection module operable to detect a return of the user to the first application; and
the time duration calculation module is further operable to calculate the measure of time between a time at which the activation of the second application is triggered and a time at which the user returns to the first application.

56. The user processing device according to claim 52, wherein
the monitoring module further comprises:
  a session start detection module operable to detect a start of a session in the second application; and
  a session end detection module operable to detect an end of the session in the second application; and
the time duration calculation module is further operable to calculate the measure of time between the start of the session and the end of the session.

57. The user processing device according to claim 52, wherein
the monitoring module further comprises:
  an interaction detection module operable to detect user interactions in the second application; and
  an elapsed time determination module operable to determine when a time since a last user interaction in the second application exceeds a threshold; and
the time duration calculation module is responsive to a determination by the elapsed time determination module that the threshold has been exceeded to further calculate the measure of time between a first user interaction in the second application and the last user interaction in the second application.

58. The user processing device according to claim 52, wherein
the monitoring module further comprises an interaction detection module operable to detect user interactions in the second application;
the time duration calculation module is further operable to calculate a measure of time between a first user interaction in the second application and subsequent user interactions in the second application; and
the monitoring module further comprises an elapsed time determination module operable to determine when a time since a last user interaction in the second application exceeds a threshold.

59. The user processing device according to claim 52, wherein the monitoring module further comprises:
  an interaction start detection module operable to detect, for each of a plurality of user interactions in the second application, a start of the user interaction;
  an interaction end detection module operable to detect, for each of the plurality of user interactions in the second application, an end of the user interaction;
  an interaction duration calculation module operable to calculate a duration of each of the plurality of user interactions by calculating a measure of time between the start of the user interaction and the end of the user interaction; and
  an interaction duration combination module operable to combine the durations of the user interactions calculated by the interaction duration calculation module.

60. The user processing device according to claim 52, wherein
the monitoring module further comprises:
  an interaction detection module operable to detect user interactions in the second application;
  an interaction counting module operable to count the detected user interactions in the second application; and
  an elapsed time determination module operable to determine whether a time since a last user interaction in the second application exceeds a threshold; and
the time duration calculation module is responsive to a determination by the elapsed time determination module that the threshold has been exceeded to further calculate the measure of time in dependence upon the number of detected user interactions in the second application.

61. The user processing device according to claim 52, wherein
the monitoring module further comprises an interaction detection module operable to detect user interactions in the second application;
the time duration calculation module is further operable to calculate a measure of time in dependence upon the detected user interactions; and
the monitoring module further comprises an elapsed time determination module operable to determine whether a time since a last user interaction in the second application exceeds a threshold.

62. The user processing device according to claim 52, wherein the monitoring module further comprises:
  an interaction detection module operable to detect user interactions in the second application; and
  an interaction counting module operable to count the detected user interactions in the second application.

63. The user processing device according to claim 52, wherein
the monitoring module further comprises a displayed-application determining module operable to determine an application displayed to a user and operable to determine whether the application displayed to the user is the second application; and
the time duration calculation is further operable to calculate the measure of time between a first time at which the application displayed to the user is determined to be the second application and a time at which the application displayed to the user is determined to no longer be the second application.

64. The user processing device according to claim 52, further comprising instructions defining a notification module, the notification module being operable to trigger a notification to the user of one or more rewards, the notification linking to the first application.

65. A method of generating one or more engagement rewards for use in a first application on a user processing device by a user in response to user engagement of a second application on the user processing device, the method comprising:
a monitoring module in the user processing device, separate from the first application and the second application, determining a measure of time as a measure of an engagement of the second application by the user of the user processing device, wherein the monitoring module:
obtains a list of applications running on the user processing device sorted by time of last engagement by the user;
repeatedly processes the list to determine whether the application last used by the user is the second application; and
calculates the measure of time between a first time at which the application last used by the user is determined to be the second application and a time at which the application last used by the user is determined to be no longer the second application; and
a reward module in the user processing device, separate from the first application and the second application, calculating the one or more engagement rewards in dependence upon the determined measure of engagement and sending reward data indicative of the one or more calculated engagement rewards to a reward server arrangement.

66. The method according to claim 65, wherein the monitoring module is separate from the reward module.

67. The method according to claim 65, wherein:
in response to an event or time in the first application, the reward module displays a menu of second applications from which the user selects.

68. The method according to claim 65, further comprising the monitoring module:
triggering an activation of the second application;
detecting a return of the user to the first application; and
calculating the measure of time between a time at which the activation of the second application is triggered and a time at which the user returns to the first application.

69. The method according to claim 65, further comprising the monitoring module:
detecting a start of a session in the second application;
detecting an end of the session in the second application; and
calculating the measure of time between the start of the session and the end of the session.

70. The method according to claim 65, further comprising the monitoring module:
detecting user interactions in the second application;
determining when a time since a last user interaction in the second application exceeds a threshold; and
in response to a determination that the threshold has been exceeded, calculating the measure of time between a first user interaction in the second application and the last user interaction in the second application.

71. The method according to claim 65, further comprising the monitoring module:
detecting user interactions in the second application;
calculating a measure of time between a first user interaction in the second application and subsequent user interactions in the second application; and
determining when a time since a last user interaction in the second application exceeds a threshold.

72. The method according to claim 65, further comprising the monitoring module:
detecting, for each of a plurality of user interactions in the second application, a start of the user interaction;
detecting, for each of the plurality of user interactions in the second application, an end of the user interaction;
calculating a duration of each of the plurality of user interactions by calculating a measure of time between the start of the user interaction and the end of the user interaction; and
combining the durations of the user interactions calculated by the interaction duration calculation module.

73. The method according to claim 65, further comprising the monitoring module:
detecting user interactions in the second application;
counting the detected user interactions in the second application;
determining whether a time since a last user interaction in the second application exceeds a threshold; and
in response to a determination that the threshold has been exceeded, calculating the measure of time in dependence upon the number of detected user interactions in the second application.

74. The method according to claim 65, further comprising the monitoring module:
detecting user interactions in the second application;
calculating a measure of time in dependence upon the detected user interactions; and
determining whether a time since a last user interaction in the second application exceeds a threshold.

75. The method according to claim 65, further comprising the monitoring module:
detecting user interactions in the second application; and
counting the detected user interactions in the second application.

76. The method according to claim 65, further comprising the monitoring module:
determining an application displayed to the user;
determining whether the application displayed to the user is the second application; and
calculating the measure of time between a first time at which the application displayed to the user is determined to be the second application and a time at which the application displayed to the user is determined to no longer be the second application.

77. The method according to claim 65, further comprising triggering a notification to the user of one or more rewards, the notification linking to the first application.

78. A non-transitory storage medium storing computer program instructions which, when executed by a user processing device that has first application instructions, separate from the computer program instructions, defining a first application and second application instructions, separate from the computer program instructions, defining a second application, cause the user processing device to:
- determine a measure of time as a measure of an engagement of the second application by a user of the user processing device, by:
  - obtaining a list of applications running on the user processing device sorted by time of last engagement by the user;
  - repeatedly processing the list to determine whether the application last used by the user is the second application; and
  - calculating the measure of time between a first time at which the application last used by the user is determined to be the second application and a time at which the application last used by the user is determined to be no longer the second application;
- calculate one or more engagement rewards in dependence upon the determined measure of engagement; and
- send reward data indicative of the one or more calculated engagement rewards to a reward server arrangement.

79. The non-transitory storage medium according to claim 78, wherein the computer program instructions comprise instructions which, when executed, further cause the user processing device to:
- detect an end of a session in the first application; and
- in response to the detection of the end of the session in the first application, display a menu of second applications from which the user selects.

80. The non-transitory storage medium according to claim 78, wherein the computer program instructions comprise instructions which, when executed, further cause the user processing device to:
- trigger an activation of the second application;
- detect a return of the user to the first application; and
- calculate the measure of time between a time at which the activation of the second application is triggered and a time at which the user returns to the first application.

81. The non-transitory storage medium according to claim 78, wherein the computer program instructions comprise instructions which, when executed, further cause the user processing device to:
- detect a start of a session in the second application;
- detect an end of the session in the second application; and
- calculate the measure of time between the start of the session and the end of the session.

82. The non-transitory storage medium according to claim 78, wherein the computer program instructions comprise instructions which, when executed, further cause the user processing device to:
- detect user interactions in the second application;
- determine when a time since a last user interaction in the second application exceeds a threshold; and
- in response to a determination that the threshold has been exceeded, calculate the measure of time between a first user interaction in the second application and the last user interaction in the second application.

83. The non-transitory storage medium according to claim 78, wherein the computer program instructions comprise instructions which, when executed, further cause the user processing device to:
- detect user interactions in the second application;
- calculate a measure of time between a first user interaction in the second application and subsequent user interactions in the second application; and
- determine when a time since a last user interaction in the second application exceeds a threshold.

84. The non-transitory storage medium according to claim 78, wherein the computer program instructions comprise instructions which, when executed, further cause the user processing device to:
- detect, for each of a plurality of user interactions in the second application, a start of the user interaction;
- detect, for each of the plurality of user interactions in the second application, an end of the user interaction;
- calculate a duration of each of the plurality of user interactions by calculating a measure of time between the start of the user interaction and the end of the user interaction; and
- combine the durations of the user interactions calculated by the interaction duration calculation module.

85. The non-transitory storage medium according to claim 78, wherein the computer program instructions comprise instructions which, when executed, further cause the user processing device to:
- detect user interactions in the second application;
- count the detected user interactions in the second application;
- determine whether a time since a last user interaction in the second application exceeds a threshold; and
- in response to a determination that the threshold has been exceeded, calculate the measure of time in dependence upon the number of detected user interactions in the second application.

86. The non-transitory storage medium according to claim 78, wherein the computer program instructions comprise instructions which, when executed, further cause the user processing device to:
- detect user interactions in the second application;
- calculate a measure of time in dependence upon the detected user interactions; and
- determine whether a time since a last user interaction in the second application exceeds a threshold.

87. The non-transitory storage medium according to claim 78, wherein the computer program instructions comprise instructions which, when executed, further cause the user processing device to:
- detect user interactions in the second application; and
- count the detected user interactions in the second application.

88. The non-transitory storage medium according to claim 78, wherein the computer program instructions comprise instructions which, when executed, further cause the user processing device to:
- determine an application displayed to the user;
- determine whether the application displayed to the user is the second application; and
- calculate the measure of time between a first time at which the application displayed to the user is determined to be the second application and a time at which the application displayed to the user is determined to no longer be the second application.

89. The non-transitory storage medium according to claim 78, further comprising computer program instructions which, when executed, cause the user processing device to trigger a notification to the user of one or more rewards, the notification linking to the first application.

* * * * *